(12) United States Patent
Nakatani et al.

(10) Patent No.: US 12,237,481 B2
(45) Date of Patent: Feb. 25, 2025

(54) BATTERY PACK HAVING A FILM THERMISTOR AND A DIP THERMISTOR

(71) Applicant: MAKITA CORPORATION, Anjo (JP)

(72) Inventors: Kohei Nakatani, Anjo (JP); Kazuya Tanaka, Anjo (JP); Hiroki Uesugi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 844 days.

(21) Appl. No.: 17/297,279

(22) PCT Filed: Nov. 7, 2019

(86) PCT No.: PCT/JP2019/043746
§ 371 (c)(1),
(2) Date: May 26, 2021

(87) PCT Pub. No.: WO2020/110655
PCT Pub. Date: Jun. 4, 2020

(65) Prior Publication Data

US 2022/0029214 A1    Jan. 27, 2022
US 2022/0359921 A9    Nov. 10, 2022

(30) Foreign Application Priority Data

Nov. 30, 2018 (JP) .................................. 2018-225408

(51) Int. Cl.
*H01M 10/48* (2006.01)
*H01M 10/42* (2006.01)
(Continued)

(52) U.S. Cl.
CPC ....... *H01M 10/486* (2013.01); *H01M 10/425* (2013.01); *H01M 10/48* (2013.01);
(Continued)

(58) Field of Classification Search
CPC ............................. H01M 10/00; H01M 50/00
See application file for complete search history.

(56) References Cited

U.S. PATENT DOCUMENTS 9,406,915 B2    8/2016   White et al.
9,461,296 B2   10/2016   Kohno et al.
(Continued)

FOREIGN PATENT DOCUMENTS

CN    103390742 A    11/2013
CN    104576987 A     4/2015
(Continued)

OTHER PUBLICATIONS

Office Action from the Japanese Patent Office dispatched Dec. 28, 2021 in related Japanese application No. 2020-558263, and machine translation thereof.
(Continued)

*Primary Examiner* — Rexford N Barnie
*Assistant Examiner* — Joseph N Inge
(74) *Attorney, Agent, or Firm* — J-TEK LAW PLLC; Scott T. Wakeman; Jeffrey D. Tekanic

(57) ABSTRACT

A battery pack contains a plurality of battery cells that includes a first battery cell and a second battery cell; a first thermistor disposed closest to the first battery cell among the battery cells; a second thermistor disposed closest to the second battery cell among the battery cells. A case of the battery pack holds the battery cells, the first thermistor, and the second thermistor. The first battery cell is disposed such that at least one of the other battery cells is interposed between the first battery cell and a wall surface of the case in a direction orthogonal to a longitudinal direction of the first battery cell. The second battery cell is disposed such that none of the other battery cells is interposed between the second battery cell and the wall surface of the case in a (Continued)

direction orthogonal to a longitudinal direction of the second battery cell.

19 Claims, 44 Drawing Sheets

(51) Int. Cl.
  *H01M 10/613*  (2014.01)
  *H01M 10/6235*  (2014.01)
  *H01M 10/643*  (2014.01)
  *H01M 10/6563*  (2014.01)
  *H01M 50/213*  (2021.01)
  *H01M 50/227*  (2021.01)
  *H01M 50/247*  (2021.01)
  *H01M 50/262*  (2021.01)
  *H01M 50/296*  (2021.01)

(52) U.S. Cl.
  CPC ....... *H01M 10/482* (2013.01); *H01M 10/613* (2015.04); *H01M 10/6235* (2015.04); *H01M 10/643* (2015.04); *H01M 50/213* (2021.01); *H01M 50/247* (2021.01); *H01M 10/6563* (2015.04); *H01M 50/227* (2021.01); *H01M 50/262* (2021.01); *H01M 50/296* (2021.01); *H01M 2220/30* (2013.01)

(56) References Cited

U.S. PATENT DOCUMENTS

| | | | |
|---|---|---|---|
| 2001/0046624 A1* | 11/2001 | Goto | H01M 50/298 180/68.5 |
| 2008/0305390 A1 | 12/2008 | Naito | |
| 2009/0297892 A1 | 12/2009 | Ijaz et al. | |
| 2012/0169289 A1 | 7/2012 | Kim et al. | |
| 2013/0260212 A1 | 10/2013 | Kohno et al. | |
| 2013/0302651 A1 | 11/2013 | Kim et al. | |
| 2014/0113828 A1* | 4/2014 | Gilbert | G01L 21/12 252/500 |
| 2014/0302353 A1* | 10/2014 | Ogura | H01M 50/572 429/7 |
| 2015/0118530 A1* | 4/2015 | Lee | H01M 10/6557 429/82 |
| 2019/0262971 A1 | 8/2019 | Kondo | |
| 2020/0162011 A1 | 5/2020 | Cox et al. | |
| 2020/0176732 A1 | 6/2020 | Kondo | |
| 2020/0176736 A1 | 6/2020 | Taga et al. | |
| 2020/0176834 A1 | 6/2020 | Murakami et al. | |
| 2020/0186006 A1 | 6/2020 | Vanko et al. | |

FOREIGN PATENT DOCUMENTS

| | | |
|---|---|---|
| CN | 208045568 U | 11/2018 |
| EP | 2866295 A1 | 4/2015 |
| JP | 2005093144 A | 4/2005 |
| JP | 2005287091 A | 10/2005 |
| JP | 2008235155 A | 10/2008 |
| JP | 2016192353 A | 11/2016 |
| WO | 2016093979 A1 | 6/2016 |
| WO | 2017142039 A1 | 8/2017 |
| WO | 2018198896 A1 | 11/2018 |

OTHER PUBLICATIONS

Communication from the European Patent Office dated May 12, 2023 in related EP application No. 19 889 364.6 and examined claims 1-7.

English translation of the International Search Report dated Jan. 28, 2020 for parent application No. PCT/JP2019/043746.

English translation of the Written Opinion for parent application No. PCT/JP2019/043746.

Extended European Search Report from the European Patent Office dated Nov. 5, 2021 in related European Patent application No. 19 88 9364, including European Search Opinion, Supplementary European Search Report and examined claims 1-7.

Office Action from the Chinese Patent Office dispatched Jan. 16, 2024 in counterpart application No. 201980078171.7, and translation thereof.

\* cited by examiner

BATTERY PACK HAVING A FILM THERMISTOR AND A DIP THERMISTOR

CROSS-REFERENCE

This application is the US national stage of International Patent Application No. PCT/JP2019/043746 filed on Nov. 7, 2019, which claims priority to Japanese Patent Application 2018-225408 filed on Nov. 30, 2018.

TECHNICAL FIELD

Techniques disclosed by the present specification relate to battery packs.

BACKGROUND ART

A battery pack is disclosed in Japanese Patent Application Publication No. 2005-287091. The battery pack comprises a plurality of battery cells that includes a first battery cell and a second battery cell; a first thermistor; a second thermistor; and a case accommodating the plurality of battery cells, the first thermistor, and the second thermistor. Because the first thermistor and the second thermistor are both disposed such that they are surrounded on all sides by the battery cells, the temperature of battery cells, which have a high temperature, can be obtained.

SUMMARY OF THE INVENTION

In a battery pack that comprises a plurality of battery cells, it is desirable that not only the temperature of a battery cell having a high temperature but also the temperature of a battery cell having a low temperature can be obtained. In the battery pack of Japanese Patent Application Publication No. 2005-287091, the first thermistor and the second thermistor are both disposed such that they are surrounded by a plurality of battery cells. Therefore, even if, for example, an attempt is made to obtain the temperature of a battery cell having a low temperature using the second thermistor, the temperature detected using the second thermistor will become higher than the temperature of the low-temperature battery cell since the second thermistor is disposed in a position surrounded by battery cells having a higher temperature than the low-temperature battery cell. In the present specification, techniques are provided that make it possible to obtain the temperature of a battery cell having a low temperature as well as the temperature of a battery cell having a high temperature in a battery pack comprising a plurality of battery cells.

The present specification discloses a battery pack. This battery pack may comprise: a plurality of battery cells that includes a first battery cell and a second battery cell; a first thermistor disposed closest to the first battery cell among the plurality of battery cells; a second thermistor disposed closest to the second battery cell among the plurality of battery cells; and a case accommodating the plurality of battery cells, the first thermistor, and the second thermistor. The first battery cell may be disposed at a position where (an)other battery cell(s) is (are) interposed between the first battery cell and a wall surface of the case with respect to a direction orthogonal to a longitudinal direction of the first battery cell. The second battery cell may be disposed at a position where no other battery cell is interposed between the second battery cell and the wall surface of the case with respect to a direction orthogonal to a longitudinal direction of the second battery cell. It is noted that "(an)other battery cell(s) is (are) interposed between a battery cell and the wall surface of the case" as recited herein means that it is not possible to project the entirety of the battery cell onto the wall surface of the case without interfering with the other battery cell(s), while "no other battery cell is interposed between a battery cell and the wall surface of the case" means that the entirety of the battery cell is able to be projected on the wall surface of the case without interfering with another battery cell.

The present specification also discloses another battery pack. The battery pack may comprise a plurality of battery cells that includes a first battery cell and a second battery cell; a first thermistor disposed closest to the first battery cell among the plurality of battery cells; a second thermistor disposed closest to the second battery cell among the plurality of battery cells; and a case accommodating the plurality of battery cells, the first thermistor, and the second thermistor. The plurality of battery cells may comprise: an upper battery cell group disposed in an upper row; a lower battery cell group disposed in a lower row; and a middle battery cell group disposed between the upper battery cell group and the lower battery cell group. The first battery cell may be included in the middle battery cell group. The second battery cell may be included in either the upper battery cell group or the lower battery cell group.

The present specification discloses yet another battery pack. This battery pack may comprise: a plurality of battery cells that includes a first battery cell and a second battery cell; a first thermistor disposed closest to the first battery cell among the plurality of battery cells; a second thermistor disposed closest to the second battery cell among the plurality of battery cells; and a case accommodating the plurality of battery cells, the first thermistor and the second thermistor. The plurality of battery cells may comprise: an upper battery cell group disposed at a position facing an upper surface of the case; a lower battery cell group disposed at a position facing a lower surface of the case; and a middle battery cell group disposed between the upper battery cell group and the lower battery cell group. The first battery cell may be included in the middle battery cell group. The second battery cell may be included in either the upper battery cell group or the lower battery cell group.

DETAILED DESCRIPTION

Figure 1:
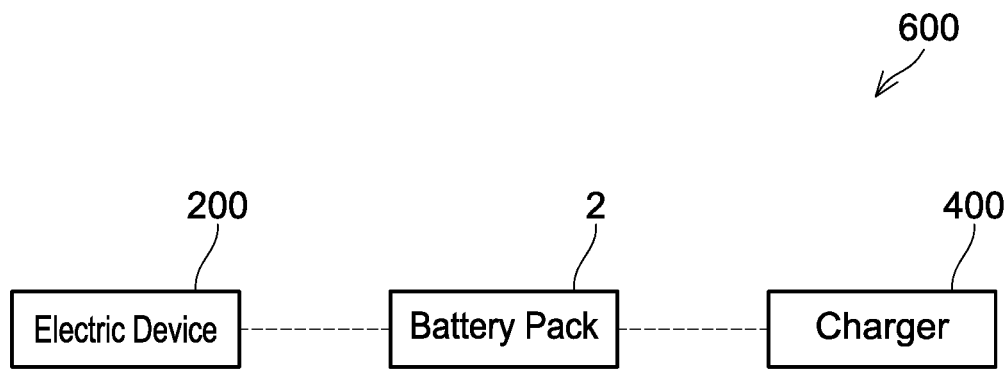
FIG. 1 is a drawing that schematically shows a configuration of a power supply system 600 according to an embodiment.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved battery packs, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a battery pack may comprise: a plurality of battery cells that includes a first battery cell and a second battery cell; a first thermistor disposed closest to the first battery cell among the plurality of battery cells; a second thermistor disposed closest to the second battery cell among the plurality of battery cells; and a case accommodating the plurality of battery cells, the first thermistor, and the second thermistor. The first battery cell may be disposed at a position where (an)other battery cell(s) is (are) interposed between the first battery cell and a wall surface of the case with respect to a direction orthogonal to a longitudinal direction of the first battery cell. The second battery cell may be disposed at a position where no other battery cell is interposed between the second battery cell and the wall surface of the case with respect to a direction orthogonal to a longitudinal direction of the second battery cell.

Generally, in a battery pack that accommodates a plurality of battery cells in a case, heat dissipation from an outer surface of the case to air outside of the case occurs. Since another battery cell is interposed between the first battery cell and the wall surface of the case in the above-described configuration, heat dissipation via the wall surface of the case is difficult, and thus the first battery cell tends to have a high temperature. Furthermore, since no other battery cell is interposed between the second battery cell and the wall surface of the case, heat dissipation tends to occur via the wall surface of the case, and thus the second battery cell tends to have a low temperature. In the above-described configuration, the temperature of the first battery cell, which tends to have a high temperature, can be obtained using the first thermistor, and the temperature of the second battery cell, which tends to have a low temperature, can be obtained using the second thermistor. According to the above-described configuration, the temperature of a battery cell having a high temperature as well as the temperature of a battery cell having a low temperature can be obtained in a battery pack comprising a plurality of battery cells.

In one or more embodiments, the case may comprise an air supply hole through which air is introduced and an air discharge hole through which air is discharged.

According to the above-described configuration, the temperature of a battery cell having a high temperature as well as the temperature of a battery cell having a low temperature can be obtained in a battery pack that cools a plurality of battery cells by using air that flows in the interior of the case from the air supply hole to the air discharge hole.

In one or more embodiments, the second thermistor may be disposed at a position where the distance from the position to the air supply hole is smaller than the distance from the position to the air discharge hole.

In a battery pack that cools a plurality of battery cells by using air that flows in the interior of the case from the air supply hole to the air discharge hole, air immediately after flowing into the air supply hole will have the lowest temperature and air immediately before flowing out from the air discharge hole will have the highest temperature. Therefore, a battery cell disposed close to the air supply hole will tend to have a low temperature, while a battery cell disposed close to the air discharge hole will tend to have a high temperature. According to the above-described configuration, the temperature of a battery cell having a lower temperature can be obtained using the second thermistor.

In one or more embodiments, the first thermistor may be disposed at a position where the distance from the position to the air discharge hole is smaller than the distance from the position to the air supply hole.

In a battery pack that cools a plurality of battery cells by using air that flows in the interior of the case from the air supply hole to the air discharge hole, a battery cell disposed close to the air supply hole will tend to have a low temperature, while a battery cell disposed close to the air discharge hole will tend to have a high temperature. According to the above-described configuration, the temperature of a battery cell having a higher temperature can be obtained using the first thermistor.

In one or more embodiments, the battery pack may further comprise a circuit board accommodated in the case and disposed between the air discharge hole and the plurality of battery cells. Each of the first thermistor and the second thermistor may be connected to the circuit board. The first thermistor may comprise a film thermistor. The second thermistor may comprise a dip thermistor.

Generally, although film thermistors have high detection accuracy for temperature, it is difficult to extend them to a position spaced apart from the circuit board. Conversely, although dip thermistors have low detection accuracy for temperature, they can be easily extended to a position spaced apart from the circuit board. According the above-described configuration, because the circuit board is disposed between the air discharge hole and the plurality of battery cells, it is possible to obtain the temperature of a high-temperature battery cell with high accuracy by obtaining the temperature of a battery cell disposed close to the air discharge hole, that is, the temperature of a battery cell that tends to have a high temperature, using the first thermistor that comprises a film thermistor. Further, according the above-described configuration, even with the circuit board disposed between the air discharge hole and the plurality of battery cells, the temperature of a battery cell disposed close to the air supply hole, that is, the temperature of a battery cell that tends to have a low temperature, can be obtained using the second thermistor that comprises a dip thermistor.

In one or more embodiments, a battery pack may comprise: a plurality of battery cells that includes a first battery cell and a second battery cell; a first thermistor disposed closest to the first battery cell among the plurality of battery cells; a second thermistor disposed closest to the second battery cell among the plurality of battery cells; and a case accommodating the plurality of battery cells, the first thermistor, and the second thermistor. The plurality of battery cells may comprise: an upper battery cell group disposed in an upper row; a lower battery cell group disposed in a lower row; and a middle battery cell group disposed between the upper battery cell group and the lower battery cell group. The first battery cell may be included in the middle battery cell group. The second battery cell may be included in either the upper battery cell group or the lower battery cell group.

Since other battery cells are interposed between the first battery cell and upper and lower surfaces of the case in the above-described configuration, heat dissipation via the upper and lower surfaces of the case is difficult, and thus the first battery cell tends to have a high temperature. Furthermore, since no other battery cell is interposed between the second battery cell and the upper or lower surface of the case, the heat dissipation tends to occur via the upper or lower surface of the case, and thus the second battery cell tends to have a low temperature. In the above-described configuration, the temperature of the first battery cell, which tends to have a high temperature, can be obtained using the first thermistor, and also the temperature of the second battery cell, which tends to have a low temperature, can be obtained using the second thermistor. According to the above-described configuration, the temperature of a battery cell having a high temperature as well as the temperature of a battery cell having a low temperature can be obtained in a battery pack comprising a plurality of battery cells.

In one or more embodiments, a battery pack may comprise: a plurality of battery cells that includes a first battery cell and a second battery cell; a first thermistor disposed closest to the first battery cell among the plurality of battery cells; a second thermistor disposed closest to the second battery cell among the plurality of battery cells; and a case accommodating the plurality of battery cells, the first thermistor and the second thermistor. The plurality of battery cells may comprise: an upper battery cell group disposed at a position facing an upper surface of the case; a lower battery cell group disposed at a position facing a lower surface of the case; and a middle battery cell group disposed between the upper battery cell group and the lower battery cell group. The first battery cell may be included in the middle battery cell group. The second battery cell may be included in either the upper battery cell group or the lower battery cell group.

Since other battery cells are interposed between the first battery cell and upper and lower surfaces of the case in the above-described configuration, the heat dissipation via the upper and lower surfaces of the case is difficult, and thus the first battery cell tends to have a high temperature. Furthermore, since no other battery cell is interposed between the second battery cell and the upper or lower surface of the case, heat dissipation tends to occur via the upper or lower surface of the case, and thus the second battery cell tends to have a low temperature. In the above-described configuration, the temperature of the first battery cell, which tends to have a high temperature, can be obtained using the first thermistor, and the temperature of the second battery cell, which tends to have a low temperature, can be obtained using the second thermistor. According to the above-described configuration, the temperature of a battery cell having a high temperature as well as the temperature of a battery cell having a low temperature can be obtained in a battery pack comprising a plurality of battery cells.

Embodiments

A power supply system 600, which is shown in FIG. 1, comprises a battery pack 2, an electrical device 200, and a charger 400. The battery pack 2 can be detachably attached to the electrical device 200. The electrical device 200 may be, for example, an electric power tool such as an electric drill, an electric grinder, electric circular saw, an electric chain saw, an electric reciprocating saw or the like; it may be an electric work machine such as an electric mower, an electric trimmer, an electric blower or the like; or it may be another electrical device such as a light, a radio or the like. When attached to the electrical device 200, the battery pack 2 supplies power to the electrical device 200. The battery pack 2 also can be detachably attached to the charger 400. When attached to the charger 400, the battery pack 2 is supplied with power from the charger 400.

Figure 2:
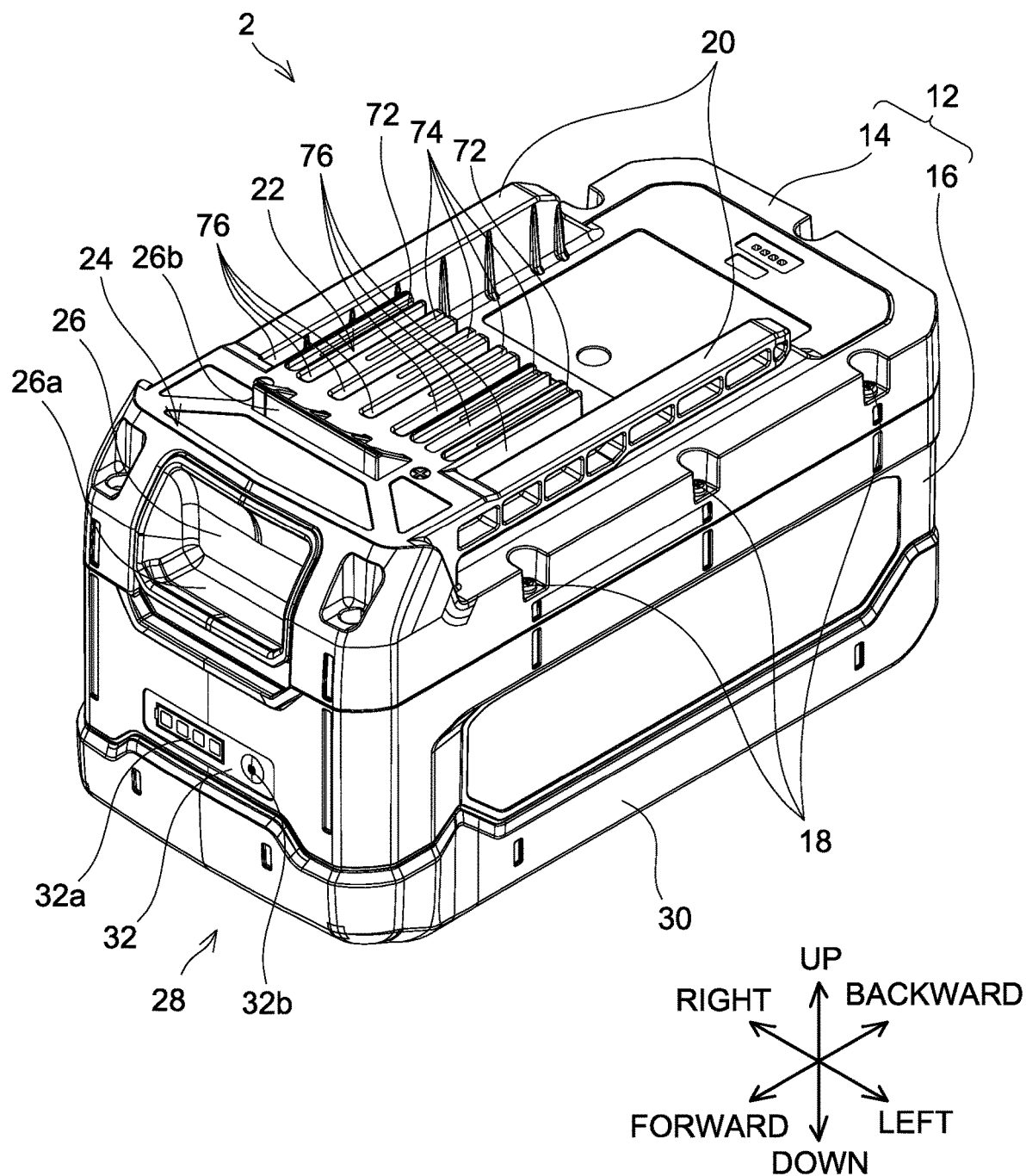
FIG. 2 is a perspective view of a battery pack 2 according to an embodiment, as viewed from the upper front left side.
Figure 3:
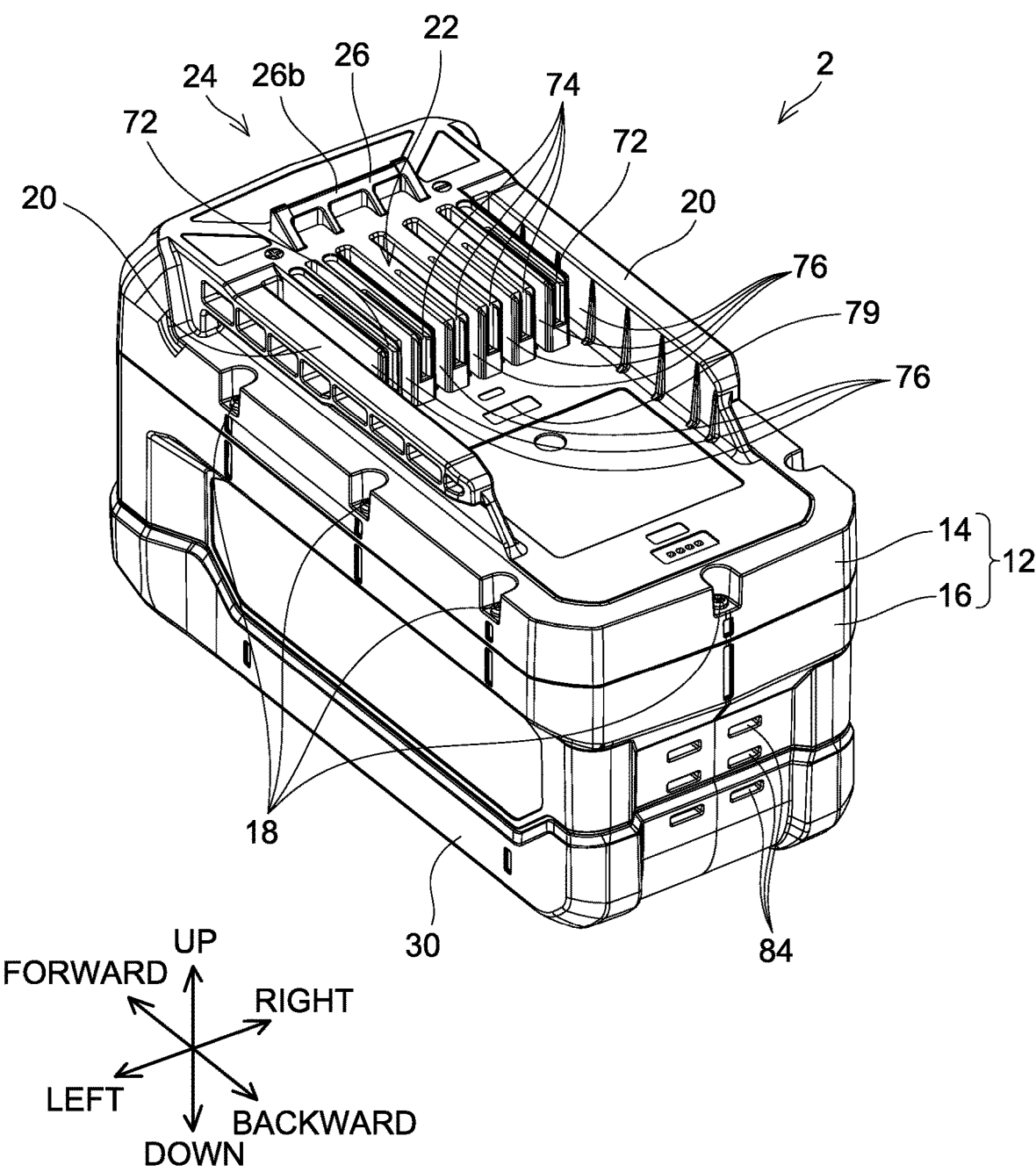
FIG. 3 is a perspective view of the battery pack 2 according to the embodiment, as viewed from the upper rear left side.
Figure 4:
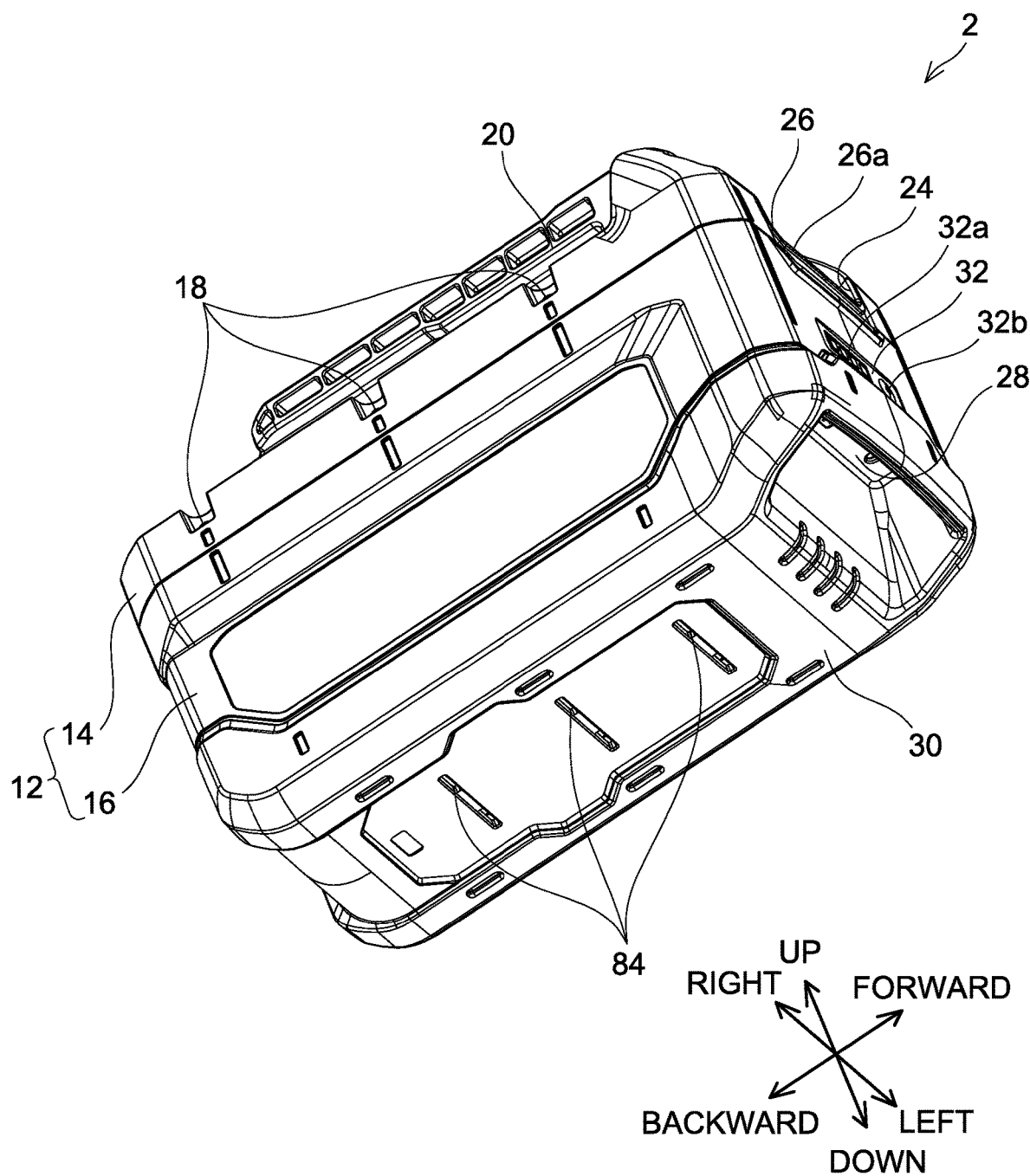
FIG. 4 is a perspective view of the battery pack 2 according to the embodiment, as viewed from the lower front right side.

As shown in FIGS. 2 to 4, the battery pack 2 comprises a battery module 10 (see FIGS. 5 to 7) and a case 12 accommodating the battery module 10. It is noted that, in the following description, when the battery pack 2 is attached to the electrical device 200 or the charger 400, the direction in which the electrical device 200 or the charger 400 is located as viewed from the battery pack 2 will be referred to as upward, and the opposite direction will be referred to as downward. Further, the direction in which the battery pack 2 is slid when being attached to the electrical device 200 or the charger 400 will be referred to as rearward, and the direction in which the battery pack 2 is slid when being detached from the electrical device 200 or the charger 400 will be referred to as frontward. That is, in the following description, the front-rear direction corresponds to the sliding direction in which the battery pack 2 is slid with respect to the electrical device 200 or the charger 400.

The nominal voltage of the battery pack 2 is, for example, 64 V. The nominal capacity of the battery pack 2 is, for example, 5 Ah. The dimension of the battery pack 2 in the front-rear direction is, for example, approximately 220 mm. The dimension of the battery pack 2 in the up-down direction is, for example, approximately 130 mm. The dimension of the battery pack 2 in the right-left direction is, for example, approximately 110 mm. The weight of the battery pack 2 is, for example, approximately 2 kg. The nominal voltage, dimensions, and weight of the battery pack 2 vary depending on the number of battery cells 40 (to be described later) or the like, and the aforementioned numerical values are merely examples.

With regard to the case 12, overall it is formed in a substantially cuboid shape, and the case 12 is divided into an upper case 14 and a lower case 16. The upper case 14 and the lower case 16 are each composed of an insulating material such as a resin. The upper case 14 and the lower case 16 are fixed to each other by metal screws 18.

As shown in FIG. 2, slide rails 20, a terminal receiver portion 22, and a hook mount portion 24 are formed on the upper case 14. The slide rails 20 extend along the front-rear direction and are respectively disposed at right and left edges of an upper portion of the upper case 14. The slide rails 20 slidably engage with slide rails 210 (see FIG. 19) of the electrical device 200 or slide rails 414 (see FIG. 23) of the charger 400 when the battery pack 2 is attached to and detached from the electrical device 200 or the charger 400. The terminal receiver portion 22 is disposed between the left and right slide rails 20 and receives power terminals 204 and signal terminals 206 (see FIG. 19) of the electrical device 200 or power terminals 410 and signal terminals 412 (see FIG. 23) of the charger 400 when the battery pack 2 is attached to the electrical device 200 or the charger 400. The hook mount portion 24 is disposed at an upper front portion of the upper case 14. A hook 26 is provided on the hook mount portion 24. The hook 26 is a resin member and comprises a manipulation portion 26a and an engaging portion 26b. The hook 26 is held by the upper case 14 and in a movable manner in the up-down direction. The hook 26 is biased upward by a not shown compression spring and moves downward when the manipulation portion 26a and/or the engaging portion 26b are pressed downward. The engaging portion 26b engages with a housing (not shown) of the electrical device 200 or a housing 402 (see FIG. 22) of the charger 400 when the battery pack 2 is attached to the electrical device 200 or the charger 400 to fix the battery pack 2 to the electrical device 200 or the charger 400. To detach the battery pack 2 from the electrical device 200 or the charger 400, a user moves the engaging portion 26b downward by pressing the manipulation portion 26a downward. By sliding the battery pack 2 in this state, the battery pack 2 can be detached from the electrical device 200 or the charger 400. The manipulation portion 26a has a shape that is concaved downward from a front side toward a rear side. Therefore, when the user presses the manipulation portion 26a downward with his/her finger placed on the manipulation portion 26a, the user can press the manipulation portion 26a downward without the finger slipping therefrom.

As shown in FIG. 4, a gripping recess 28 is provided in the lower case 16. The gripping recess 28 is disposed at a lower front portion of the lower case 16. The gripping recess 28 opens downward. The user can lift and carry the battery pack 2 with his/her index, middle, ring and little fingers placed in the gripping recess 28. Further, the user can detach the battery pack 2 from the electrical device 200 or the charger 400 with one hand by pressing down the manipulation portion 26a with the thumb while placing the index, middle, ring and little fingers in the gripping recess 28. A protective layer 30 is provided on a lower portion of the lower case 16. The protective layer 30 is, for example, an elastomer. The protective layer 30 covers vicinities of corners of a lower surface of the lower case 16. Therefore, if the battery pack 2 is dropped, damage to the corners of the lower case 16 can be mitigated. The protective layer 30 also covers the interior of the gripping recess 28. Therefore, when the user lifts the battery pack 2 with fingers placed in the gripping recess 28, the load applied to the user's fingers can be dispersed.

As shown in FIG. 2, a display portion 32 is provided on a front surface of the lower case 16. The display portion 32 comprises an indicator 32a that shows the user the remaining amount of charge in the battery pack 2 and a button 32b that switches ON/OFF the display of the indicator 32a. The display portion 32 is disposed on an outer surface of the case 12 between the manipulation portion 26a of the hook 26 and the gripping recess 28. Therefore, when the user attaches or detaches the battery pack 2 to or from the electrical device 200 or the charger 400 with the fingers placed on the manipulation portion 26a and in the gripping recess 28, the user can easily check the remaining amount of charge in the battery pack 2 via the display portion 32.

Figure 5:
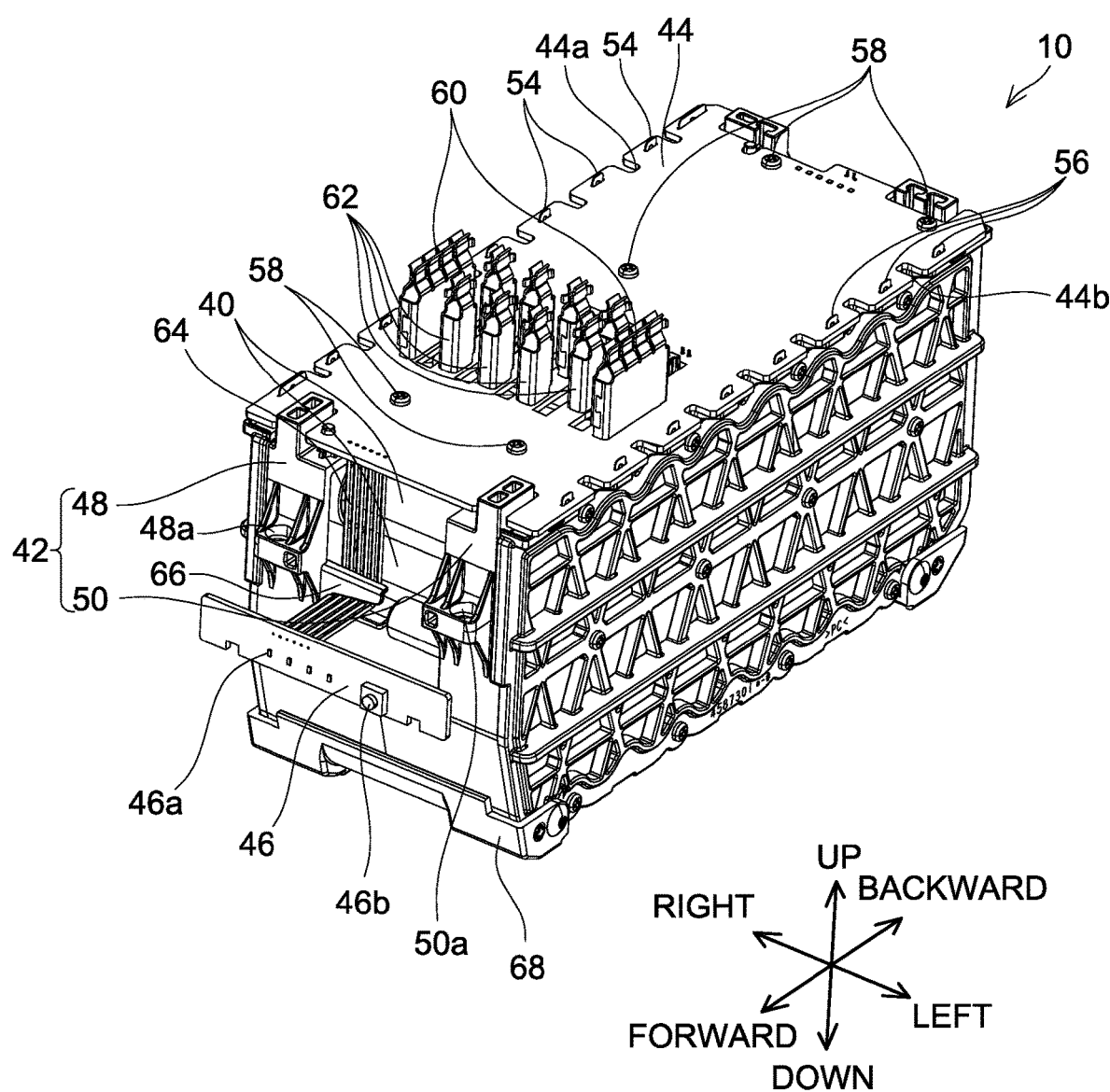
FIG. 5 is a perspective view of a battery module 10 of the battery pack 2 according to the embodiment, as viewed from the upper front left side.
Figure 6:
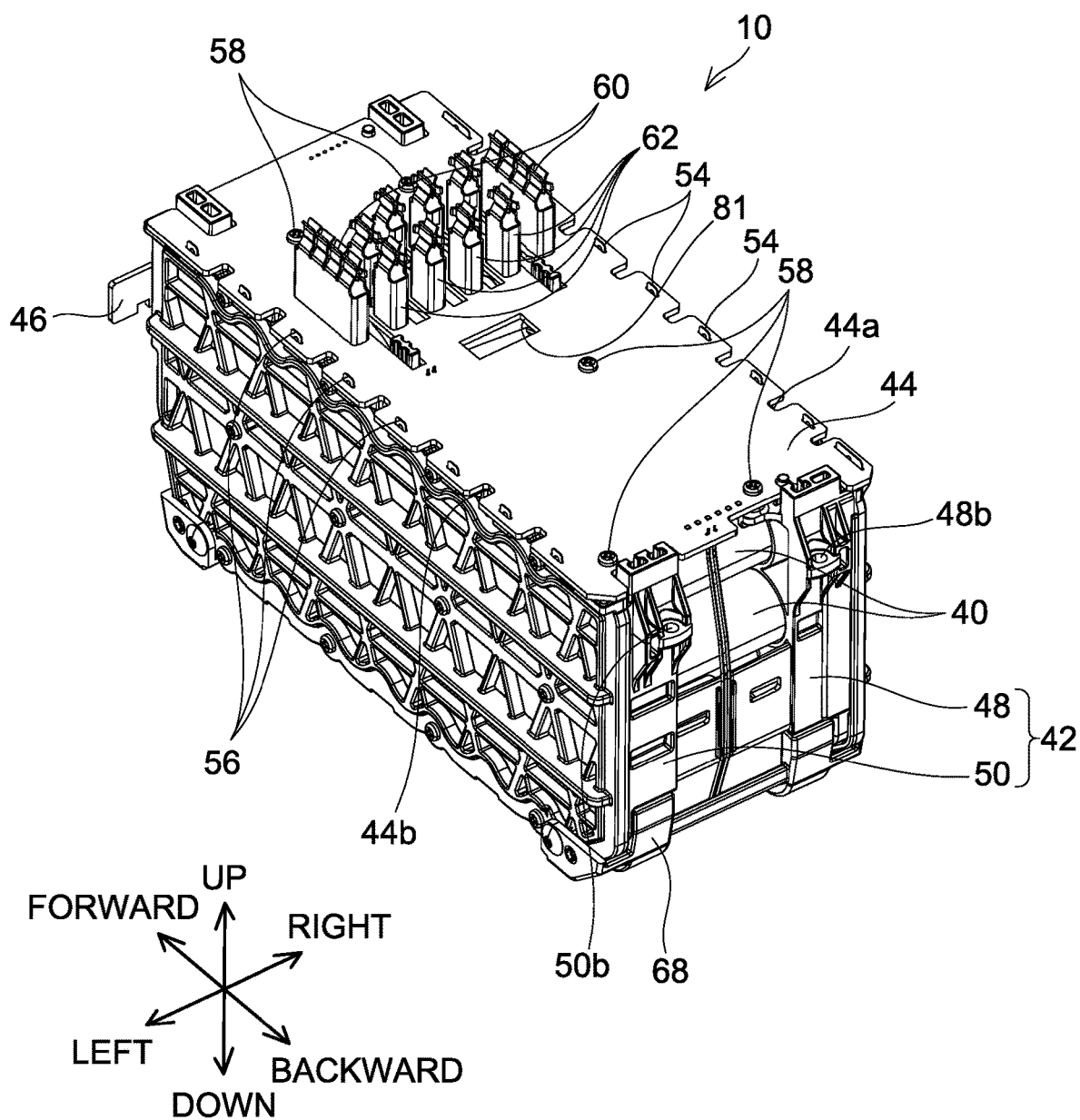
FIG. 6 is a perspective view of the battery module 10 of the battery pack 2 according to the embodiment, as viewed from the upper rear left side.
Figure 7:
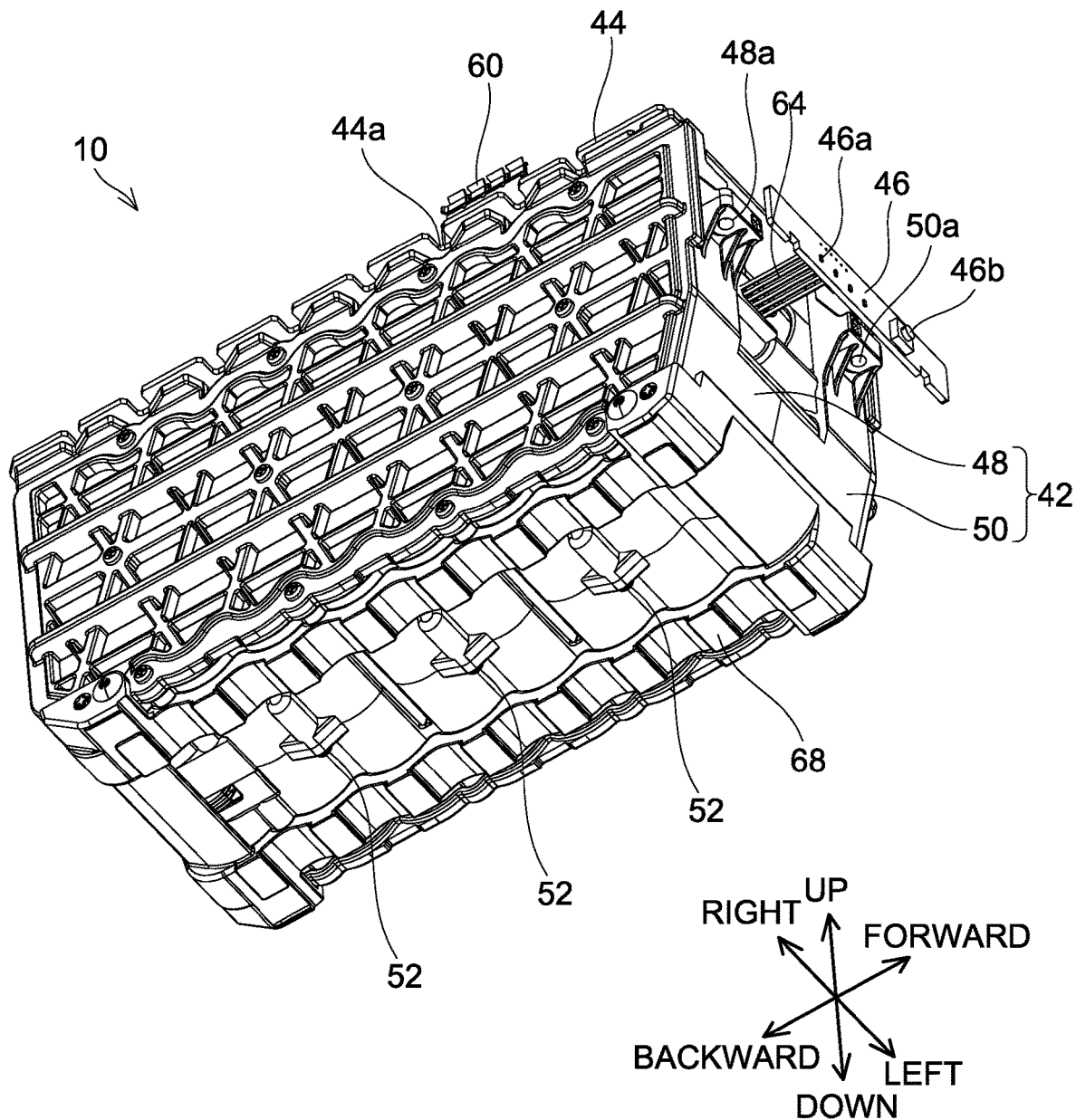
FIG. 7 is a perspective view of the battery module 10 of the battery pack 2 according to the embodiment, as viewed from the lower front right side.

As shown in FIGS. 5 to 7, the battery module 10 comprises the plurality of battery cells 40, the cell holder 42 holding the plurality of battery cells 40, a control circuit board 44 fixed to the cell holder 42, and a display circuit board 46 connected to the control circuit board 44.

Figure 8:
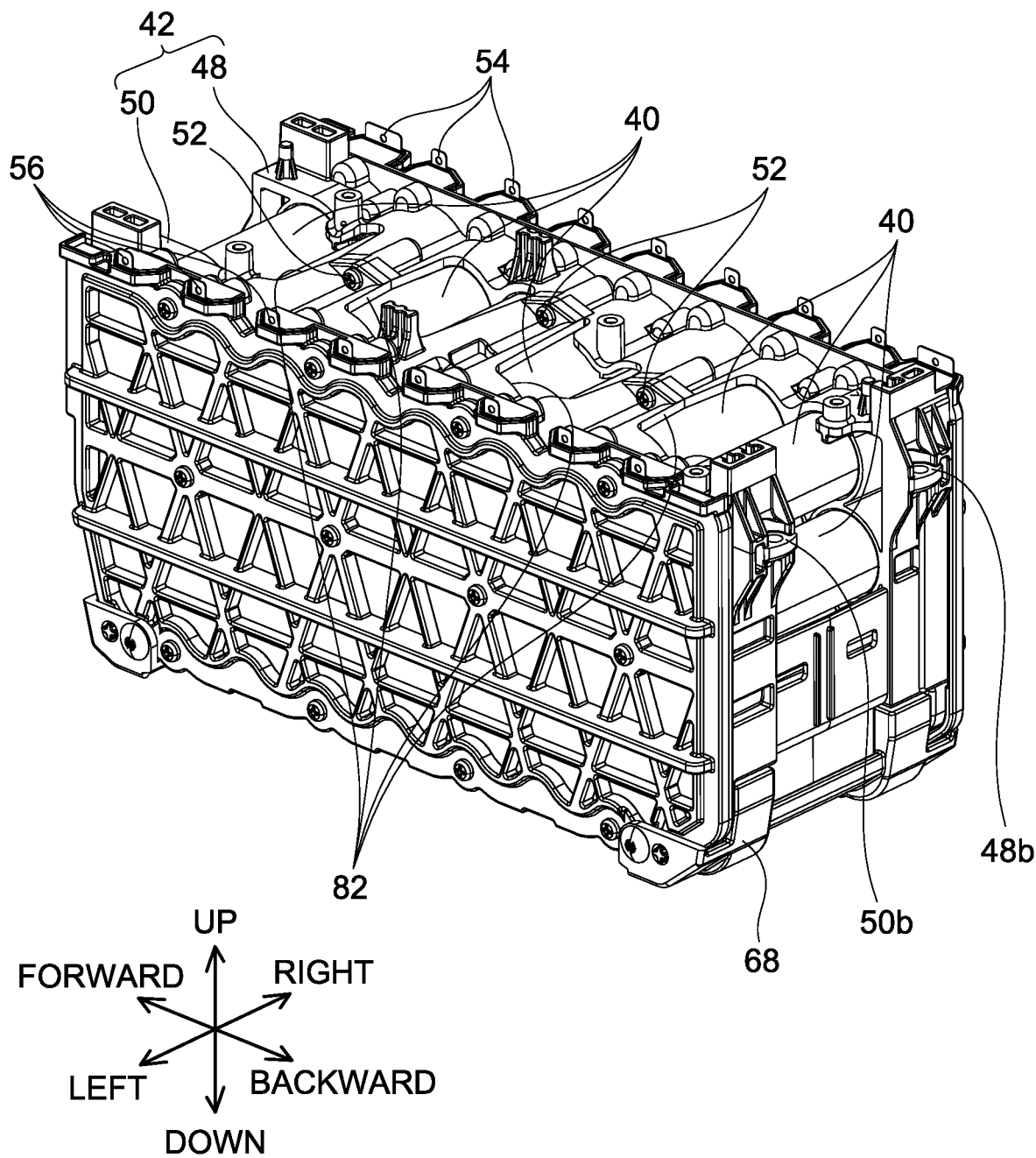
FIG. 8 is a perspective view of a plurality of battery cells 40 and a cell holder 42 of the battery pack 2 according to the embodiment, as viewed from the upper rear left side.

Each of the battery cells 40 is a secondary battery cell, such as a lithium ion battery cell, having a substantially cylindrical shape, in which a positive electrode is formed at one end, and a negative electrode is formed at the other end. As shown in FIG. 8, the battery cells 40 are arranged such that their longitudinal direction is along the right-left direction. The battery cells 40 are arranged side by side in the up-down direction and in the front-rear direction. In the present embodiment, the battery cells 40 are arranged four abreast in the up-down direction and are arranged eight abreast in the front-rear direction. The nominal voltage of each battery cell 40 is, for example, 4 V. The nominal capacity of each battery cell 40 is, for example, 2.5 Ah. The cell holder 42 is a resin member and is divided into a right cell holder 48 and a left cell holder 50. The right cell holder 48 holds vicinities of right ends of the plurality of battery cells 40. The left cell holder 50 holds vicinities of left ends of the plurality of battery cells 40. The right cell holder 48 and the left cell holder 50 are fixed to each other by metal screws 52. The right cell holder 48 comprises a plurality of lead plates 54 that contact the electrodes (the positive or negative electrodes) disposed at the right ends of the battery cells 40. The left cell holder 50 comprises a plurality of lead plates 56 that contact the electrodes (the positive or negative electrodes) disposed at the left ends of the battery cells 40. As shown in FIG. 5, each of the plurality of lead plates 54, 56 is connected to the control circuit board 44 which is disposed on top of the cell holder 42.

The control circuit board 44 is fixed to the cell holder 42 by metal screws 58 in the state in which it has been placed on an upper portion of the cell holder 42. On the control circuit board 44 are provided a pair of power terminals 60 used for discharging or charging and a plurality of signal terminals 62 used for transmitting and receiving signals when the battery pack 2 is attached to the electrical device 200 or the charger 400. The pair of power terminals 60 is disposed at positions that sandwich the plurality of signal terminals 62 on both the right and left sides.

Figure 9:
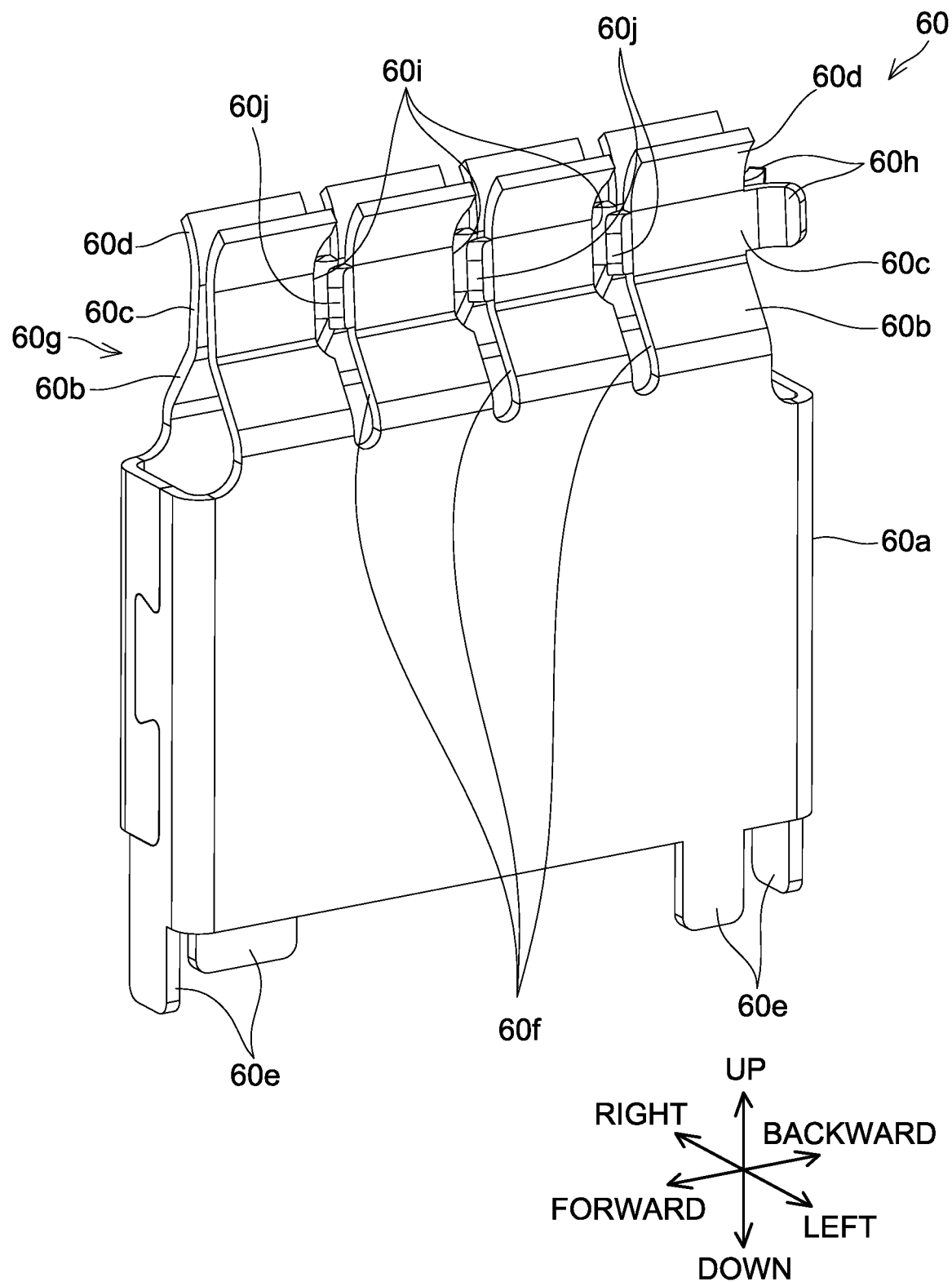
FIG. 9 is a perspective view of a power terminal 60 of the battery pack 2 according to the embodiment, as viewed from the upper front left side.
Figure 10:
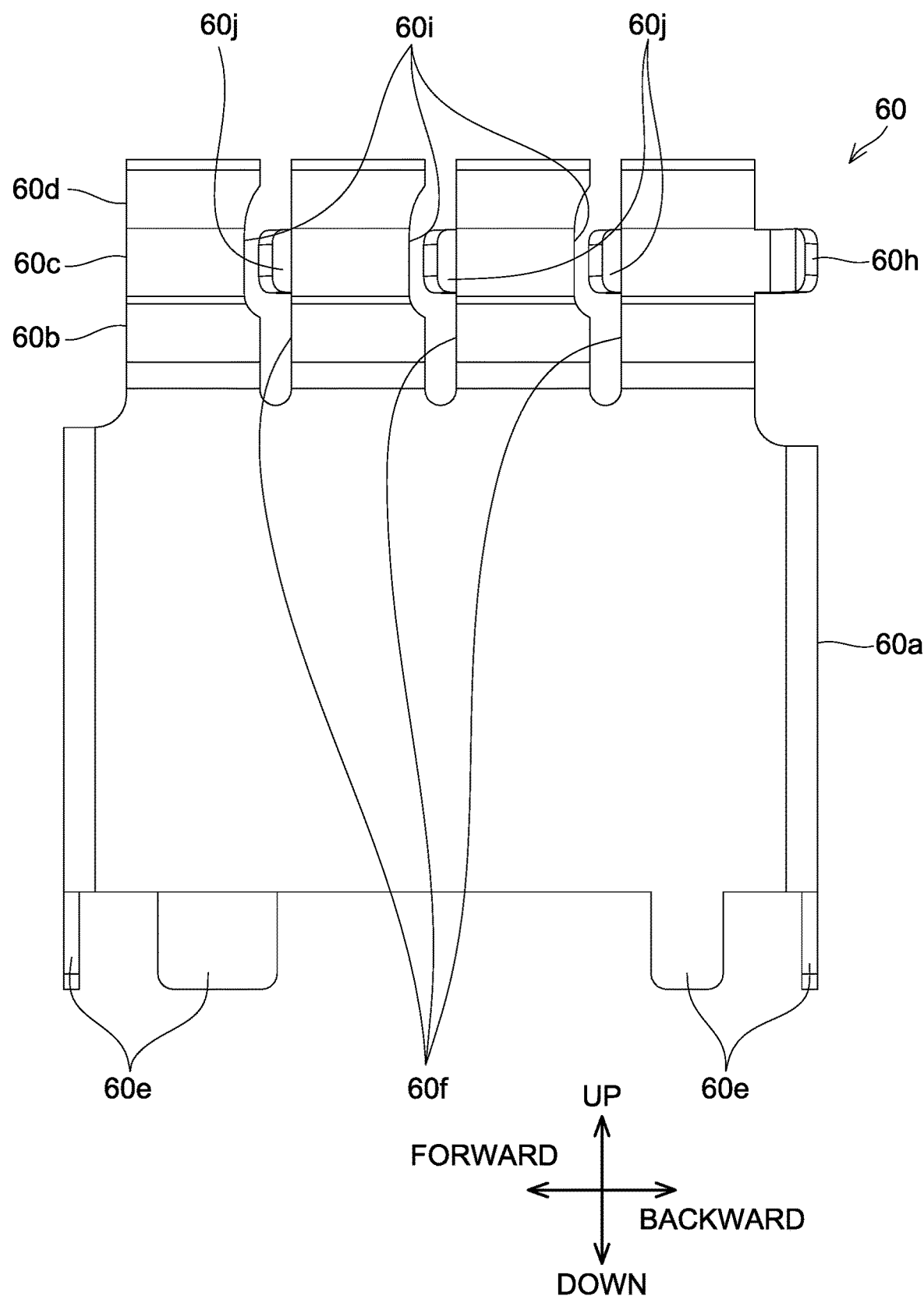
FIG. 10 is a left-side view of the power terminal 60 of the battery pack 2 according to the embodiment, as viewed from the left side.
Figure 11:
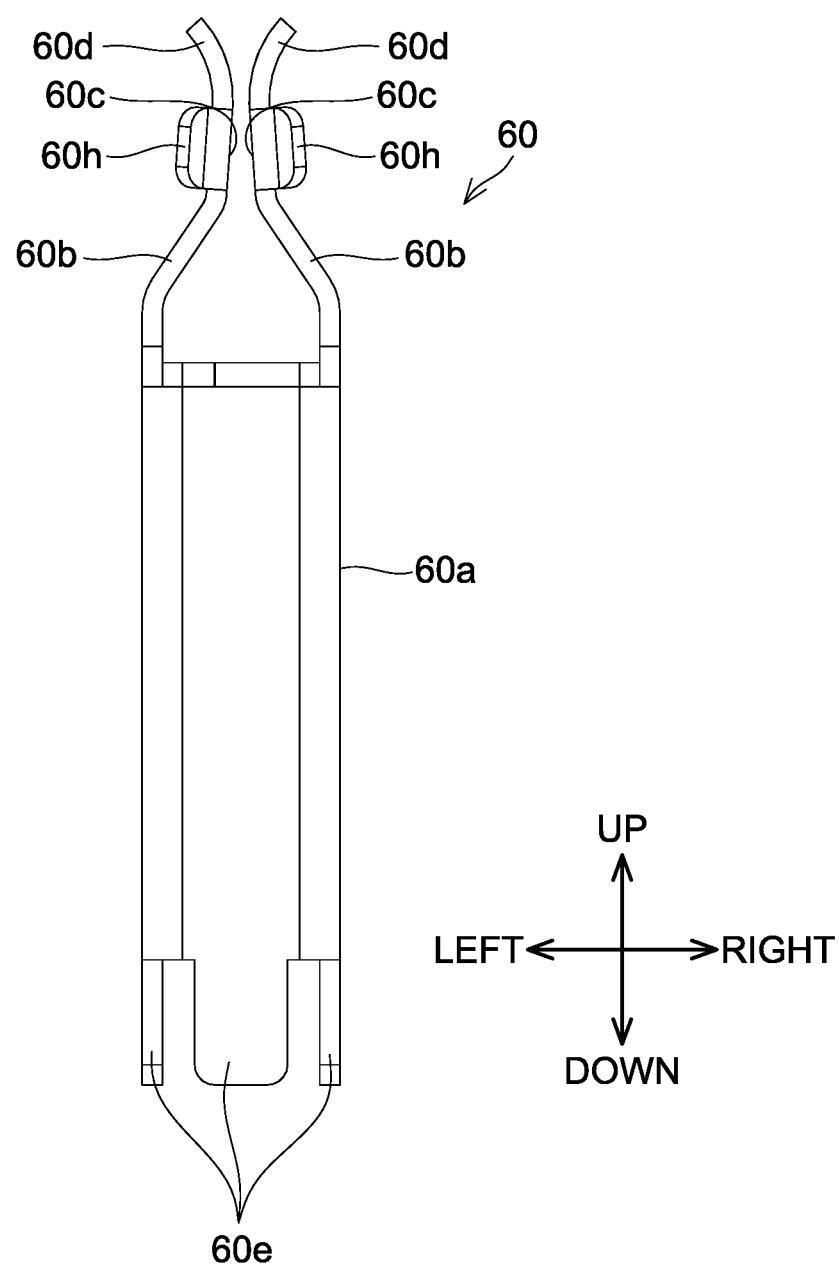
FIG. 11 is a rear view of the power terminal 60 of the battery pack 2 according to the embodiment, as viewed from the rear side.

As shown in FIGS. 9 to 11, the power terminals 60 are fabricated by cutting and bending a metal plate. The power terminals 60 comprise a support portion 60a, lower bent portions 60b, holder portions 60c, and upper bent portions 60d. The support portion 60a is formed into a substantially rectangular tube shape that extends in the up-down direction. A cross section of the support portion 60a is a substantially rectangular shape whose longitudinal direction is along the front-rear direction. Downward-protruding support ribs 60e are formed at a lower end of the support portion 60a. The support ribs 60e fix the power terminal 60 to the control circuit board 44 and electrically connect the power terminal 60 to the control circuit board 44.

The lower bent portions 60b are formed on both the left and right sides of the support portion 60a. The lower bent portions 60b are formed into a shape that is bent inward from an upper end of the support portion 60a. The holder portions 60c are formed into a flat plate shape that is bent and extends slightly outward from upper ends of the lower bent portions 60b. When the power terminals 204 or the power terminals 410 are engaged in the power terminals 60, an inclination angle of each holder portion 60c is adjusted such that it becomes a parallel angle with a surface of the power terminal 204 of the electrical device 200 or with a surface of the power terminal 410 of the charger 400; that is, it becomes an angle that achieves surface contact with a surface of the power terminal 204 or with a surface of the power terminal 410. The upper bent portions 60d are formed into a shape that is bent outward from upper ends of the holder portions 60c.

A plurality of slits 60f is formed in the power terminals 60. Each of the slits 60f is formed into a U-shape that extends from the upper ends of the upper bent portions 60*d* to lower ends of the lower bent portions 60*b*. Hereinbelow, in combination, the lower bent portions 60*b*, the holder portions 60*c*, and the upper bent portions 60*d*, which have been divided by the slits 60*f*, will be referred to as elastic holder piece pairs 60*g* of the power terminal 60. That is, the power terminals 60 comprise the support portion 60*a* and the plurality of elastic holder piece pairs 60*g* that extend upward from the support portion 60*a*.

Upon insertion of the power terminals 204 or the power terminals 410 into the power terminals 60, front edges of the power terminals 204 or the power terminals 410 penetrate between the elastic holder piece pairs 60*g* of the power terminals 60; as a result, the elastic holder piece pairs 60*g* open outward and the power terminals 204 or the power terminals 410 are held by the elastic holder piece pairs 60*g*. At this time, by pressing the holder portions 60*c* of the power terminals 60 against the power terminals 204 or the power terminals 410 owing to the elastic restoring force of the elastic holder piece pairs 60*g*, the power terminals 60 engage with the power terminals 204 or the power terminals 410. That is, when the battery pack 2 has been attached to the electrical device 200 or the charger 400, the elastic holder piece pairs 60*g* receive the power terminals 204 or the power terminals 410 and hold the power terminals 204 or the power terminals 410 from both sides. On the other hand, when the power terminals 204 or the power terminals 410 are pulled out from the power terminals 60, the engagement of the power terminals 60 with the power terminals 204 or the power terminals 410 is released. Then, the elastic holder piece pairs 60*g* return to their original shape owing to the elastic restoring force of the elastic holder piece pairs 60*g*.

In each of the power terminals 60, insertion guide ribs 60*h* are formed at rear ends of the rearmost elastic holder piece pair 60*g*, namely, the elastic holder piece pair 60*g* that is the first to receive the power terminal 204 or the power terminal 410 upon attachment of the battery pack 2 to the electrical device 200 or the charger 400. The insertion guide ribs 60*h* are formed into a shape that extends rearward from rear ends of the holder portions 60*c* and is bent outward. By forming the insertion guide ribs 60*h*, insertion of the power terminals 204 or the power terminals 410 can be performed smoothly.

In each of the power terminals 60, insertion guide recesses 60*i* are formed in rear ends of the elastic holder piece pairs 60*g* other than the rearmost elastic holder piece pair 60*g*. The insertion guide recesses 60*i* are formed by cutting out, from the rear edges of the elastic holder piece pairs 60*g*, the lower bent portion 60*b*, the holder portion 60*c*, the upper bent portion 60*d* into a substantially arc notch. By forming the insertion guide recesses 60*i*, insertion of the power terminals 204 or the power terminals 410 can be performed smoothly.

In each of the power terminals 60, removal guide ribs 60*j* are formed at front ends of the elastic holder piece pairs 60*g* other than the frontmost elastic holder piece pair 60*g*. The removal guide ribs 60*j* are formed into a shape that extends forward from the front ends of the holder portions 60*c* and is bent outward. By forming the removal guide ribs 60*j*, removal of the power terminals 204 or the power terminals 410 can be performed smoothly.

Figure 12:
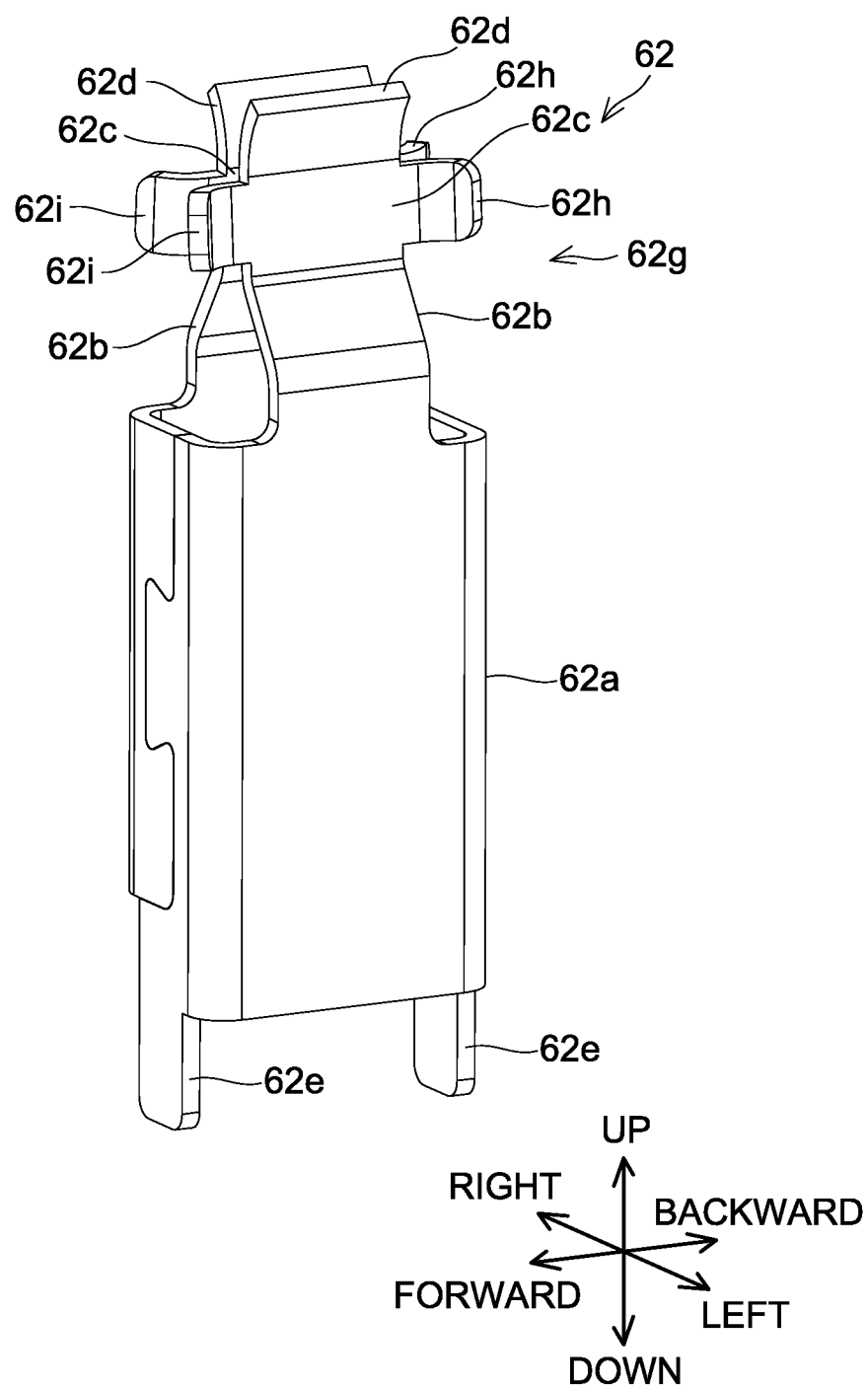
FIG. 12 is a perspective view of a signal terminal 62 of the battery pack 2 according to the embodiment, as viewed from the upper front left side.
Figure 13:
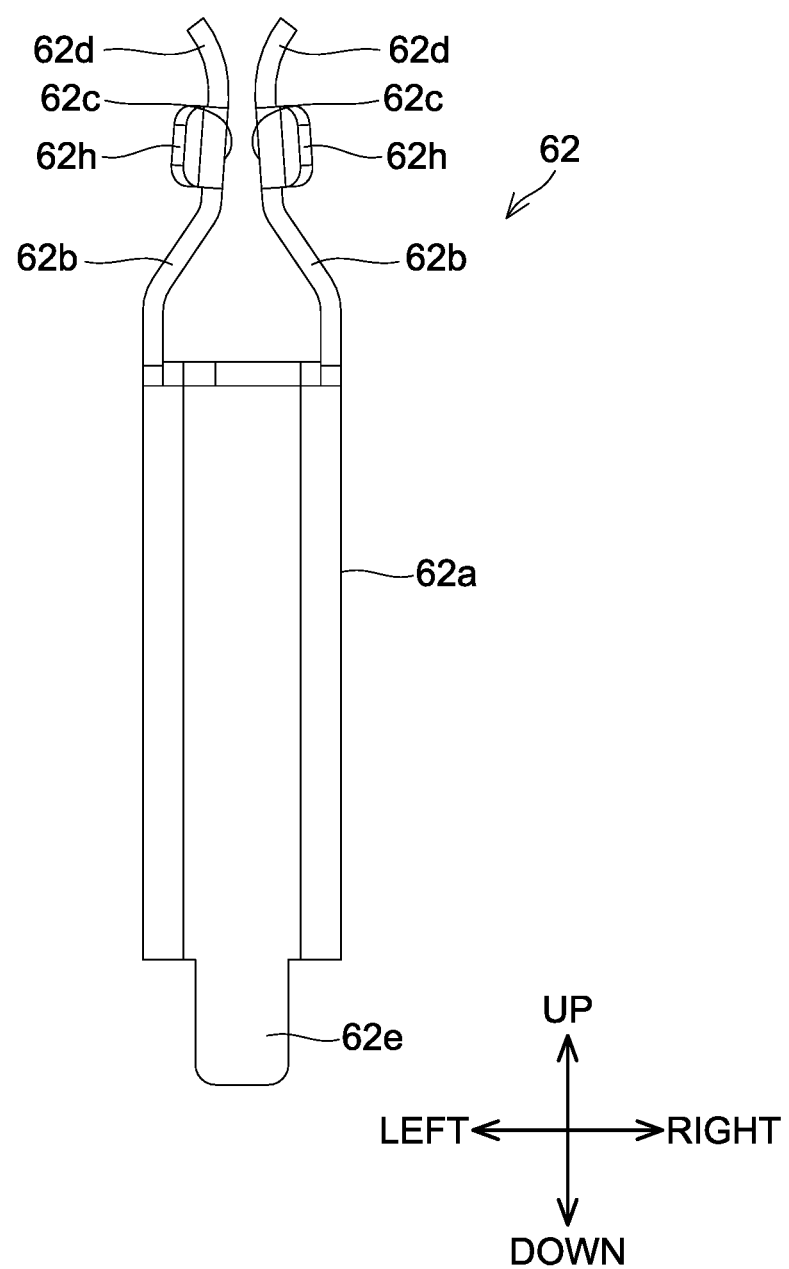
FIG. 13 is a rear view of the signal terminal 62 of the battery pack 2 according to the embodiment, as viewed from the rear side.

As shown in FIGS. 12 and 13, the signal terminals 62 are fabricated by cutting and bending a metal plate. The signal terminals 62 comprise a support portion 62*a*, lower bent portions 62*b*, holder portions 62*c*, and upper bent portions 62*d*. The support portion 62*a* is formed into a substantially rectangular tube shape extending in the up-down direction. A cross section of the support portion 62*a* is a substantially rectangular shape whose longitudinal direction is along the front-rear direction. Downward-protruding support ribs 62*e* are formed at a lower end of the support portion 62*a*. The support ribs 62*e* fix the signal terminal 62 to the control circuit board 44 and electrically connect the signal terminal 62 to the control circuit board 44.

The lower bent portions 62*b* are formed on both left and right sides of the support portion 62*a*. The lower bent portions 62*b* are formed into a shape that is bent inward from an upper end of the support portion 62*a*. The holder portions 62*c* are formed into a flat plate shape that extends and is bent slightly outward from upper ends of the corresponding lower bent portions 62*b*. When the signal terminals 206 or the signal terminals 412 are engaged in the signal terminals 62, an inclination angle of each holder portion 62*c* is adjusted such that it becomes a parallel angle with a surface of the signal terminal 206 of the electrical device 200 or with a surface of the signal terminal 412 of the charger 400; that is, it becomes an angle that achieves surface contact with a surface of the signal terminal 206 or a surface of the signal terminal 412. The upper bent portions 62*d* are formed into a shape that is bent outward from upper ends of the holder portions 62*c*. Hereinbelow, in combination, the lower bent portions 62*b*, the holder portions 62*c*, and the upper bent portions 62*d* will be referred to as elastic holder piece pairs 62*g* of the signal terminals 62. That is, the signal terminals 62 comprise the support portion 62*a* and the elastic holder piece pair 62*g* that extends upward from the support portion 62*a*.

Upon insertion of the signal terminals 206 or the signal terminals 412 into the signal terminals 62, front edges of the signal terminals 206 or the signal terminals 412 penetrate between the elastic holder piece pair 62*g* of the signal terminals 62; as a result, the elastic holder piece pairs 62*g* open outward and the signal terminals 206 or the signal terminals 412 are held by the elastic holder piece pairs 62*g*. At this time, by pressing the holder portions 62*c* of the signal terminals 62 against the signal terminals 206 or the signal terminals 412 owing to the elastic restoring force of the elastic holder piece pairs 62*g*, the signal terminals 62 engage with the signal terminals 206 or the signal terminals 412. That is, when the battery pack 2 is attached to the electrical device 200 or the charger 400, the elastic holder piece pairs 62*g* receive the signal terminals 206 or the signal terminals 412 and hold the signal terminals 206 or the signal terminals 412 from both sides. On the other hand, when the signal terminals 206 or the signal terminals 412 are pulled out from the signal terminals 62, the engagement of the signal terminals 62 with the signal terminals 206 or the signal terminals 412 is released. Then, the elastic holder piece pairs 62*g* return to their original shape owing to the elastic restoring force of the elastic holder piece pairs 62*g*.

In each of the signal terminal 62, insertion guide ribs 62*h* are formed at rear ends of the elastic holder piece pair 62*g*. Each of the insertion guide ribs 62*h* are formed into a shape that extends rearward from a rear end of its corresponding holder portion 62*c* and is bent outward. By forming the insertion guide ribs 62*h*, insertion of the signal terminals 206 or the signal terminals 412 can be performed smoothly.

In each of the signal terminals 62, removal guide ribs 62*i* are formed at front ends of the elastic holder piece pair 62*g*. The removal guide ribs 62*i* are formed into a shape that extends frontward from a front end of its corresponding holder portion 62*c* and is bent outward. By forming the removal guide ribs 62*i*, removal of the signal terminals 206 or the signal terminals 412 can be performed smoothly.

As shown in FIG. 5, the display circuit board 46 is connected to the control circuit board 44 via signal lines 64. The display circuit board 46 is disposed near a rear surface of the display portion 32 of the lower case 16. The display circuit board 46 comprises LEDs 46a that change the display contents of the indicator 32a and a switch 46b that detects a manipulation on the button 32b. It is noted that a guide 66 that holds the signal lines 64 is formed on the right cell holder 48 so that the signal lines 64 do not loosen.

Figure 14:
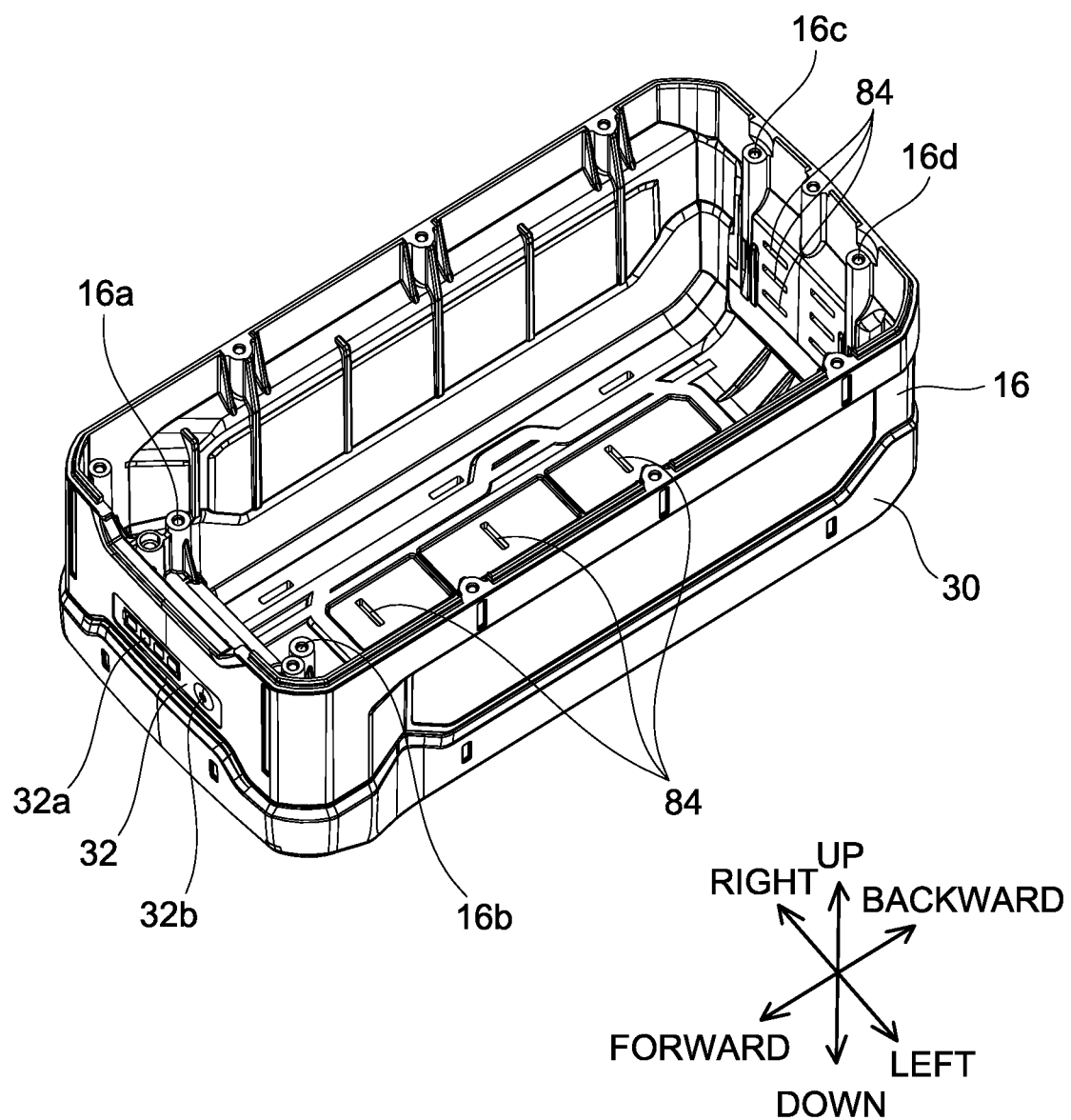
FIG. 14 is a perspective view of a lower case 16 of the battery pack 2 according to the embodiment, as viewed from the upper front left side.

A screw receiver 48a is formed on a front portion of the right cell holder 48. A screw receiver 50a is formed on a front portion of the left cell holder 50. The screw receivers 48a, 50a are disposed above a center of the cell holder 42 in the up-down direction. As shown in FIG. 6, a screw receiver 48b is formed on a rear portion of the right cell holder 48. A screw receiver 50b is formed on a rear portion of the left cell holder 50. The screw receivers 48b, 50b are disposed above the center of the cell holder 42 in the up-down direction. The screw receivers 48a, 50a are disposed below the screw receivers 48b, 50b. As shown in FIG. 14, in an inner front portion of the lower case 16, screw bosses 16a, 16b are formed at positions corresponding to the screw receivers 48a, 50a. In an inner rear portion of the lower case 16, screw bosses 16c, 16d are provided at positions corresponding to the screw receivers 48b, 50b. It is noted that, as shown in FIG. 7, a cushion material 68 is attached to a lower portion of the cell holder 42. The cushion material 68 is, for example, rubber.

Figure 15:
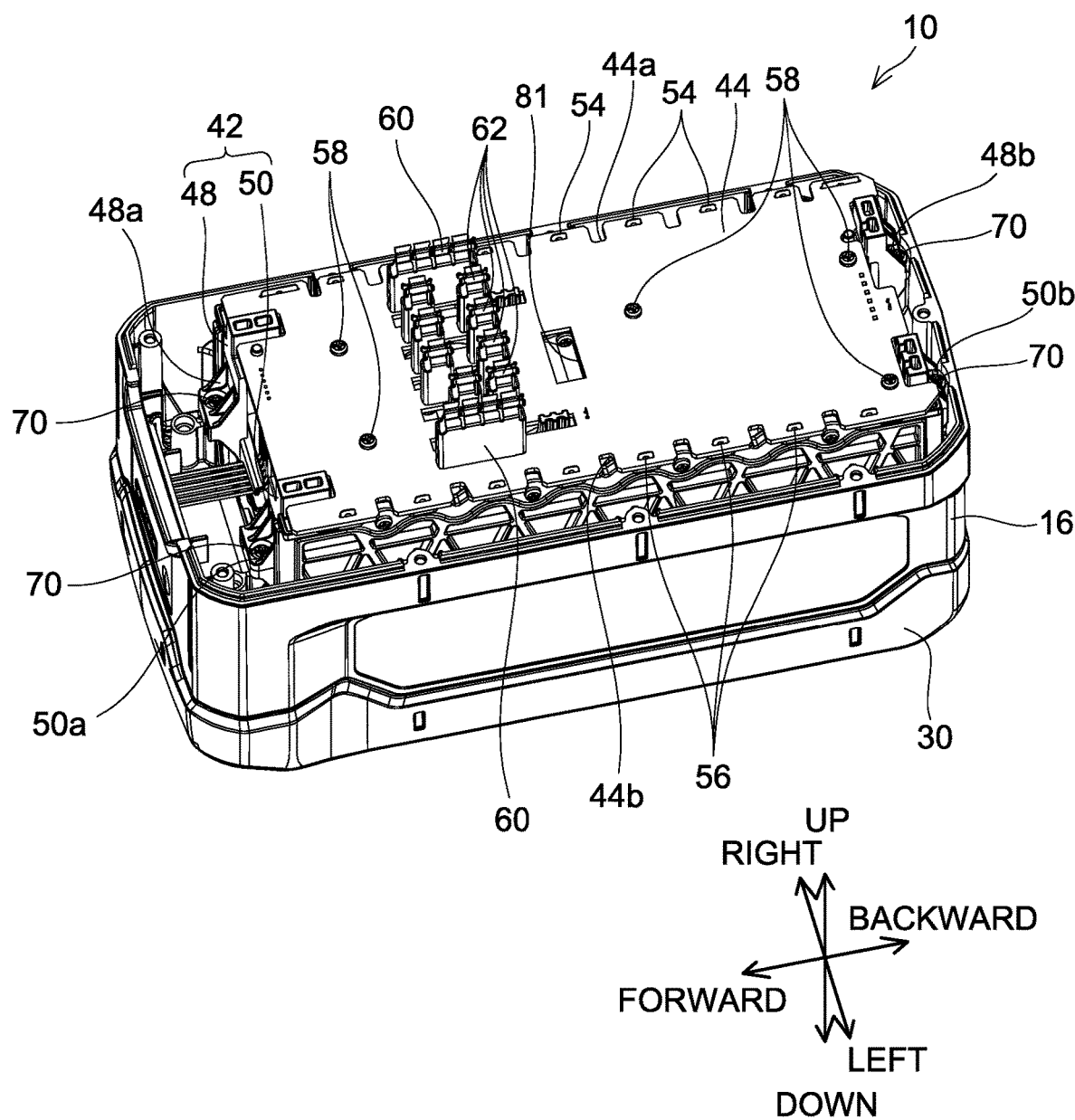
FIG. 15 is a perspective view of the lower case 16 with the battery module 10 of the battery pack 2 according to the embodiment attached thereto, as viewed from the upper rear left side.
Figure 16:
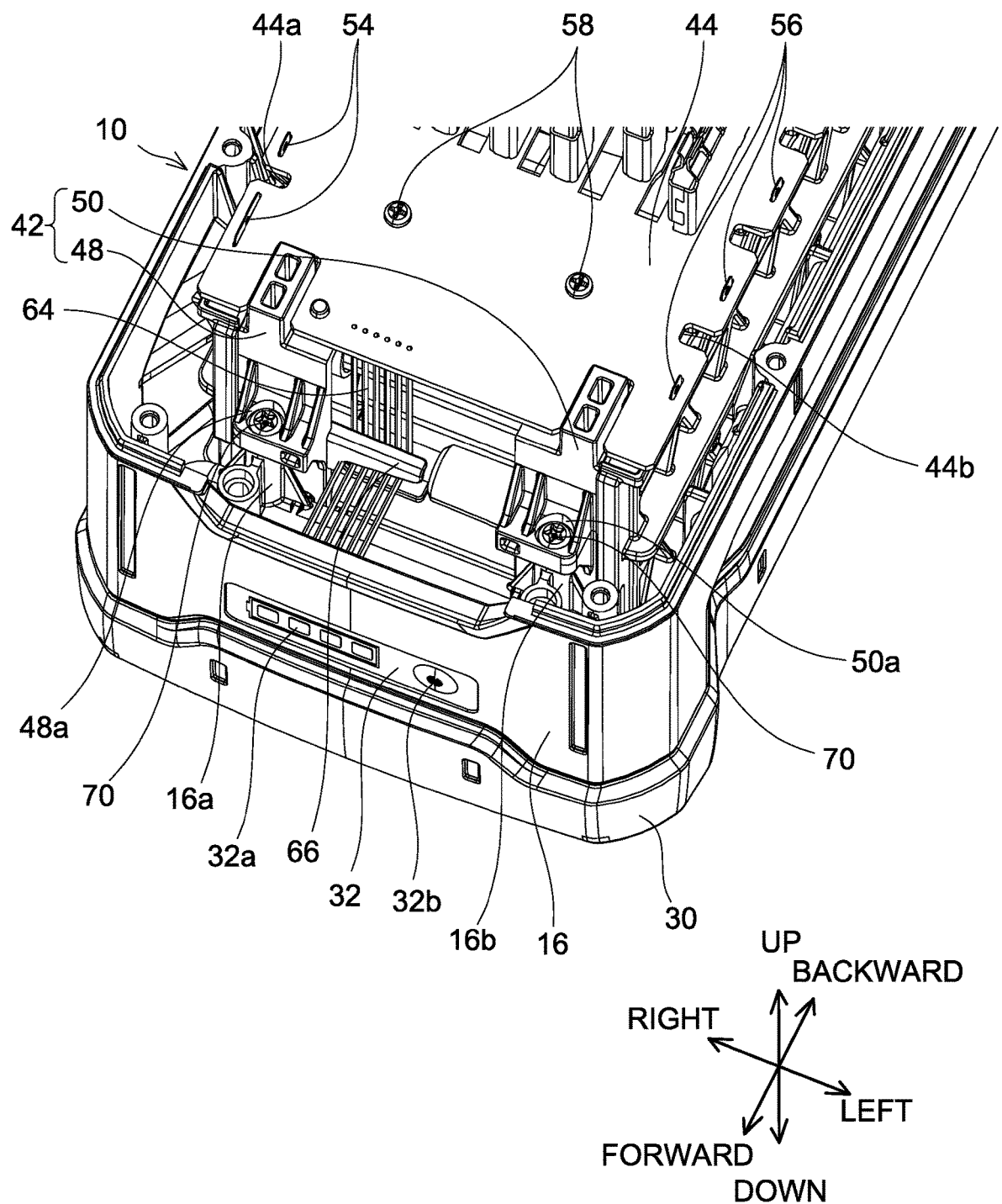
FIG. 16 is a perspective view of a front part of the lower case 16 with the battery module 10 of the battery pack 2 according to the embodiment attached thereto, as viewed from the upper front left side.
Figure 17:
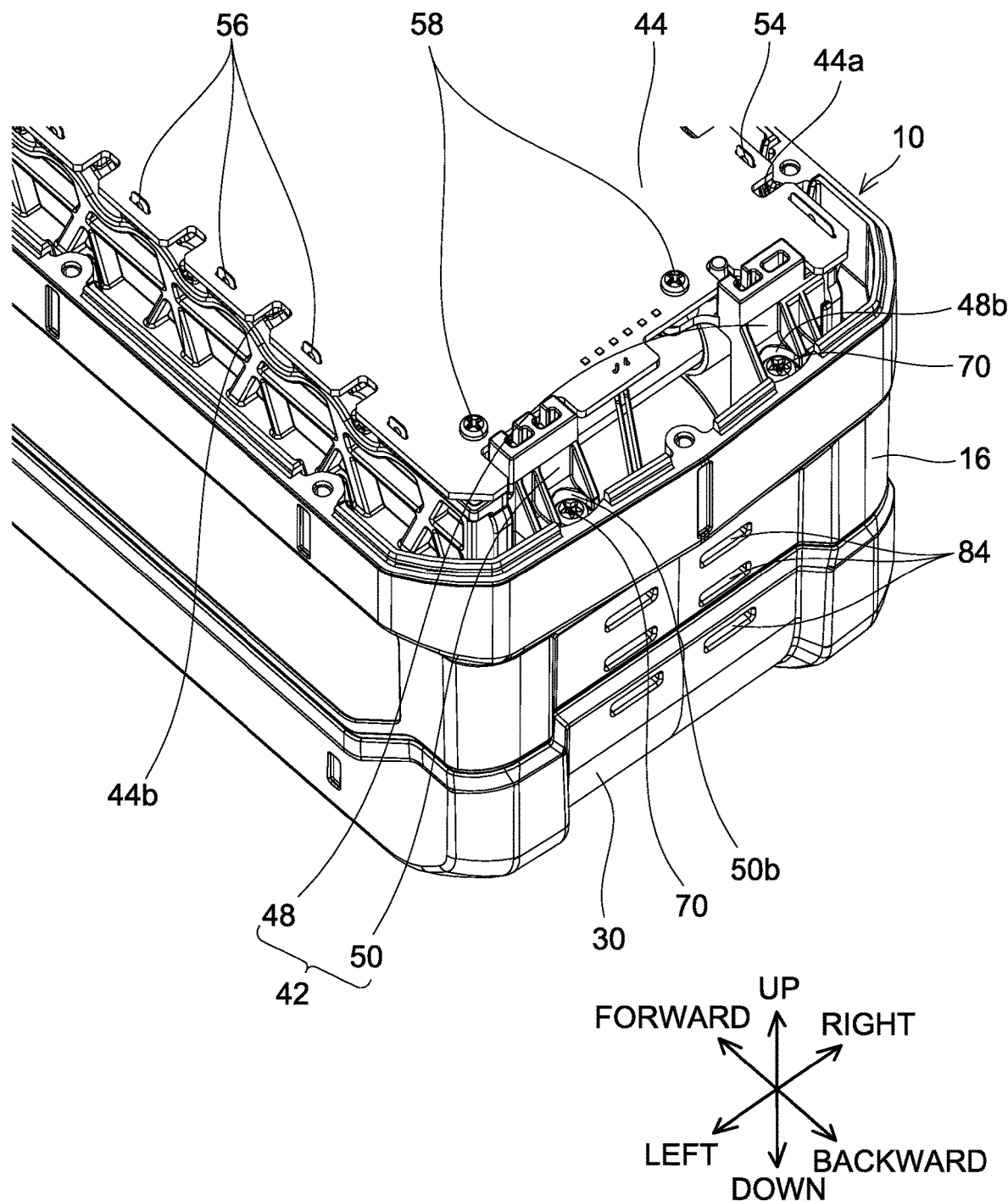
FIG. 17 is a perspective view of a rear part of the lower case 16 with the battery module 10 of the battery pack 2 according to the embodiment attached thereto, as viewed from the upper rear left side.

As shown in FIG. 15, the battery module 10 is attached to the lower case 16 in the state in which the upper case 14 has been removed. At this time, the battery module 10 is fixed to the lower case 16 by metal screws 70 in the state in which it has been placed on an inner bottom surface of the lower case 16. As shown in FIG. 16, the front screws 70 are screwed into the screw bosses 16a, 16b of the lower case 16 from above the screw receivers 48a, 50a of the cell holder 42. As shown in FIG. 17, the rear screws 70 are screwed into the screw bosses 16c, 16d of the lower case 16 from above the screw receivers 48b, 50b of the cell holder 42. By doing so, the battery module 10 can be firmly fixed to the lower case 16. It is noted that, since the cushion material 68 is interposed between the lower surface of the battery module 10 and the inner bottom surface of the lower case 16, transmission of vibration and impact between the battery module 10 and the lower case 16 can be curtailed.

As shown in FIGS. 2 to 4, in the state in which the upper case 14 is attached to the lower case 16, the heads of the screws 70 are not exposed to outside of the battery pack 2 because they are completely covered by the upper case 14. Therefore, the effect of static electricity or the like on the exterior of battery pack 2 can be curtailed from reaching into the battery module 10 within the battery pack 2 via the screws 70.

Figure 18:
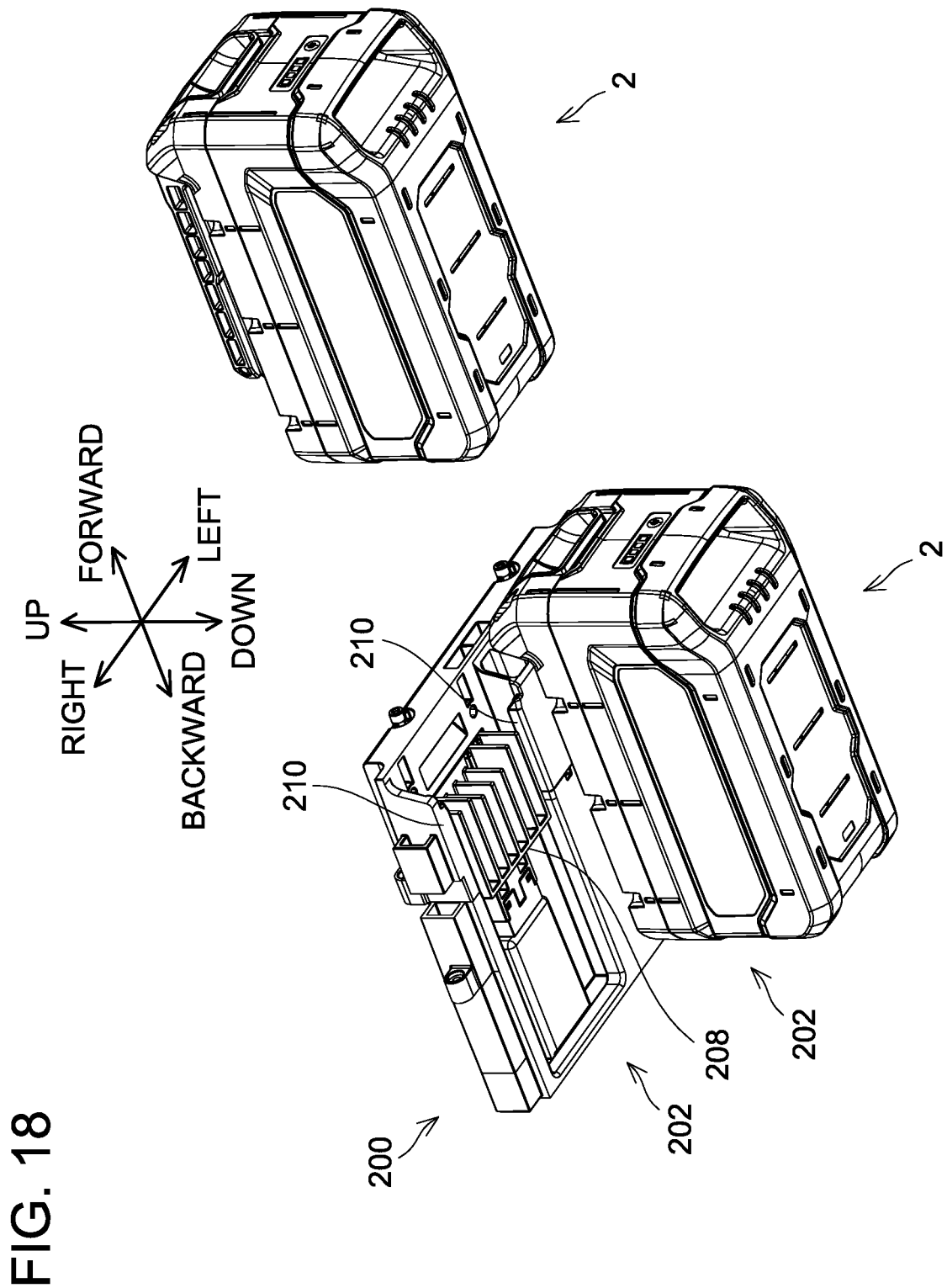
FIG. 18 is a perspective view showing how battery packs 2 according to the embodiment are attached to and detached from an electrical device 200, as viewed from the lower front right side.

As shown in FIG. 18, the electrical device 200 comprises a housing (not shown) and battery pack mounts 202 provided on the housing to be capable of attaching and detaching the battery packs 2. The battery packs 2 are attachable to/detachable from the battery pack mounts 202 by being slid in predetermined sliding directions with respect to the battery pack mounts 202. In the example shown in FIG. 18, the electrical device 200 comprises two battery pack mounts 202, and thus two battery packs 2 are attachable thereto. It is noted that, unlike this example, the electrical device 200 may comprise only one battery pack mount 202 and only one battery pack 2 may be attachable thereto, or the electrical device 200 comprise include three or more battery pack mounts 202 and three or more battery packs 2 may be attachable thereto.

Figure 19:
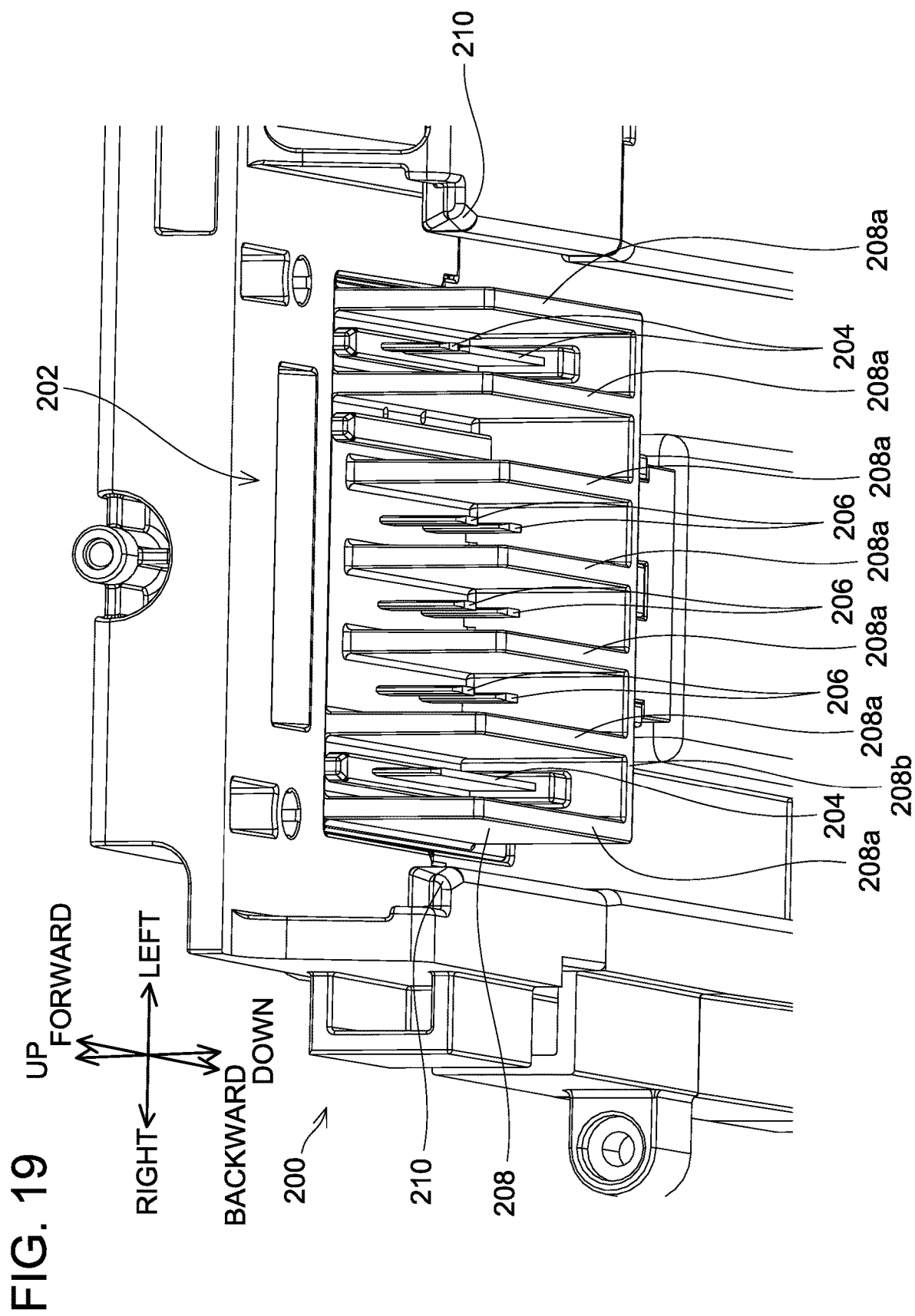
FIG. 19 is a perspective view of a battery pack mount 202 of the electrical device 200 according to the embodiment, as viewed from the lower front right side.

As shown in FIG. 19, the battery pack mount 202 comprises the power terminals 204, the signal terminals 206, protective ribs 208, and the slide rails 210. In the state in which the battery pack 2 is attached to the battery pack mount 202, the power terminals 204 of the electrical device 200 are engaged with, and electrically connected to, the power terminals 60 of the battery pack 2, while the signal terminals 206 of the electrical device 200 are engaged with, and electrically connected to, the signal terminals 62 of the battery pack 2. The protective ribs 208 comprise side plates 208a and a rear plate 208b. The side plates 208a have a plate shape along the front-rear direction and the up-down direction, and the side plates 208a are disposed on both left and right sides of each of the power terminals 204 as well as on both the left and right sides of each of the signal terminals 206s. The rear plate 208b has a plate shape along the right-left direction and the up-down direction, is disposed behind the power terminals 204 and the signal terminals 206, and is coupled to each of the side plates 208a. The slide rails 210 extend along the front-rear direction and are disposed respectively at the left and right ends of the battery pack mount 202. When attaching/detaching the battery pack 2 to/from the electrical device 200, the slide rails 210 slidably engage with the slide rails 20 of the battery pack 2.

Figure 20:
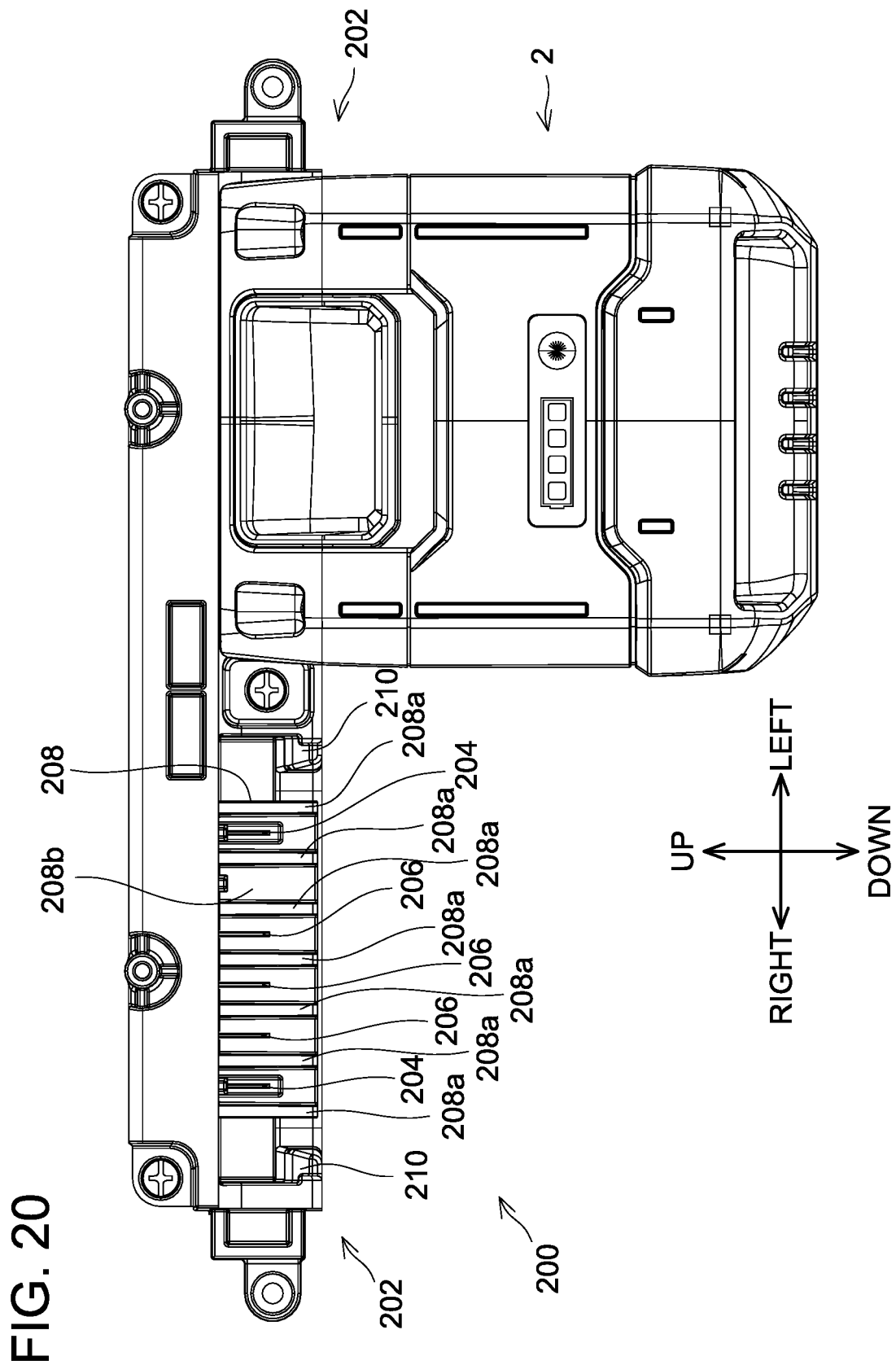
FIG. 20 is a front view of the battery pack mount 202 of the electrical device 200 according to the embodiment, as viewed from the front side.
Figure 21:
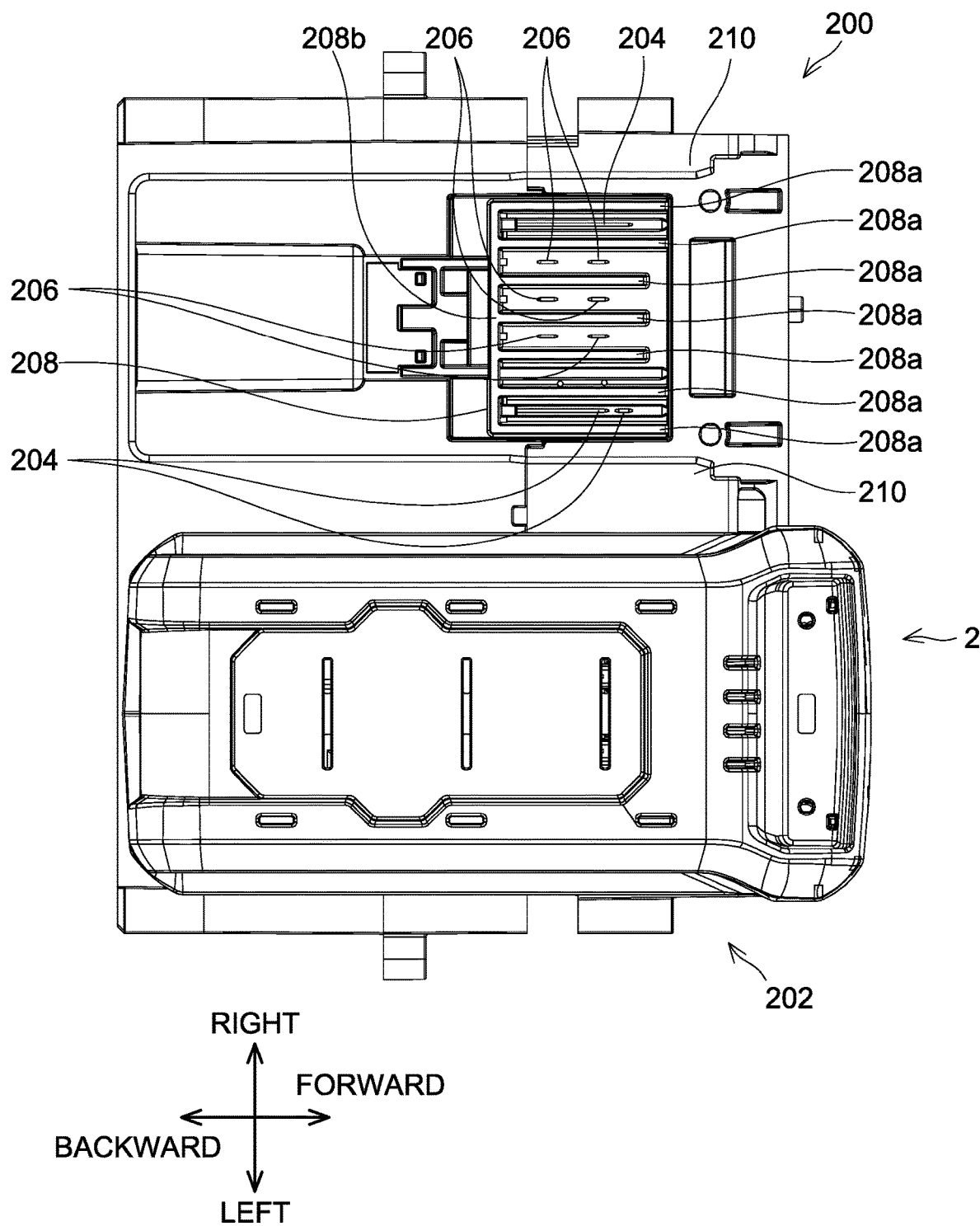
FIG. 21 is a bottom view of the battery pack mount 202 of the electrical device 200 according to the embodiment, as viewed from the bottom side.

As shown in FIG. 20, the lower ends of the side plates 208a and the rear plate 208b are located below the lower ends of the power terminals 204 and the signal terminals 206. Further, as shown in FIG. 21, the front ends of the side plates 208a are located forward relative to the front ends of the power terminals 204 and the signal terminals 206. Therefore, even in the state in which the battery pack 2 is not attached to the battery pack mount 202 and the battery pack mount 202 is exposed to the outside, the user can be prevented from accidentally touching the power terminals 204 and/or the signal terminals 206. In particular, as shown in FIG. 18, in case the electrical device 200 is attachable to a plurality of battery packs 2, a battery pack 2 or battery packs 2 is/are attached to some of the battery pack mounts 202, and no battery pack(s) 2 is/are attached to the rest of the battery pack mounts 202, there is a risk that a high voltage will be output to the power terminals 204 and/or the signal terminals 206 of the battery pack mount(s) 202 to which no battery pack(s) 2 is/are attached. Even in such a case, according to the electrical device 200 of the present embodiment, the safety of the user can be ensured because the user will not accidentally come into contact with the power terminals 204 and/or the signal terminals 206.

As shown in FIG. 21, the front ends of the side plates 208a, which are disposed on both sides of the power terminals 204, are located forward of the front ends of the other side plates 208a. Therefore, the user can be more reliably prevented from coming into contact with the power terminals 204.

Figure 22:
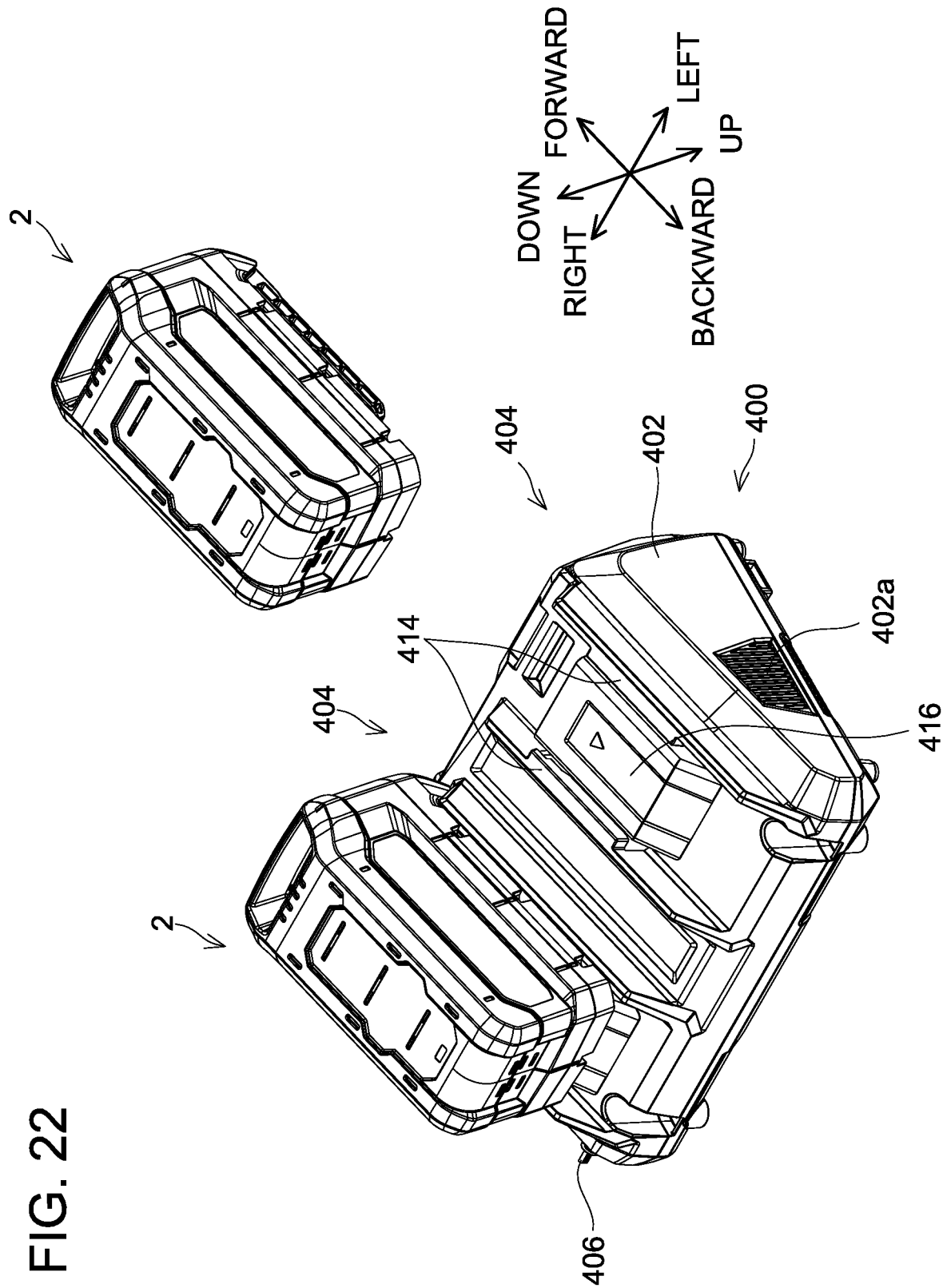
FIG. 22 is a perspective view showing how battery packs 2 according to the embodiment are attached to and detached from a charger 400, as viewed from lower front right side.

As shown in FIG. 22, the charger 400 comprises the housing 402; battery pack mounts 404 provided on the housing 402 and capable of attaching/detaching the battery pack 2; a power cable 406 that extends from the housing 402 and is connectable to an alternating-current source; and a control circuit board 408 (see FIG. 24) accommodated in the housing 402. The battery packs 2 are attachable/detachable to/from the battery pack mounts 404 by being slid in predetermined sliding directions with respect to the battery pack mounts 404. In the example shown in FIG. 22, the charger 400 comprises two battery pack mounts 404, and thus two battery packs 2 are attachable thereto. It is noted that, unlike this example, the charger 400 may comprise only one battery pack mount 404 and only one battery pack 2 may be attached thereto, or the charger 400 may comprise three or more battery pack mounts 404 and three or more battery packs 2 may be attached thereto. The control circuit board 408 converts the alternating-current power supplied from the power cable 406 into direct-current power and charges the battery pack(s) 2 attached to the battery pack mount(s) 404.

Figure 23:
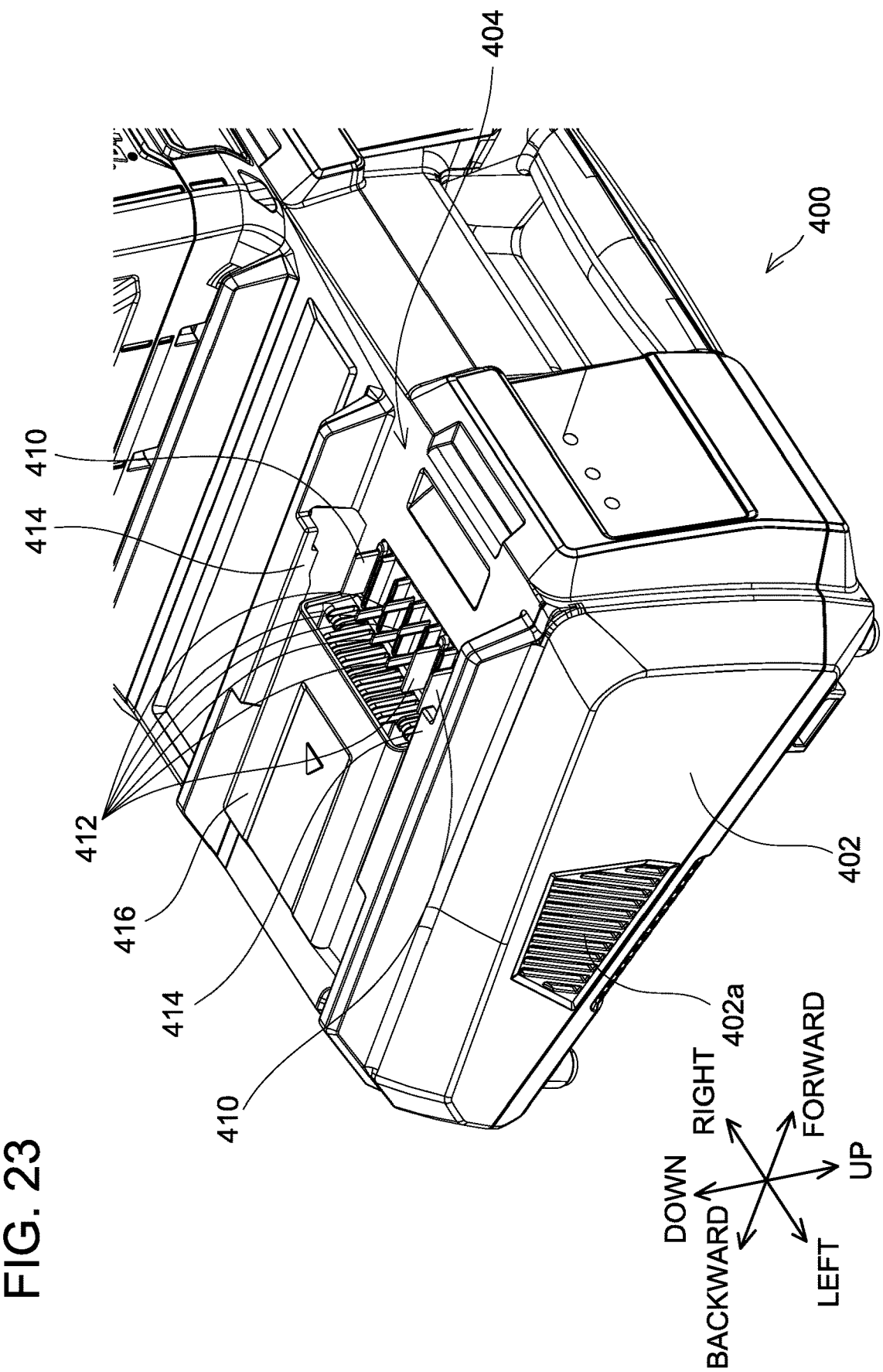
FIG. 23 is a perspective view of a battery pack mount 404 of the charger 400 according to the embodiment, as viewed from lower front right side.
Figure 24:
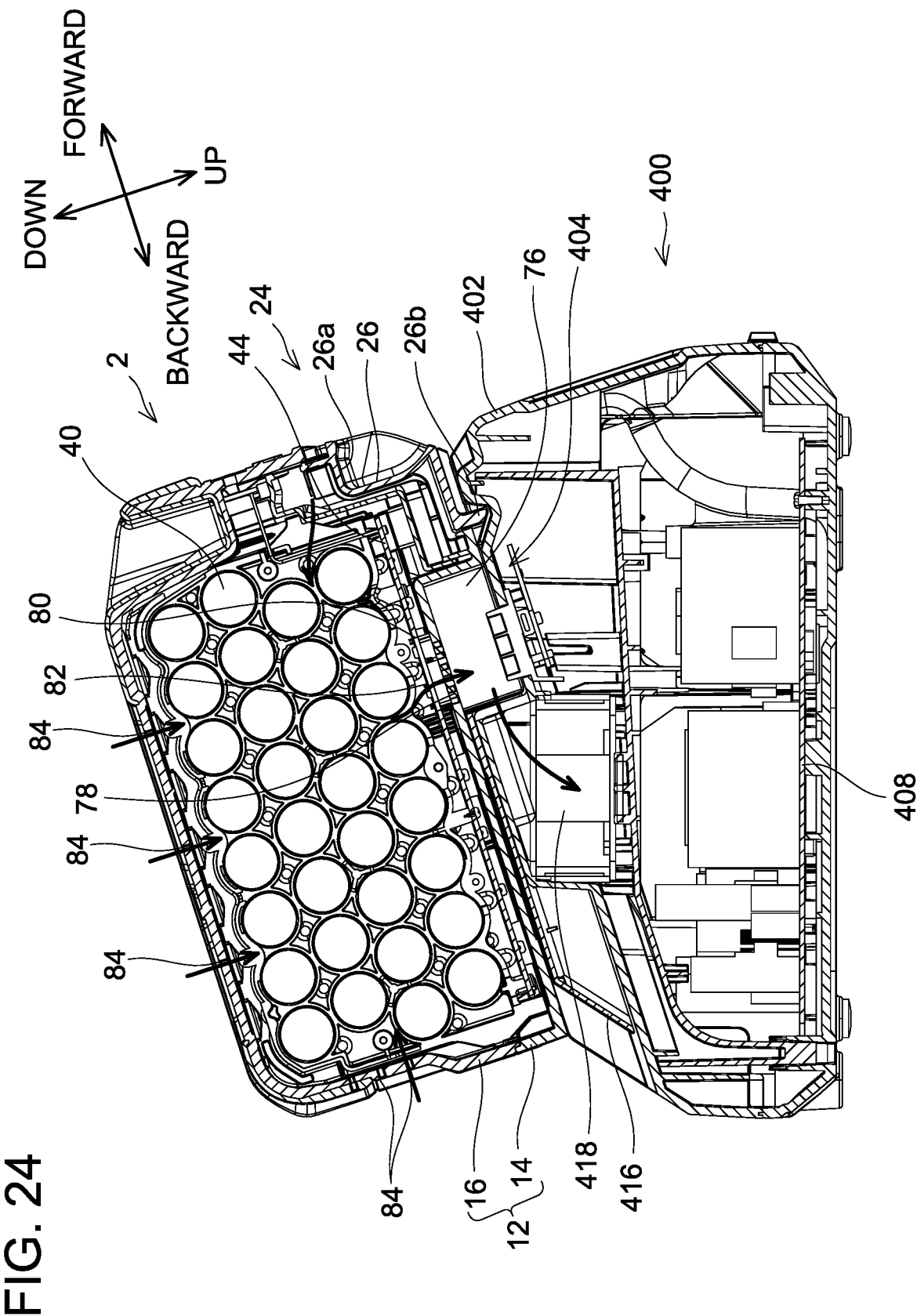
FIG. 24 is a cross-sectional view of the battery pack 2 and the charger 400 according to the embodiment in a state where they are attached to each other, as viewed from left side.

As shown in FIG. 23, the battery pack mounts 404 comprise the power terminals 410, the signal terminals 412, the slide rails 414, a terminal cover 416, and a blower fan 418 (see FIG. 24). The power terminals 410, the signal terminals 412, and the blower fan 418 are connected to the control circuit board 408. In the state in which the battery pack 2 is attached to the battery pack mount 404, the power terminals 410 of the charger 400 are engaged with, and are electrically connected to, the power terminals 60 of the battery pack 2, while the signal terminals 412 of the charger 400 are engaged with, and are electrically connected to, the signal terminals 62 of the battery pack 2. The terminal cover 416 is slidable between a protecting position (see FIG. 22), where the power terminals 410 and the signal terminals 412 are covered by the terminal cover 416, and a retracted position (see FIG. 23), where the power terminals 410 and the signal terminals 412 are exposed. The terminal cover 416 is biased toward the protecting position by a compression spring (not shown). When the battery pack 2 is attached to the charger 400, the terminal cover 416 is pushed by the upper case 14 of the battery pack 2 such that it is moved from the protecting position to the retracted position. The blower fan 418 suctions air from the battery pack mount 404 when the battery pack 2 is being charged.

As shown in FIG. 3, in the battery pack 2, power terminal openings 72 and signal terminal openings 74 are formed in the terminal receiver portion 22 of the upper case 14. The power terminal openings 72 are disposed corresponding to the power terminals 60 of the control circuit board 44, and are formed at positions and in shapes such that the power terminals 204 of the electrical device 200 and the power terminals 410 of the charger 400 can pass therethrough. The signal terminal openings 74 are disposed corresponding to the signal terminals 62 of the control circuit board 44, and are formed at positions and in shapes such that the signal terminals 206 of the electrical device 200 and the signal terminals 412 of the charger 400 can pass therethrough. When the battery pack 2 is attached to the electrical device 200, the power terminals 204 enter the power terminal openings 72 and engage with the power terminals 60, and the signal terminals 206 enter the signal terminal openings 74 and engage with the signal terminals 62. When the battery pack 2 is attached to the charger 400, the power terminals 410 enter the power terminal openings 72 and engage with the power terminals 60, and the signal terminals 412 enter the signal terminal openings 74 and engage with the signal terminals 62.

In the terminal receiver portion 22 of the battery pack 2, recessed grooves 76 are formed in the upper case 14 on both the left and right sides of the power terminal openings 72 and on both the left and right sides of the signal terminal openings 74. The recessed grooves 76 are formed at positions and in shapes such that the recessed grooves 76 can receive the side plates 208a of the protective ribs 208 of the electrical device 200. Therefore, lower ends of the recessed grooves 76 are located below lower ends of the power terminal openings 72 and the signal terminal openings 74, and front ends of the recessed grooves 76 are located forward relative to front ends of the power terminal openings 72 and the signal terminal openings 74. Further, the recessed grooves 76 open in two directions, namely, in the up direction and in the rear direction.

Figure 25:
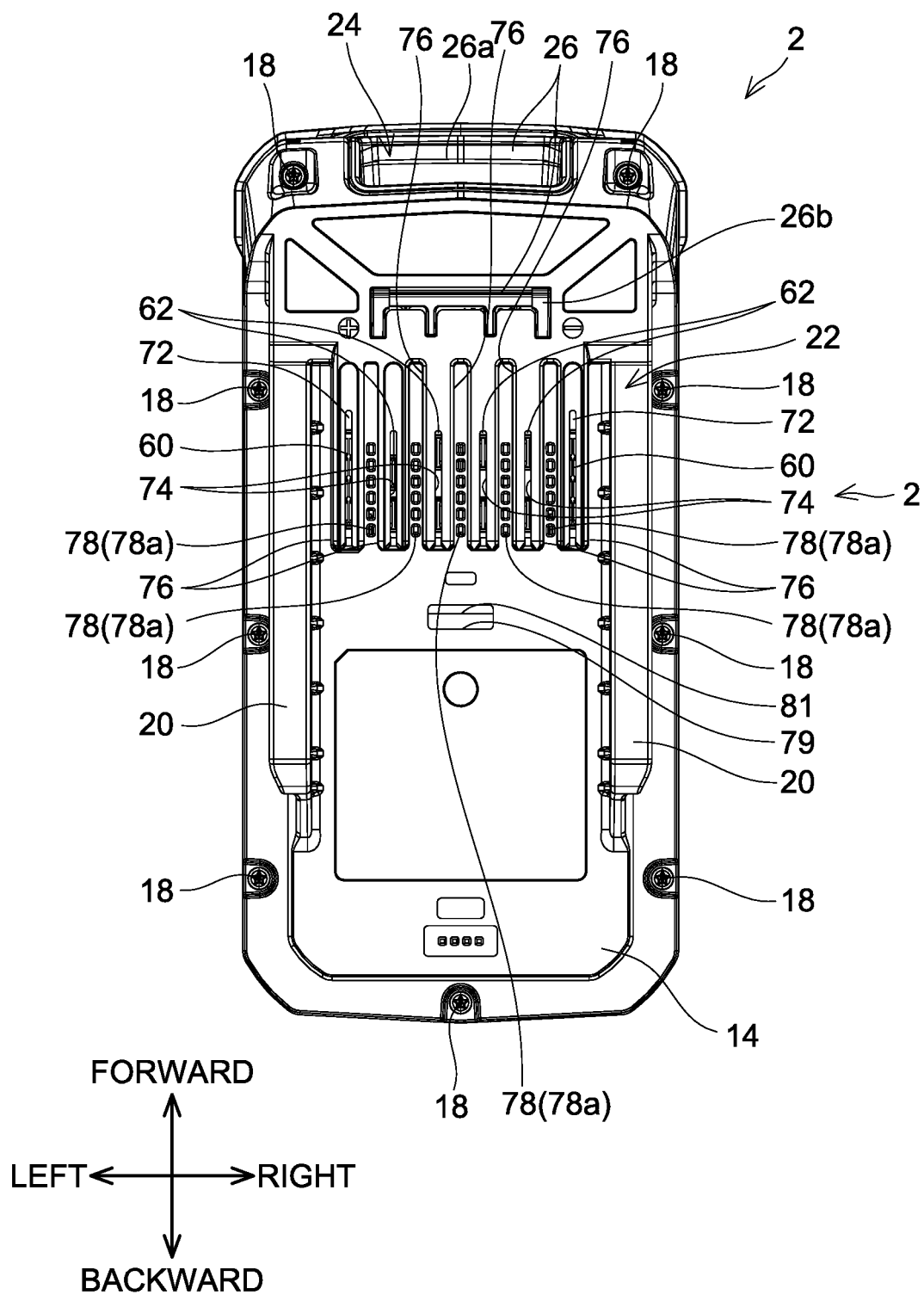
FIG. 25 is a plan view of the battery pack 2 according to the embodiment, as viewed from above.

As shown in FIG. 25, vent holes 78 are formed in lower surfaces of the recessed grooves 76 that are disposed between the power terminals 60 and the signal terminals 62 as well as in lower surfaces of the recessed grooves 76 that are disposed between two signal terminals 62 that are adjacent to each other in the right-left direction. The vent holes 78 comprise a plurality of holes 78a disposed in the lower surface of one recessed groove 76. Therefore, the size of individual holes 78a can be made smaller compared to the example shown in FIG. 40 where one large vent hole 78 is provided in the lower surface of one recessed groove 76, and thus the ingress of foreign matter from outside of the battery pack 2 through the vent holes 78 into the interior can be curtailed. Further, a vent hole 79 is formed in the upper surface of the upper case 14 at a position offset rearward from the terminal receiver portion 22.

Figure 26:
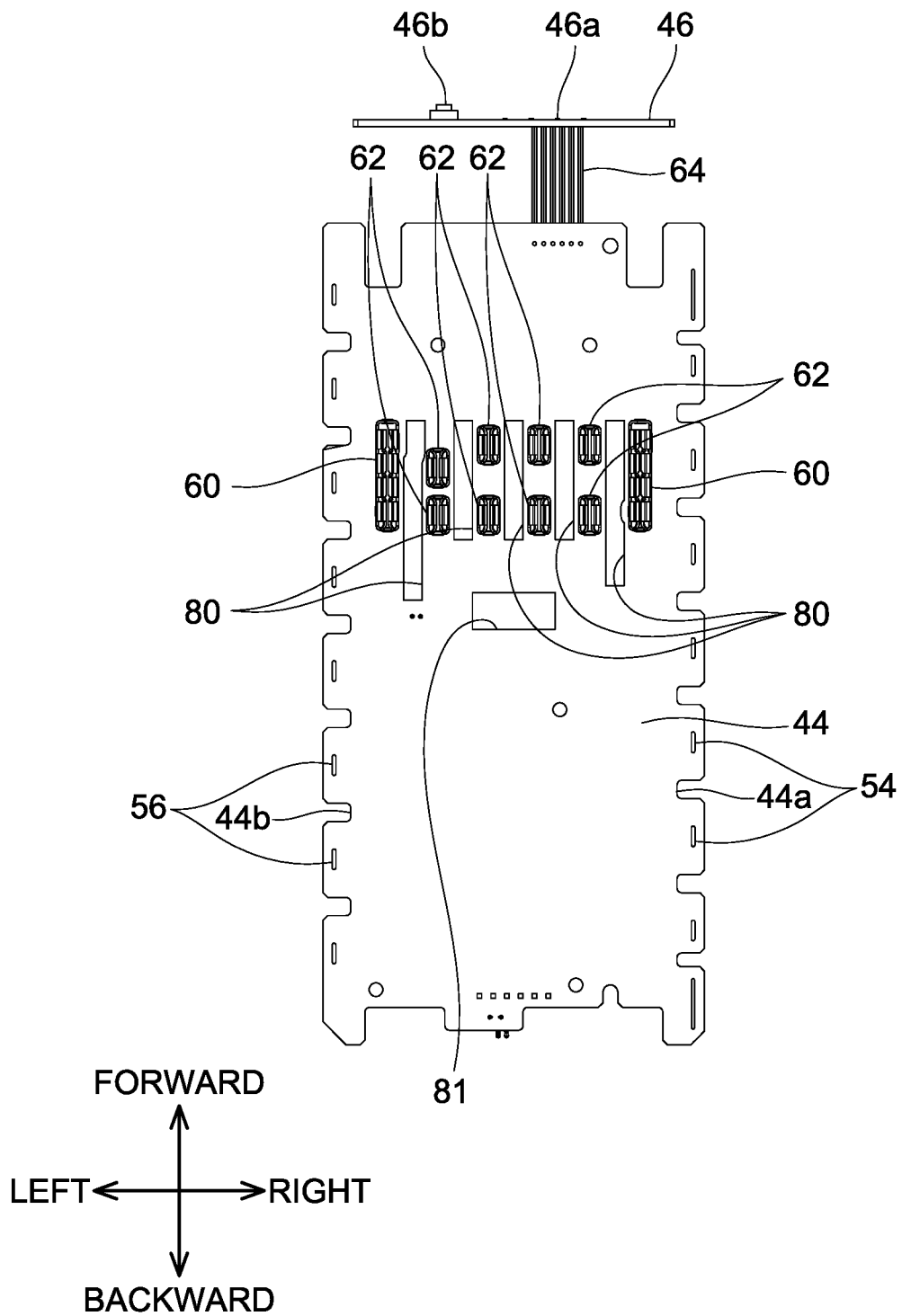
FIG. 26 is a plan view of a control circuit board 44 and a display circuit board 46 of the battery pack 2 according to the embodiment, as viewed from above.

As shown in FIG. 26, slits 80 are formed in the control circuit board 44 between the power terminals 60 and the signal terminals 62 as well as between two signal terminals 62 that are adjacent to each other in the right-left direction. The slits 80 are disposed at positions facing the vent holes 78 of the upper case 14. By providing the slits 80 in the control circuit board 44, the occurrence of short circuits between the power terminals 60 and the signal terminals 62 and/or between two signal terminals 62 that are adjacent to each other in the right-left direction can be curtailed, even if a conductive substance, such as water, enters into the interior of the battery pack 2 and adheres to the control circuit board 44. Further, a slit 81 is formed in the control circuit board 44 at a position offset rearward from the signal terminals 62. The slit 81 is disposed at a position facing the vent hole 79 of the upper case 14. Notches 44a that extend between the lead plates 54, which are adjacent to one another, are formed in a right edge of the control circuit board 44. By providing the notches 44a in the control circuit board 44, the occurrence of short circuits between the lead plates 54, which are adjacent to one another in the front-rear direction, can be curtailed even if a conductive substance, such as water, enters into the interior of the battery pack 2 and adheres to the control circuit board 44. Notches 44b that extend between the lead plates 56, which are adjacent to one another, are formed in a left edge of the control circuit board 44. By providing the notches 44b in the control circuit board 44, the occurrence of short circuits between the lead plates 56, which are adjacent to one another in the front-rear direction, can be curtailed, even if a conductive substance, such as water, enters into the interior of the battery pack 2 and adheres to the control circuit board 44.

Figure 27:
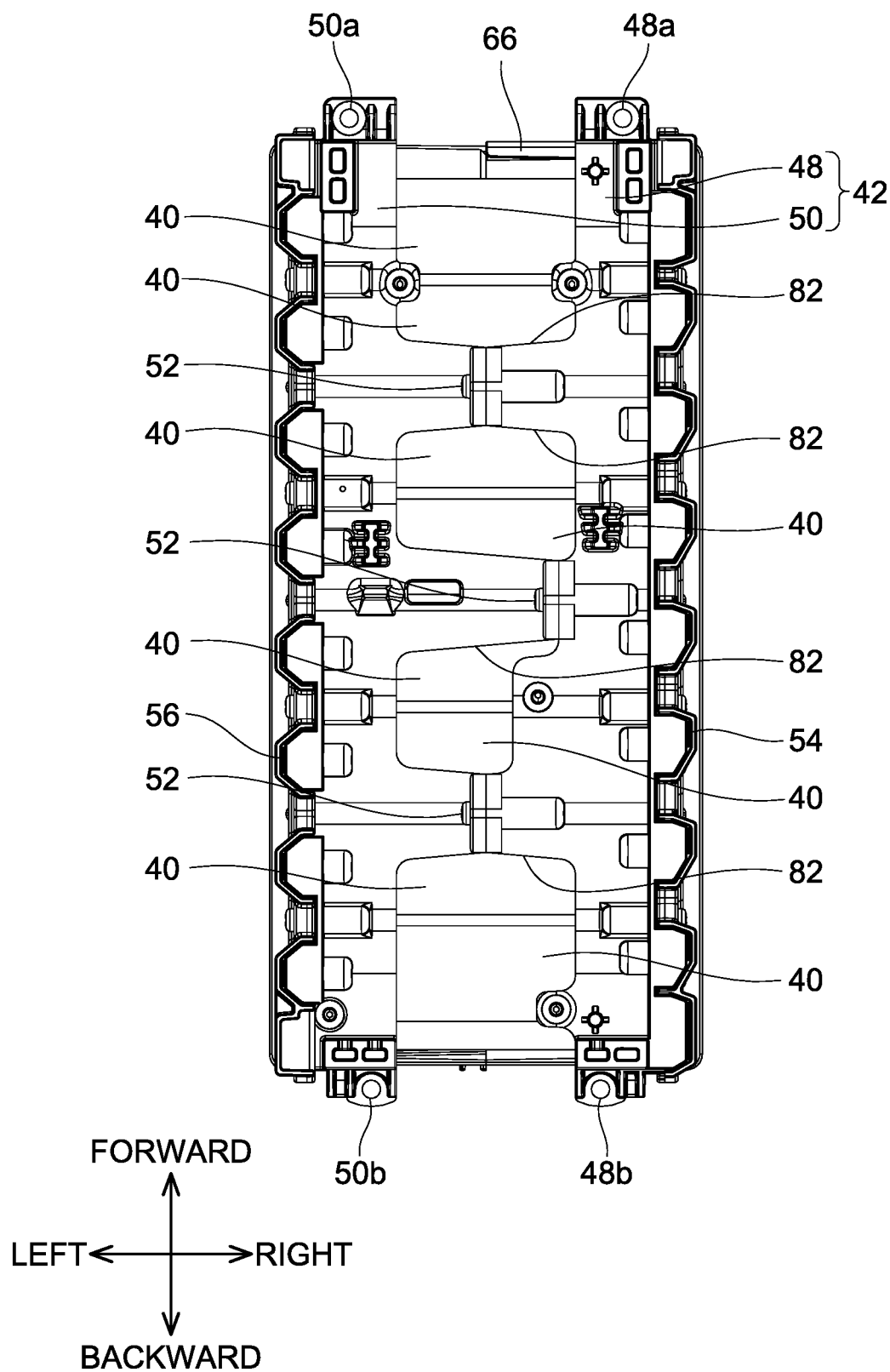
FIG. 27 is a plan view of the plurality of battery cells 40 and the cell holder 42 of the battery pack 2 according to the embodiment, as viewed from above.

As shown in FIG. 27, openings 82 are formed in an upper surface of the cell holder 42. The vent holes 78 of the upper case 14 and the slits 80 of the control circuit board 44 are disposed at a position facing an opening 82 of the cell holder 42. Further, the vent hole 79 of the upper case 14 and the slit 81 of the control circuit board 44 are disposed at a position facing an opening 82 of the cell holder 42.

As shown in FIG. 24, air supply holes 84 are formed in the lower surface and rear surface of the lower case 16. In addition, the hook mount portion 24 of the upper case 14 serves as an air supply hole 84 since air can flow through a clearance between the hook 26 and the upper case 14.

When the blower fan 418 of the charger 400 is driven with the battery pack 2 attached to the charger 400, the blower fan 418 suctions air from the battery pack mount 404. When this happens, air flows from the outside through the air supply holes 84 into the interior of the battery pack 2. The air, which has flowed into the interior of the battery pack 2, passes through spaces between the battery cells 40 and flows toward the openings 82 of the cell holder 42. At this time, the battery cells 40 are cooled by the air flowing around them. Most of the air that reached the openings 82 of the cell holder 42 flows through the slits 80 of the control circuit board 44, flows through the vent holes 78 of the upper case 14, and then flows into the recessed grooves 76 of the terminal receiver portion 22. The air, which flowed to the recessed grooves 76, flows through the battery pack mount 404 of the charger 400 and then reaches the blower fan 418. In addition, a portion of the air that reached the openings 82 of the cell holder 42 flows through the slit 81 of the control circuit board 44, flows through the vent hole 79 of the upper case 14, and then reaches the blower fan 418 of the charger 400. Further, another portion of the air that reached the openings 82 of the cell holder 42 flows through the notches 44a, 44b of the control circuit board 44, further flows through the vent holes 78, 79 of the upper case 14, and then reaches the blower fan 418 of the charger 400. As shown in FIG. 23, an air discharge hole 402a is formed in the housing 402 of the charger 400. The air drawn into the interior of the housing 402 by the blower fan 418 flows through the interior of the housing 402 of the charger 400 and then is discharged to the outside through the air discharge hole 402a.

In the battery pack 2, the vent holes 78, 79 of the upper case 14 are disposed to face the slits 80, 81 of the control circuit board 44. Owing to making such a configuration, air underneath the control circuit board 44 is suctioned through the slits 80, 81 as air flows out from the vent holes 78, 79. Therefore, the portion of the plurality of battery cells 40 that is located right underneath the control circuit board 44 can be cooled sufficiently.

In addition, in the battery pack 2, the openings 82 of the cell holder 42 are disposed to face the slits 80, 81 of the control circuit board 44. Owing to making such a configuration, air flows from the spaces between the battery cells 40 toward the openings 82 of the cell holder 42 as air is suctioned through the slits 80, 81. Therefore, the portion of the plurality of battery cells 40 that is located near the center can be cooled sufficiently.

The control circuit board 44 need not comprise the slit 81, and may comprise only the slits 80. Corresponding to this, the case 14 need not comprise the vent hole 79, and may comprise only the vent holes 78.

Figure 40:
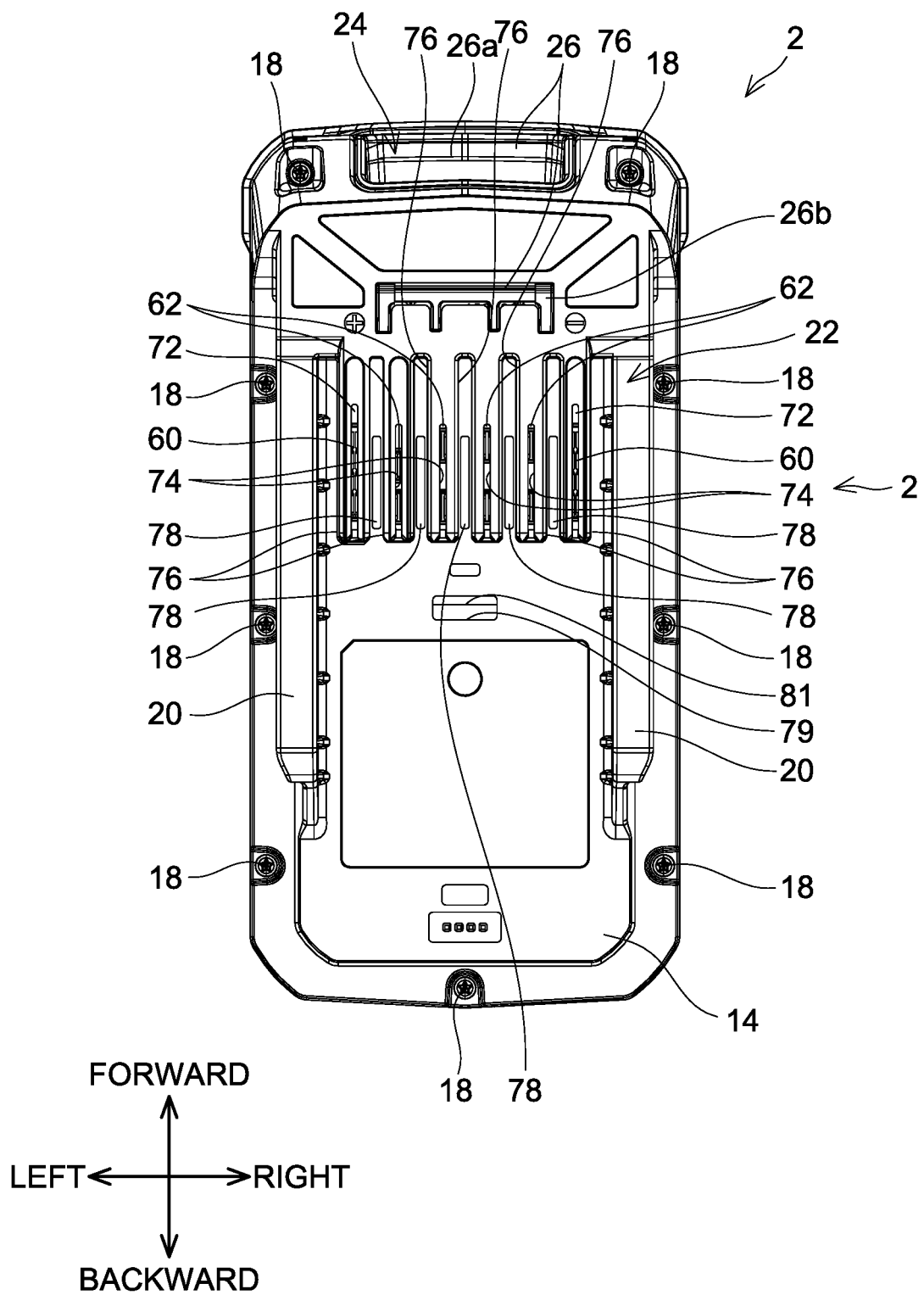
FIG. 40 is a plan view of a battery pack 2 according to a modified example, as viewed from above.

As shown in FIG. 40, a single large vent hole 78 may be formed in the upper case 14 in the lower surface of each of the recessed grooves 76. In this case, air can easily flow through these vent holes 78 and the cooling performance for the battery cells 40 can be improved, compared to the case shown in FIG. 25 in which a plurality of holes 78a was formed in the lower surface of each of the recessed grooves 76.

Figure 41:
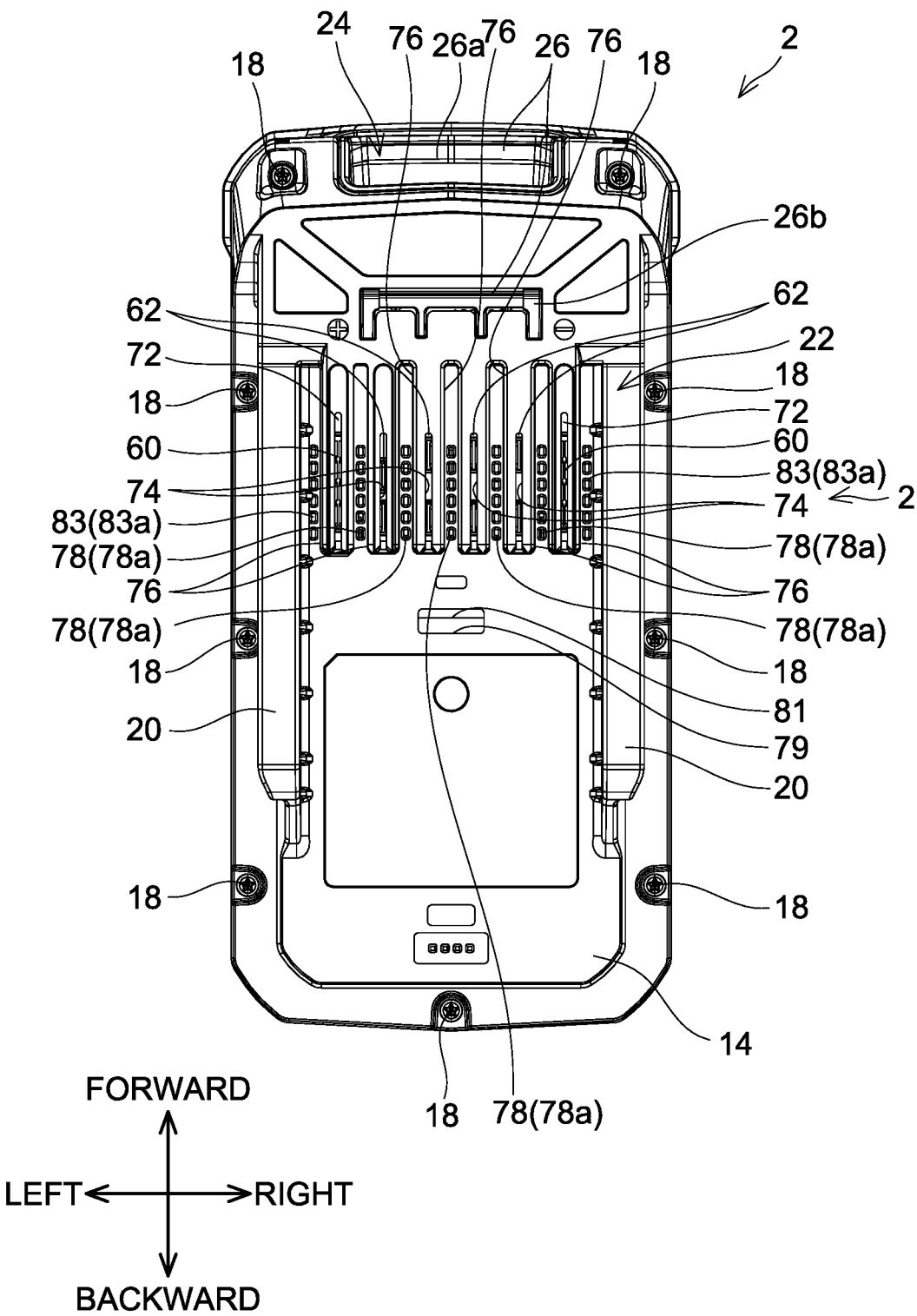
FIG. 41 is a plan view of a battery pack 2 according to another modified example, as viewed from above.
Figure 42:
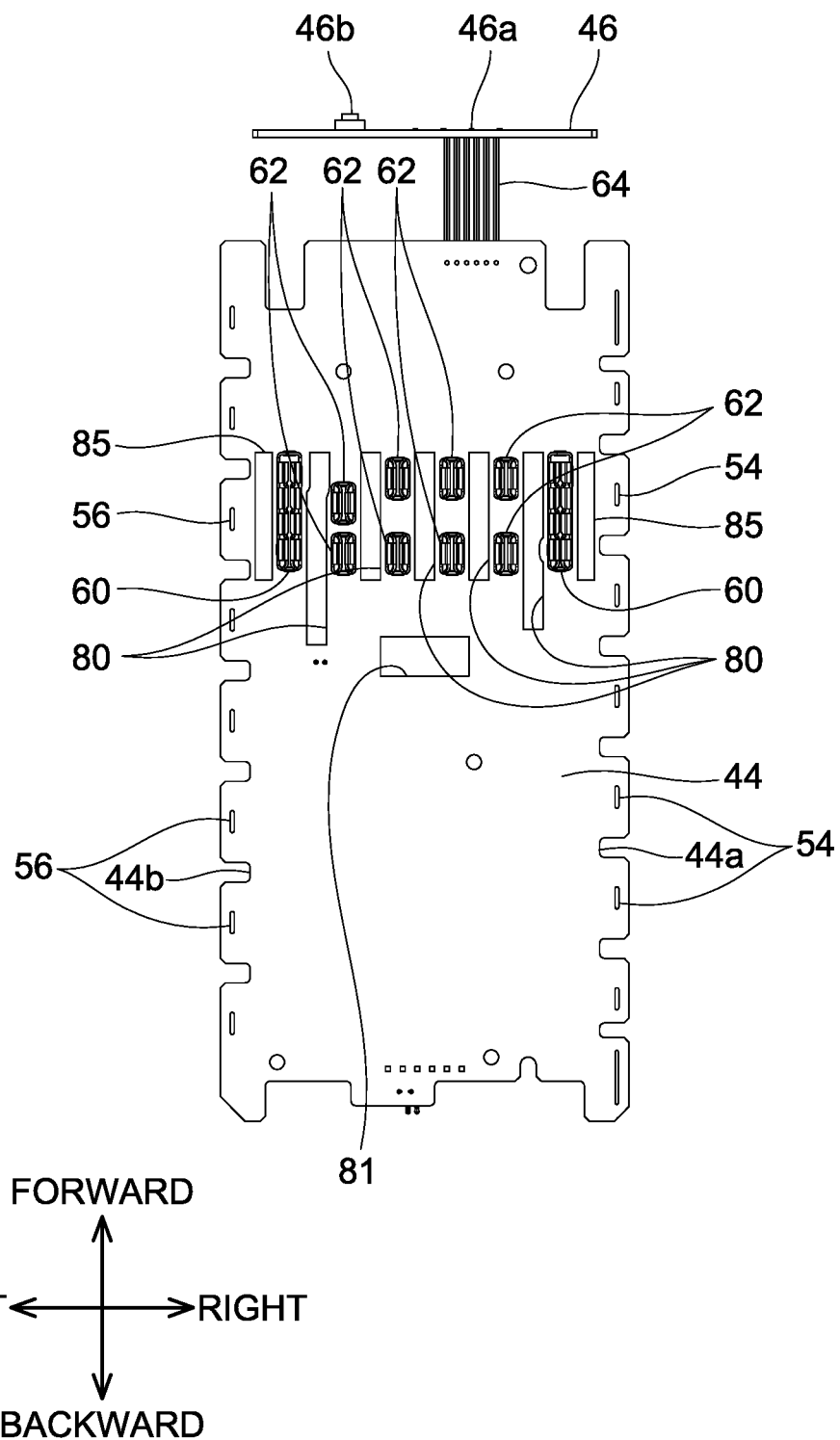
FIG. 42 is a plan view of a control circuit board 44 and a display circuit board 46 of a battery pack 2 according to another modified example, as viewed from above.

As shown in FIG. 41, vent holes 83 may be formed in the upper case 14 in the lower surface of the recessed grooves 76 that are disposed between the power terminals 60 and the slide rails 20. The vent holes 83 may comprise a plurality of holes 83a disposed in the lower surface of one recessed groove 76. As shown in FIG. 42, slits 85 may be formed in the control circuit board 44 between the power terminals 60 and the lead plates 54, 56. By providing the slits 85 in the control circuit board 44, the occurrence of short circuits between the power terminals 60 and the lead plates 54, 56 can be curtailed, even if a conductive substance, such as water, enters into the interior of the battery pack 2 and adheres to the control circuit board 44. The slits 85 may be disposed at positions facing the vent holes 83 of the upper case 14. According to the configurations of FIGS. 41 and 42, the amount of air that flows through the spaces between the battery cells 40 by driving the blower fan 418 of the charger 400 can be increased, and thus the cooling performance for the battery cells 40 can be improved.

Figure 28:
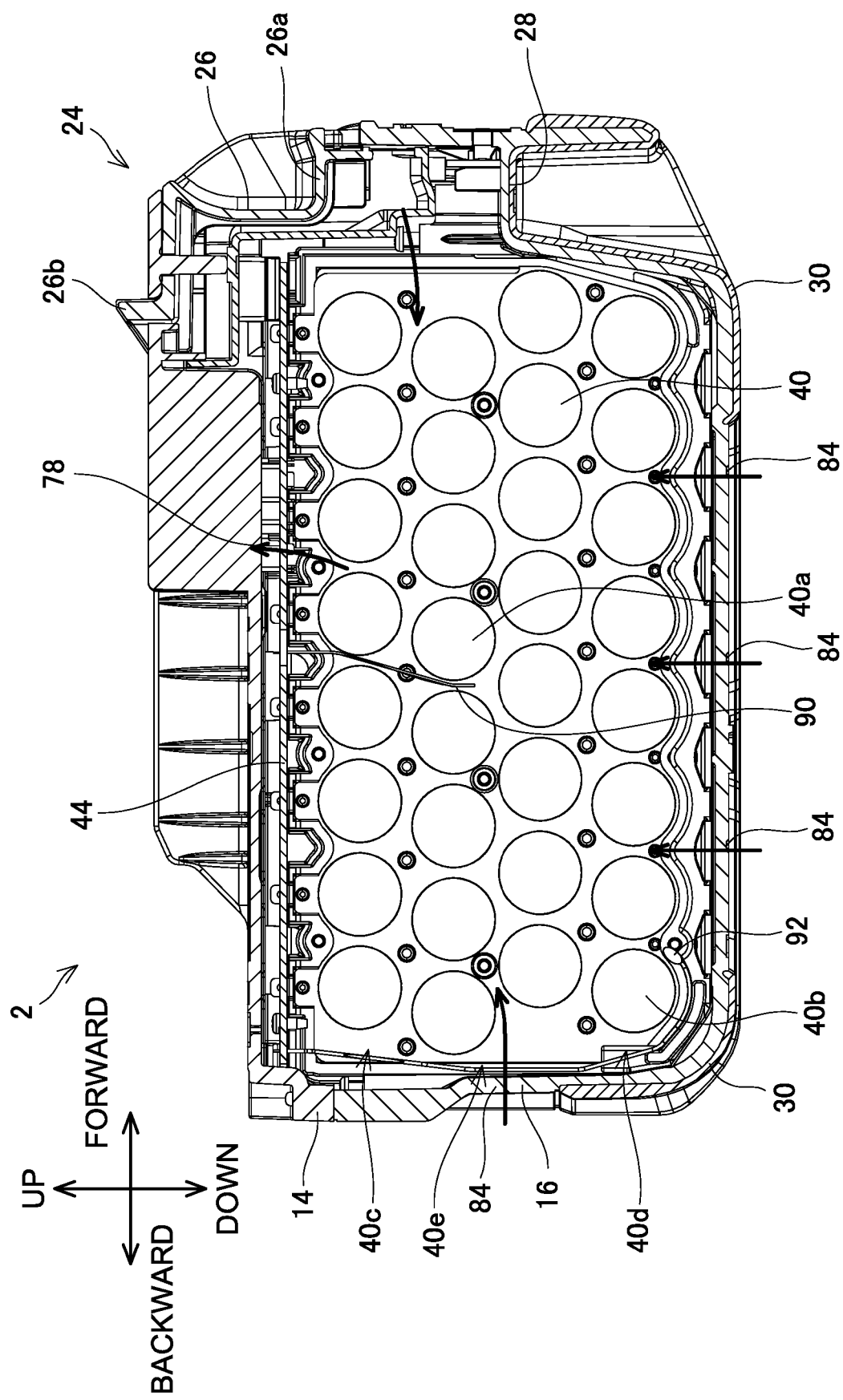
FIG. 28 is a cross-sectional view of the battery pack 2 according to the embodiment, as viewed from right side.

As shown in FIG. 28, the battery pack 2 comprises a first thermistor 90 and a second thermistor 92. The first thermistor 90 and the second thermistor 92 are both connected to the control circuit board 44. The first thermistor 90 is, for example, a film thermistor. The second thermistor 92 is, for example, a dip thermistor. Generally, although film thermistors have high detection accuracy for temperature, it is difficult to extend them to a position spaced apart from the control circuit board 44. Conversely, although dip thermistors have low detection accuracy for temperature, they can be easily extended to a position spaced apart from the control circuit board 44. In the battery pack 2, the first thermistor 90 detects the temperature of a battery cell 40a that is located near the center among the battery cells 40 arranged in the up-down direction and in the front-rear direction, while the second thermistor 92 detects the temperature of a battery cell 40b that is located near the outer edge among the battery cells 40 arranged in the up-down direction and in the front-rear direction. In this case, the first thermistor 90 is disposed closest to the battery cell 40a among the plurality of battery cells 40 and detects the temperature at a position that is surrounded by other battery cells 40. The second thermistor 92 is disposed closest to the battery cell 40b among the plurality of battery cells 40 and detects the temperature at a position that is not surrounded by other battery cells 40. Further, the first thermistor 90 detects the temperature at a position where (a) battery cell(s) 40 is (are) interposed between the position and the upper case 14 and/or the lower case 16, while the second thermistor 92 detects the temperature at a position where no battery cell 40 is interposed between the position and the lower case 16. Further, the first thermistor 90 detects the temperature at a position where the distance from the position to the vent holes 78, through which air flows out from the interior of the battery pack 2 to the outside, is shorter than the distance from the position to the air supply holes 84 through which air flows into the interior from the outside. The second thermistor 92 detects a temperature at a position where the distance from the position to the air supply holes 84 through which air flows into the interior from the outside is shorter than the distance from the position to the vent holes 78 through which air flows out from the interior of the battery pack 2 to the outside.

Generally, among the battery cells 40 arranged in the up-down direction and in the front-rear direction, the battery cells 40 that are located near the center tend to have a high temperature because heat dissipation is difficult, while the battery cells 40 located near an outer edge tend to have a low temperature because heat dissipation is easy. In addition, in a configuration in which the battery cells 40 are cooled by air that flows in through the air supply holes 84 and flows out through the vent holes 78, air flowing in through the air supply holes 84 has a low temperature and the air flowing out through the vent holes 78 has a high temperature; thus the battery cells 40 located close to the air supply holes 84 tend to have a low temperature, and the battery cells 40 located close to the vent holes 78 tend to have a high temperature. Therefore, in case the first thermistor 90 and the second thermistor 92 are disposed as described above, the battery cell 40a, which the first thermistor 90 detects the temperature, has the highest temperature among the battery cells 40 during charging, while the battery cell 40b, which the second thermistor 92 detects the temperature, has the lowest temperature among the battery cells 40 during charging. As such, by using the first thermistor 90 and the second thermistor 92, the temperature of the battery cell 40a, which is the highest among the battery cells 40 of the battery pack 2 during charging, and the temperature of the battery cell 40b, which is the lowest among the battery cells 40 during charging, can be obtained.

It is noted that, among the plurality of battery cells 40 arranged in the up-down and front-rear directions, the battery cells 40 that are arranged in the front-rear direction in the uppermost row are called upper battery cell group 40c, the battery cells 40 that are arranged in the front-rear direction in the lowermost row are called lower battery cell group 40d, and the battery cells 40 that are arranged in the up-down and front-rear directions between the upper battery cell group 40c and the lower battery cell group 40d are called middle battery cell group 40e. The battery cell 40a, which the first thermistor 90 detect the temperature, is included in the middle battery cell group 40e, while the battery cell 40b, which the second thermistor 92 detects the temperature, is included in the lower battery cell group 40d.

When a charging start instruction is received from the battery pack 2 while the battery pack 2 is attached to a battery pack mount 404, the charger 400 performs charging of the battery pack 2. During charging of the battery pack 2, the charger 400 receives as charging parameters from the battery pack 2 each of a permitted charging voltage, a permitted charging current, a charging-current-reduction start voltage, and a cut-off current. Then, the charger 400 charges the battery pack 2 at a charging voltage that is the permitted charging voltage or lower and at a charging current that is the permitted charging current or lower. When the charging voltage reaches the charging-current-reduction start voltage during the charging of the battery pack 2, the charger 400 gradually reduces the charging current. Then, when the charging current is reduced to the cut-off current during the charging of the battery pack 2, the charger 400 terminates the charging of the battery pack 2. It is noted that, in case a charging termination instruction is received from the battery pack 2 during the charging of the battery pack 2, the charger 400 terminates the charging of the battery pack 2 at that time.

Various processes executed by the control circuit board 44 in connection with the charging of the battery pack 2 will be described hereinbelow. The control circuit board 44 of the battery pack 2 executes a charging-start determination process shown in FIG. 29 while the battery pack 2 is attached to a battery pack mount 404 of the charger 400.

In S2, the control circuit board 44 obtains the temperature detected using the first thermistor 90 as a first temperature as well as a temperature detected using the second thermistor 92 as a second temperature.

Figure 30:
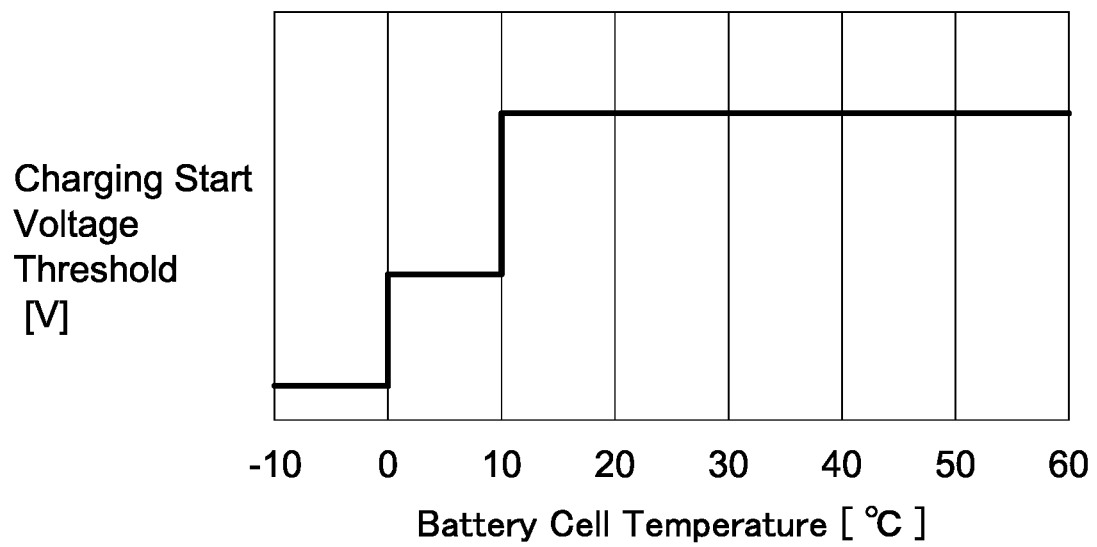
FIG. 30 is a graph showing an example of a correspondence relationship between battery cell temperatures and charging-start voltage thresholds, which the control circuit board 44 of the battery pack 2 according to the embodiment shows.

In S4, the control circuit board 44 determines a first charging-start voltage threshold. The control circuit board 44 stores in advance a correspondence relationship between battery cell temperatures and charging-start voltage thresholds, which is shown in FIG. 30. In the correspondence relationship of FIG. 30, charging-start voltage thresholds for low battery cell temperatures are set lower than a charging-start voltage threshold for an ordinary battery cell temperature, while the charging-start voltage threshold for high battery cell temperatures is set equal to the charging-start voltage threshold for the ordinary battery cell temperature. The control circuit board 44 specifies the first charging-start voltage threshold by using the first temperature and the correspondence relationship of FIG. 30.

In S6, the control circuit board 44 specifies a second charging-start voltage threshold. The control circuit board 44 specifies the second charging-start voltage threshold by using the second temperature and the correspondence relationship of FIG. 30.

In S8, the control circuit board 44 specifies a charging-start voltage threshold. In the present embodiment, the control circuit board 44 specifies the lower one of the first and second charging-start voltage thresholds as the charging-start voltage threshold.

In S10, the control circuit board 44 determines whether voltages of all the battery cells 40 are lower than the charging-start voltage threshold. In case the voltage of any of the battery cells 40 is the charging-start voltage threshold or higher (in case of NO), the process returns to S2. In case the voltage of all the battery cells 40 is lower than the charging-start voltage threshold (in case of YES), the process proceeds to S12.

In S12, the control circuit board 44 obtains the temperature detected using the first thermistor 90 as the first temperature as well as the temperature detected using the second thermistor 92 as the second temperature.

In S14, the control circuit board 44 determines whether both the first temperature and the second temperature are lower than a predetermined charging-start upper limit temperature (e.g., 55° C.). In case either of the first temperature and the second temperature is the charging-start upper limit temperature or higher (in case of NO), the process returns to S12. In case both the first temperature and the second temperature are lower than the charging-start upper limit temperature (in case of YES), the process proceeds to S16.

In S16, the control circuit board 44 determines whether both the first temperature and the second temperature are higher than a predetermined charging-start lower limit temperature (e.g., 2° C.). In case either of the first temperature and the second temperature is the charging-start lower limit temperature or lower (in case of NO), the process returns to S12. In case both the first temperature and the second temperature are higher than the charging-start lower limit temperature (in case of YES), the process proceeds to S18.

Figure 29:
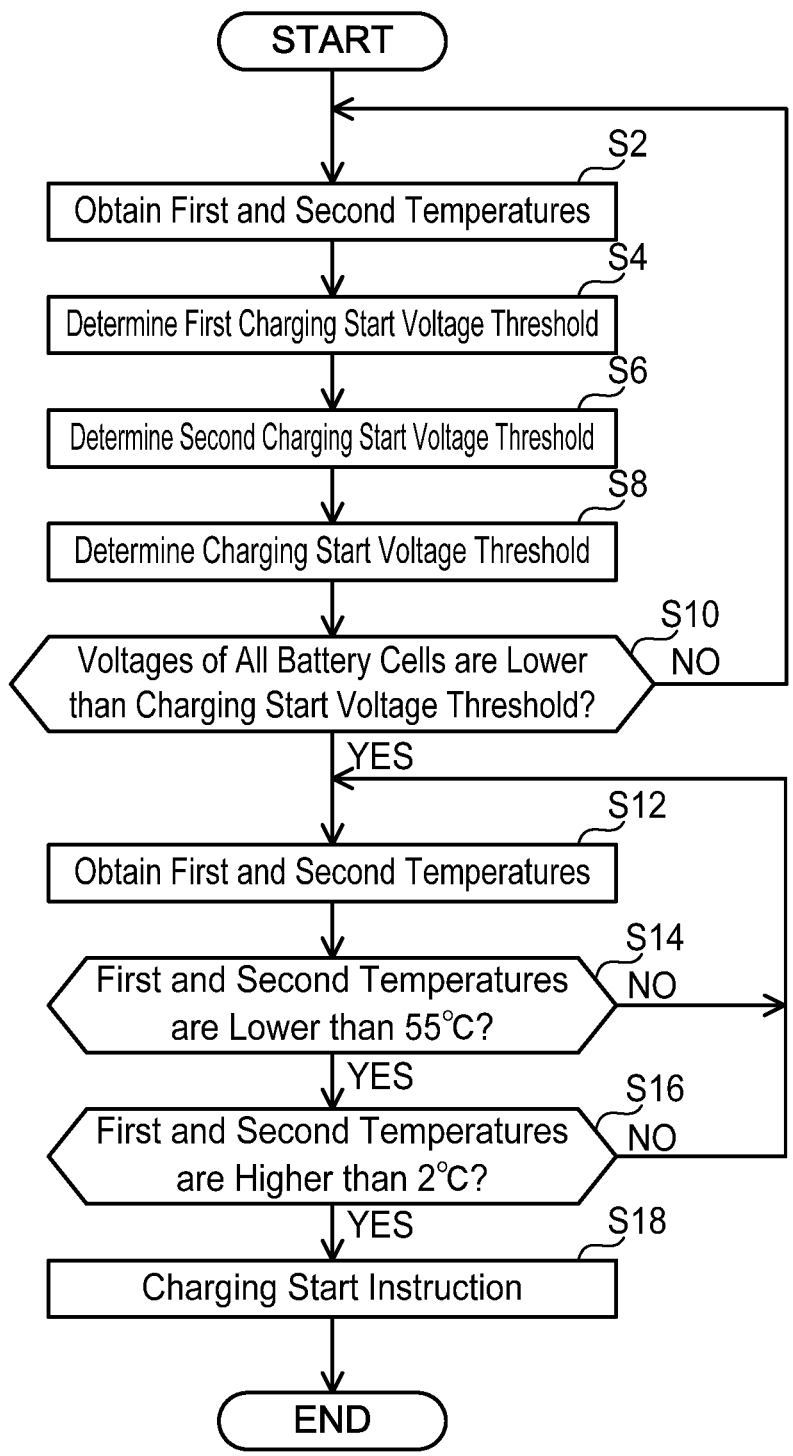
FIG. 29 is a flowchart of a charging-start determination process, which the control circuit board 44 of the battery pack 2 according to the embodiment executes.

In S18, the control circuit board 44 outputs the charging start instruction to the charger 400. By doing this, charging of the battery pack 2 by the charger 400 starts. After S18, the process of FIG. 29 is terminated.

Figure 31:
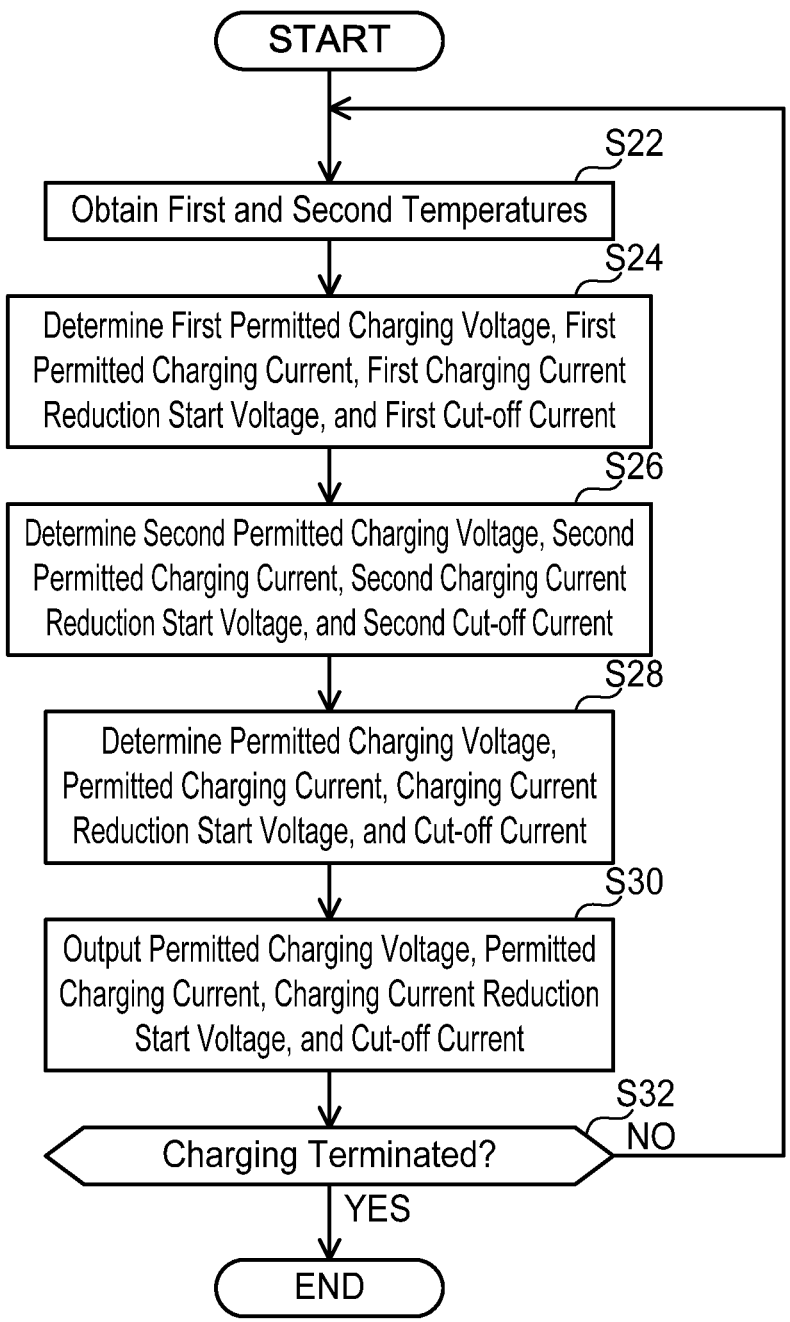
FIG. 31 is a flowchart of a charging parameter creation process, which the control circuit board 44 of the battery pack 2 according to the embodiment executes.
Figure 32:
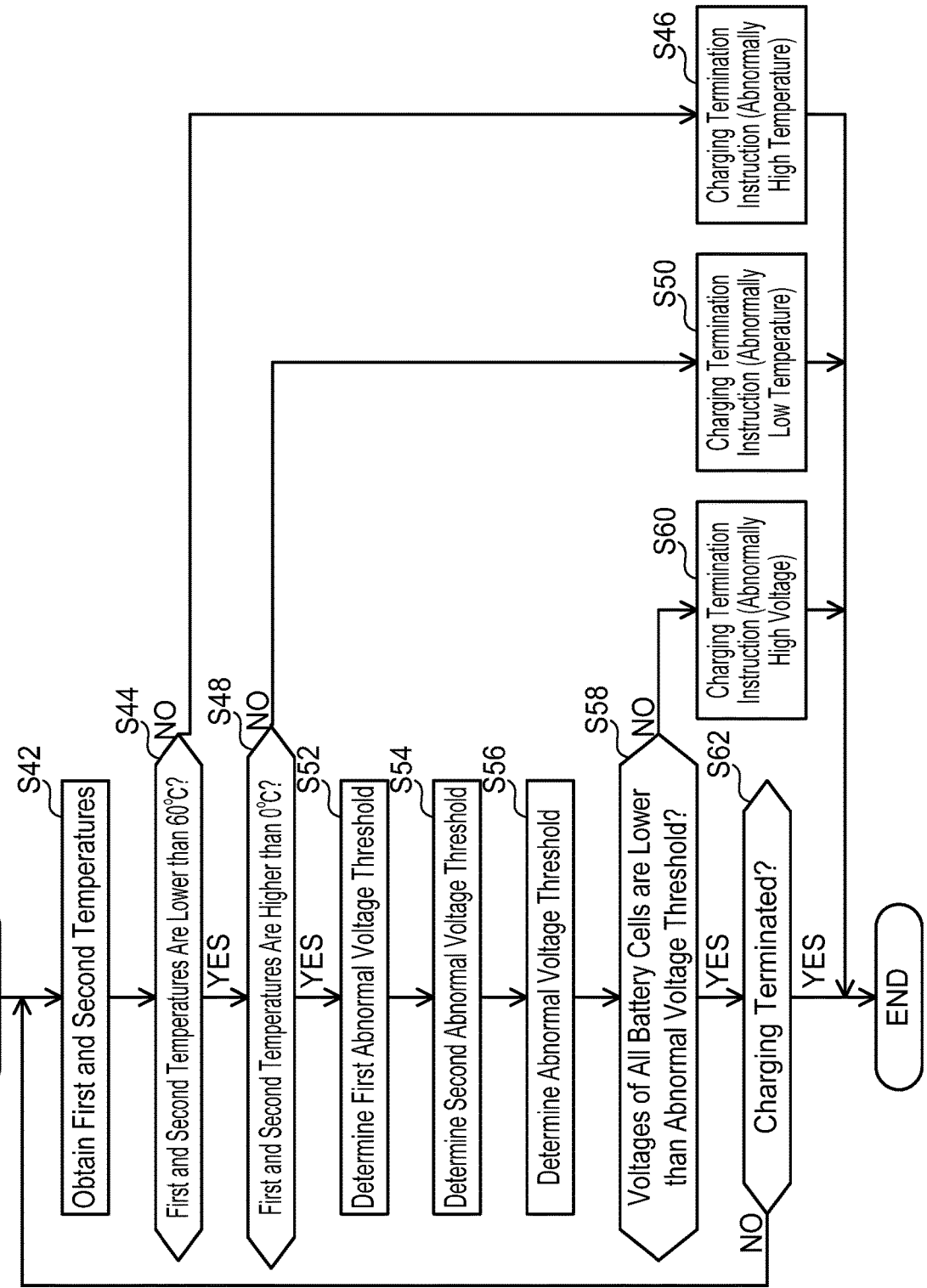
FIG. 32 is a flowchart of a charging abnormality determination process, which the control circuit board 44 of the battery pack 2 according to the embodiment executes.

While the battery pack 2 is being charged by the charger 400, the control circuit board 44 of the battery pack 2 simultaneously executes a charging parameter creation process shown in FIG. 31 and a charging abnormality determination process shown in FIG. 32.

The charging parameter creation process shown in FIG. 31 will be described hereinbelow. In S22, the control circuit board 44 obtains the temperature detected using the first thermistor 90 as the first temperature as well as the temperature detected using the second thermistor 92 as the second temperature.

Figure 33:
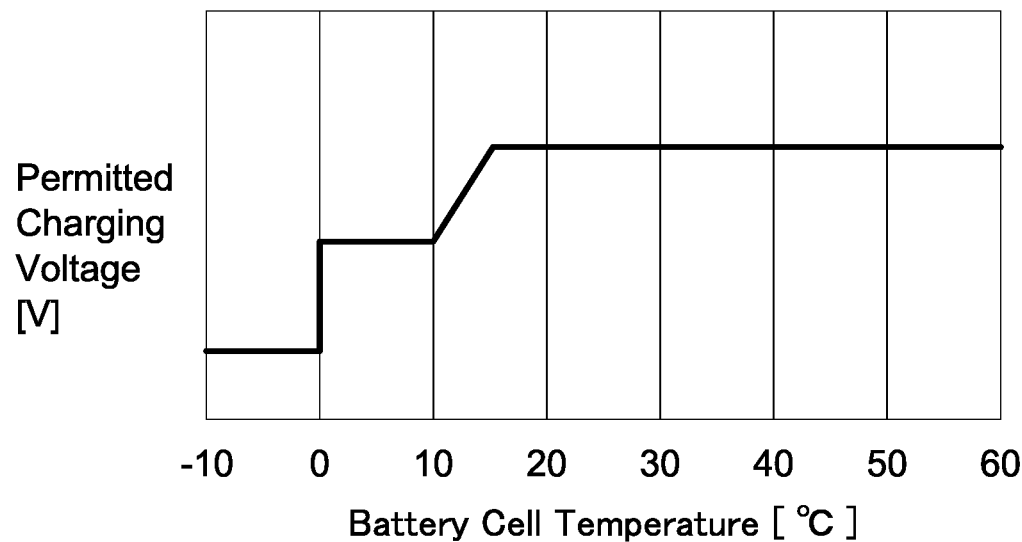
FIG. 33 is a graph showing an example of a correspondence relationship between battery cell temperatures and permitted charging voltages, which the control circuit board 44 of the battery pack 2 according to the embodiment stores.
Figure 34:
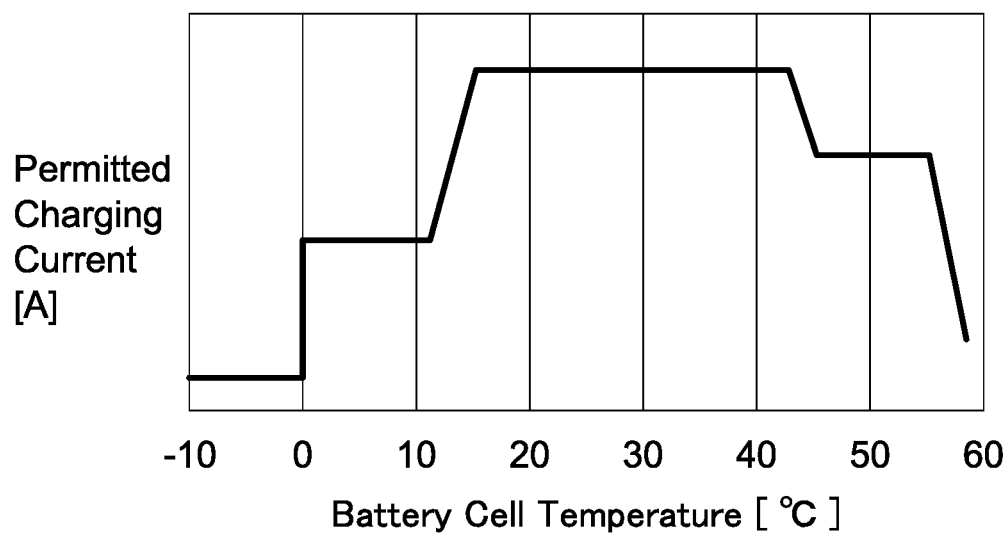
FIG. 34 is a graph showing an example of a correspondence relationship between battery cell temperatures and permitted charging currents, which is stored in the control circuit board 44 of the battery pack 2 according to the embodiment.
Figure 35:
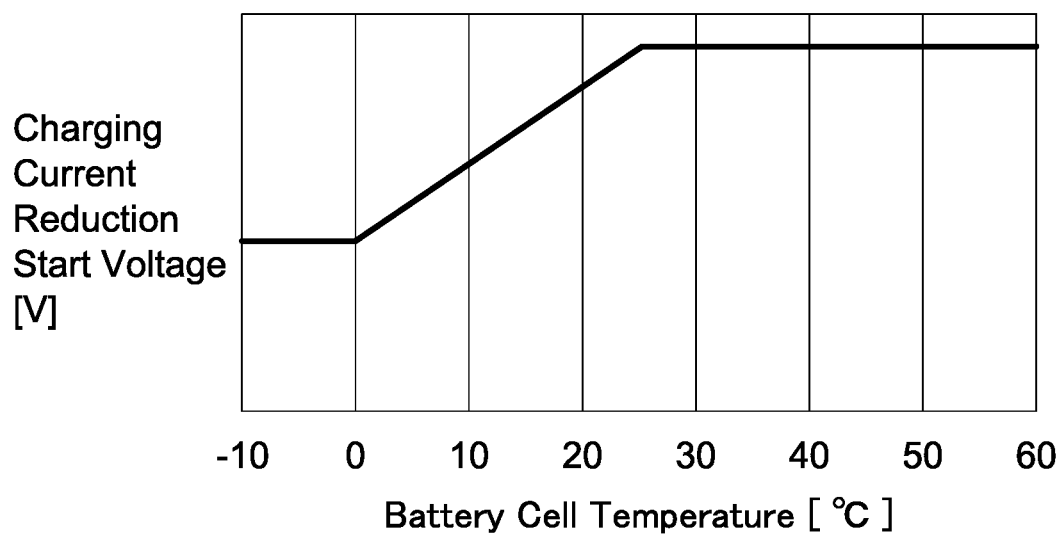
FIG. 35 is a graph showing an example of a correspondence relationship between battery cell temperatures and charging-current-reduction start voltages, which the control circuit board 44 of the battery pack 2 according to the embodiment stores.
Figure 36:
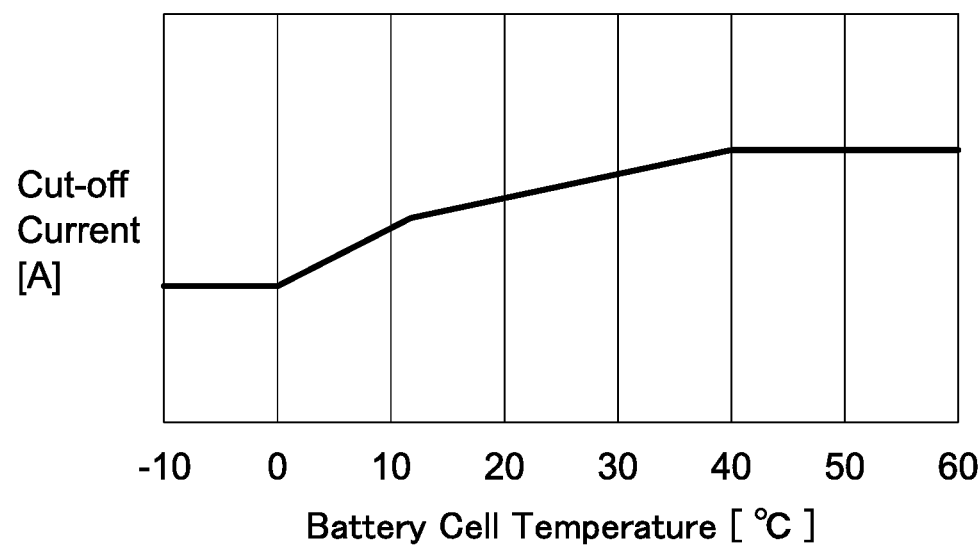
FIG. 36 is a graph showing an example of a correspondence relationship between battery cell temperatures and cut-off currents, which the control circuit board 44 of the battery pack 2 according to the embodiment stores.

In S24, the control circuit board 44 determines a first permitted charging voltage, a first permitted charging current, a first charging-current-reduction start voltage, and a first cut-off current. The control circuit board 44 stores in advance a correspondence relationship between battery cell temperatures and permitted charging voltages, which is shown in FIG. 33; a correspondence relationship between battery cell temperatures and permitted charging currents, which is shown in FIG. 34; a correspondence relationship between battery cell temperatures and charging-currentreduction start voltages, which is shown in FIG. 35; and a correspondence relationship between battery cell temperatures and cut-off currents, which is shown in FIG. 36. In the correspondence relationship of FIG. 33, permitted charging voltages for low battery cell temperatures are set lower than a permitted charging voltage for an ordinary battery cell temperature, while a permitted charging voltage for high battery cell temperatures is set equal to the permitted charging voltage for the ordinary battery cell temperature. In the correspondence relationship of FIG. 34, permitted charging currents for low battery cell temperatures are set lower than a permitted charging current for the ordinary battery cell temperature, while permitted charging currents for high battery cell temperatures are set lower than the permitted charging current for the ordinary battery cell temperature. In the correspondence relationship of FIG. 35, charging-current-reduction start voltages for low battery cell temperatures are set lower than a charging-current-reduction start voltage for the ordinary battery cell temperature, while a charging-current-reduction start voltage for high battery cell temperatures is set equal to the charging-current-reduction start voltage for the ordinary battery cell temperature. In the correspondence relationship of FIG. 36, cut-off currents for low battery cell temperatures are set lower than a cut-off current for the ordinary battery cell temperature, while cut-off currents for high battery cell temperatures are set higher than the cut-off current for the ordinary battery cell temperature. The control circuit board 44 specifies the first permitted charging voltage, the first permitted charging current, the first charging-current-reduction start voltage, and the first cut-off current by using the first temperature and the correspondence relationships of FIGS. 33 to 36.

In S26, the control circuit board 44 determines a second permitted charging voltage, a second permitted charging current, a second charging-current-reduction start voltage, and a second cut-off current. The control circuit board 44 specifies the second permitted charging voltage, the second permitted charging current, the second charging-current-reduction start voltage, and the second cut-off current by using the second temperature and the correspondence relationships of FIGS. 33 to 36.

In S28, the control circuit board 44 specifies a permitted charging voltage, a permitted charging current, a charging-current-reduction start voltage, and a cut-off current. In the present embodiment, the control circuit board 44 specifies the lower one of the first and second permitted charging voltages as the permitted charging voltage. Similarly, the control circuit board 44 specifies the lower one of the first and second permitted charging currents as the permitted charging current, specifies the lower one of the first and second charging-current-reduction start voltages as the charging-current-reduction start voltage, and specifies the lower one of the first and second cut-off currents as the cut-off current.

In S30, the control circuit board 44 outputs the permitted charging voltage, the permitted charging current, the charging-current-reduction start voltage, and the cut-off current to the charger 400. The charger 400 performs the charging process of the battery pack 2 based on the permitted charging voltage, the permitted charging current, the charging-current-reduction start voltage, and the cut-off current that were outputted from the battery pack 2.

In S32, the control circuit board 44 determines whether the charging by the charger 400 has been terminated. In case the charging has not been terminated yet (in case of NO), the process returns to S22. In case the charging has been terminated (in case of YES), the process of FIG. 31 is terminated.

The charging abnormality determination process shown in FIG. 32 will be described hereinbelow. In S42, the control circuit board 44 obtains the temperature detected using the first thermistor 90 as the first temperature as well as the temperature detected using the second thermistor 92 as the second temperature.

In S44, the control circuit board 44 determines whether both the first temperature and the second temperature are lower than a predetermined charging upper limit temperature (e.g., 60° C.). In case either of the first temperature and the second temperature is the charging upper limit temperature or higher (in case of NO), the process proceeds to S46. In S46, the control circuit board 44 sends a charging termination instruction to the charger 400 due to abnormally high temperature, and the process of FIG. 32 is terminated. In case both the first temperature and the second temperature are lower than the charging upper limit temperature in S44 (in case of YES), the process proceeds to S48.

In S48, the control circuit board 44 determines whether both the first temperature and the second temperature are higher than a predetermined charging lower limit temperature (e.g., 0° C.). In case either of the first temperature and the second temperature is lower than the charging lower limit temperature (in case of NO), the process proceeds to S50. In S50, the control circuit board 44 sends a charging termination instruction to the charger 400 due to abnormally low temperature, and the process of FIG. 32 is terminated. In case both the first temperature and the second temperature are higher than the charging lower limit temperature in S48 (in case of YES), the process proceeds to S52.

Figure 37:
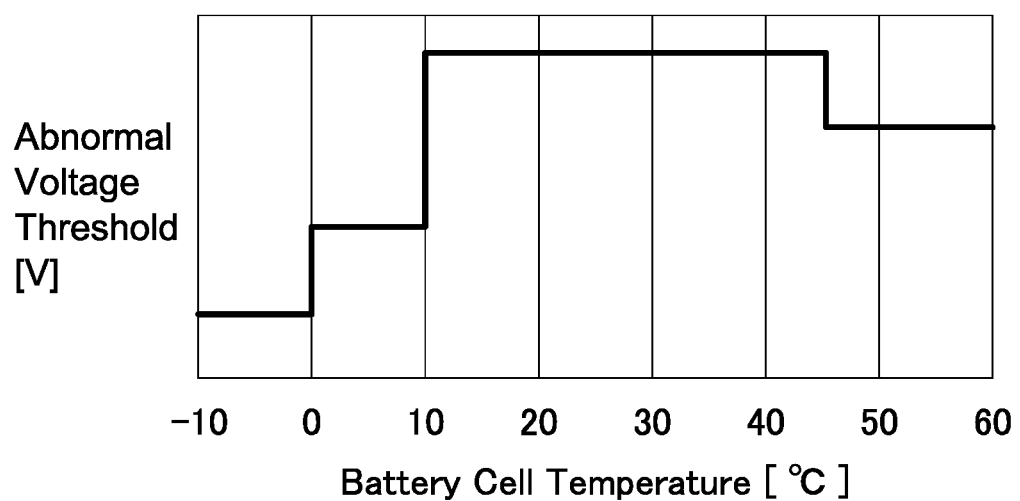
FIG. 37 is a graph showing an example of a correspondence relationship between battery cell temperatures and abnormal voltage thresholds, which the control circuit board 44 of the battery pack 2 according to the embodiment stores.

In S52, the control circuit board 44 determines a first abnormal voltage threshold. The control circuit board 44 stores in advance a correspondence relationship between battery cell temperatures and abnormal voltage thresholds, which is shown in FIG. 37. In the correspondence relationship of FIG. 37, abnormal voltage thresholds for low battery cell temperatures are set lower than an abnormal voltage threshold for the ordinary battery cell temperature, while an abnormal voltage threshold for high battery cell temperatures is set lower than the abnormal voltage threshold for the ordinary battery cell temperature. The control circuit board 44 specifies the first abnormal voltage threshold by using the first temperature and the correspondence relationship of FIG. 37.

In S54, the control circuit board 44 specifies a second abnormal voltage threshold. The control circuit board 44 specifies the second abnormal voltage threshold by using the second temperature and the correspondence relationship of FIG. 37.

In S56, the control circuit board 44 specifies an abnormal voltage threshold. In the present embodiment, the control circuit board 44 specifies the lower one of the first and second abnormal voltage thresholds as the abnormal voltage threshold.

In S58, the control circuit board 44 determines whether voltages of all the battery cells 40 are lower than the abnormal voltage threshold. In case the voltage of any one of the battery cells 40 is the abnormal voltage threshold or higher (in case of NO), the process proceeds to S60. In S60, the control circuit board 44 sends a charging termination instruction to the charger 400 due to abnormally high voltage, and the process of FIG. 32 is terminated. In case the voltages of all the battery cells 40 are lower than the abnormal voltage threshold in S58 (in case of YES), the process proceeds to S62.

In S62, the control circuit board 44 determines whether the charging by the charger 400 has been terminated. In case the charging has not been terminated yet (in case of NO), the process returns to S42. In case the charging has been terminated (in case of YES), the process of FIG. 32 is terminated.

It is noted that, while the charger 400 is performing the charging of the battery pack 2, the control circuit board 408 of the charger 400 obtains the temperature detected using the first thermistor 90 and the temperature detected using the second thermistor 92 from the battery pack 2, and controls the operation of the blower fan 418. When the charger 400 starts a charging operation on the battery pack 2, the control circuit board 408 executes a blower control process shown in FIG. 38.

In S72, the control circuit board 408 drives the blower fan 418.

Figure 38:
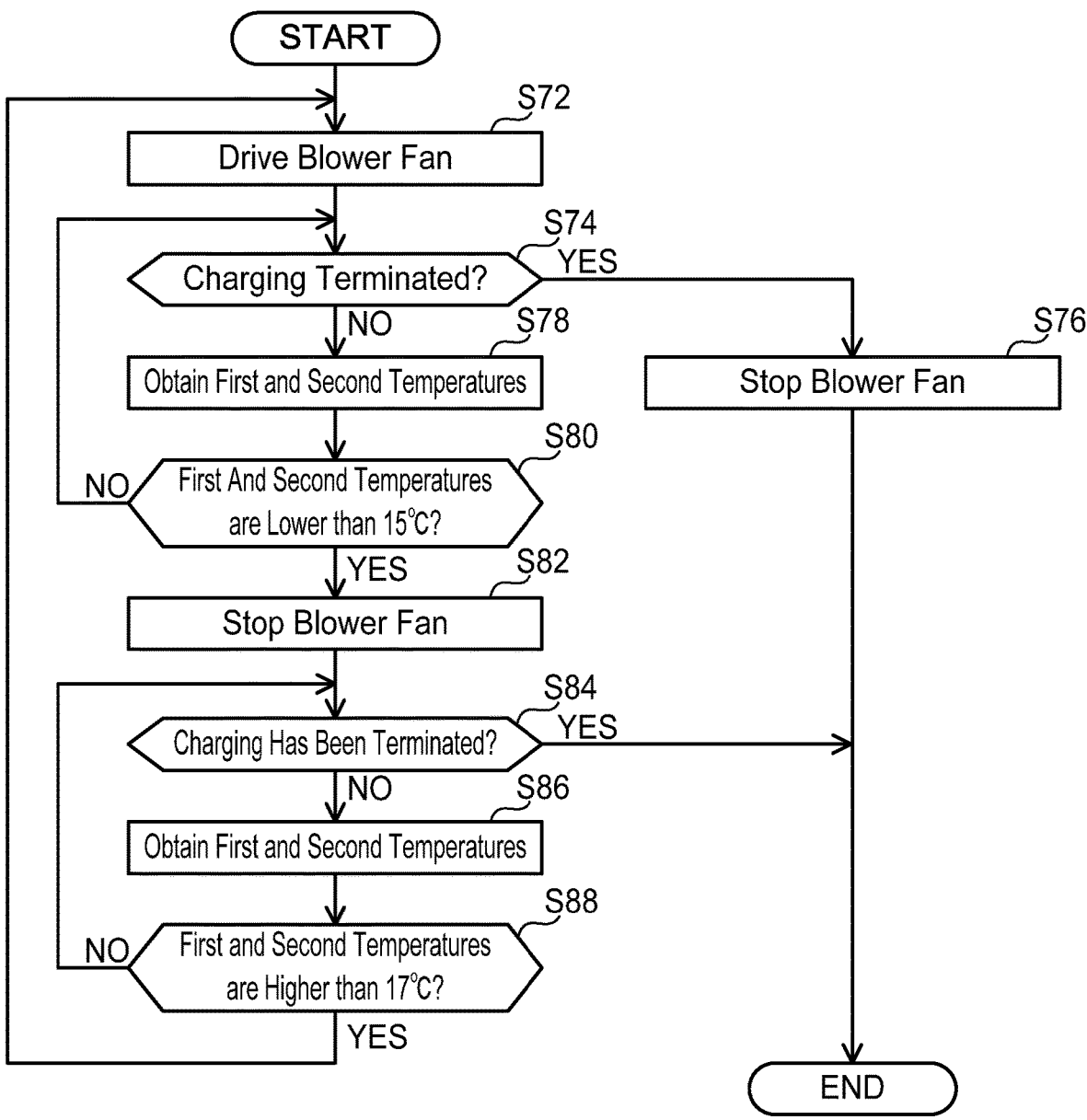
FIG. 38 is a flowchart of a blower control process, which a control circuit board 408 of the charger 400 according to the embodiment executes.

In S74, the control circuit board 408 determines whether the charging of the battery pack 2 has been terminated. In case the charging has been terminated (in case of YES), the process proceeds to S76. In S76, the control circuit board 408 stops the blower fan 418, and the process of FIG. 38 is terminated. In case the charging has not been terminated yet in S74 (in case of NO), the process proceeds to S78.

In S78, the control circuit board 408 obtains the temperature detected using the first thermistor 90 as the first temperature as well as the temperature detected using the second thermistor 92 as the second temperature.

In S80, the control circuit board 408 determines whether both the first temperature and the second temperature are lower than a predetermined blower stop temperature (e.g., 15° C.). In case either of the first temperature and the second temperature is the blower stop temperature or higher (in case of NO), the process returns to S74. In case both the first temperature and the second temperature are lower than the blower stop temperature (in case of YES), the process proceeds to S82.

In S82, the control circuit board 408 stops the blower fan 418.

In S84, the control circuit board 408 determines whether the charging with regard to the battery pack 2 has been terminated. In case the charging has been terminated (in case of YES), the process of FIG. 38 is terminated. In case the charging has not been terminated yet (in case of NO), the process proceeds to S86.

In S86, the control circuit board 408 obtains the temperature detected using the first thermistor 90 as the first temperature as well as the temperature detected using the second thermistor 92 as the second temperature.

In S88, the control circuit board 408 determines whether both the first temperature and the second temperature are higher than a predetermined blower start temperature (e.g., 17° C.). In case either of the first temperature and the second temperature is the blower start temperature or lower (in case of NO), the process returns to S84. In case both the first temperature and the second temperature are higher than the blower start temperature (in case of YES), the process returns to S72.

A process executed by the control circuit board 44 in connection with discharging of the battery pack 2 will be described hereinbelow. The control circuit board 44 of the battery pack 2 executes a discharge-abnormality determination process shown in FIG. 39 while the battery pack 2 is attached to the battery pack mount 202 of the electrical device 200 and is discharging to the electrical device 200.

In S92, the control circuit board 44 obtains the temperature detected using the first thermistor 90 as the first temperature as well as the temperature detected using the second thermistor 92 as the second temperature.

Figure 39:
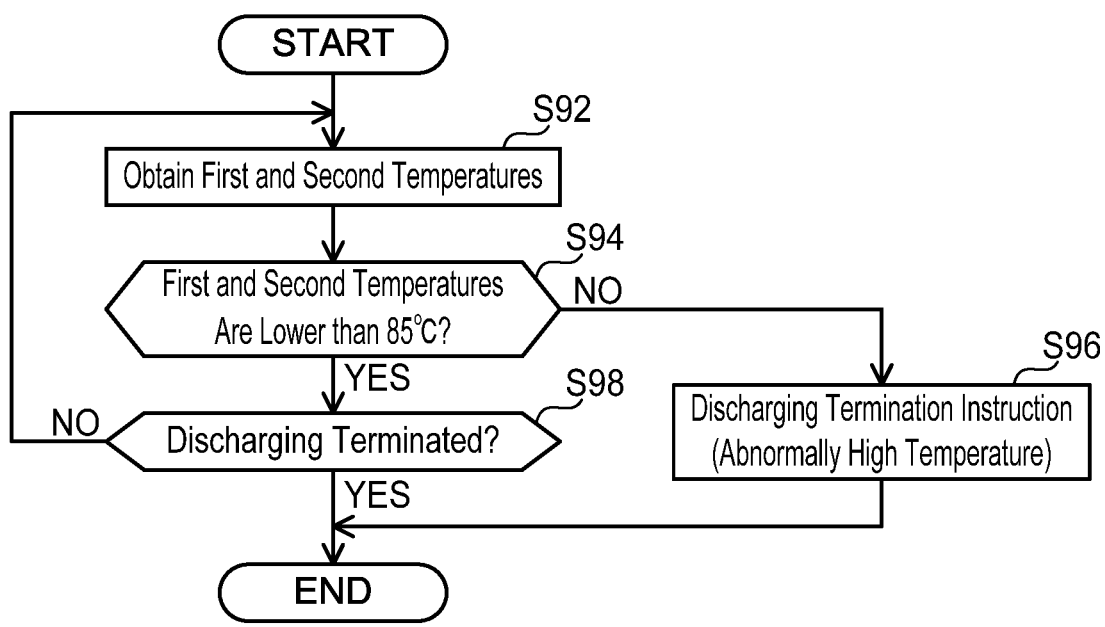
FIG. 39 is a flowchart of a discharge-abnormality determination process, which the control circuit board 44 of the battery pack 2 according to the embodiment executes.

In S94, the control circuit board 44 determines whether both the first temperature and the second temperature are lower than a predetermined discharging upper limit temperature (e.g., 85° C.). In case either of the first temperature and the second temperature is the discharging upper limit temperature or higher (in case of NO), the process proceeds to S96. In S96, the control circuit board 44 sends a discharging termination instruction to the electrical device 200 due to abnormally high temperature, and the process of FIG. 39 is terminated. In case both the first temperature and the second temperature are lower than the discharging upper limit temperature in S94 (in case of YES), the process proceeds to S98.

In S98, the control circuit board 44 determines whether the discharging to the electrical device 200 has been terminated. In case the discharging has not been terminated yet (in case of NO), the process returns to S92. In case the discharging has been terminated (in case of YES), the process of FIG. 39 is terminated.

In the above-described embodiment, the side plates 208a of the protective ribs 208 of the electrical device 200 may be disposed only on both sides of the power terminals 204 and need not be disposed on both sides of the signal terminals 206. Corresponding to this, the recessed grooves 76 of the battery pack 2 may be provided only on both sides of the power terminals 60 and need not be provided on both sides of the signal terminals 62.

In the above-described embodiment, although the power terminals 60 of the battery pack 2 are disposed such that the signal terminals 62 are sandwiched from both sides in the right-left direction, the arrangement of the power terminals 60 and the signal terminals 62 may be another arrangement. Corresponding to this, the arrangement of the power terminals 204 and the signal terminals 206 of the electrical device 200 and the arrangement of the power terminals 410 and the signal terminals 412 of the charger 400 may be an arrangement that differs from the above-described embodiment, as long as it corresponds to the arrangement for the power terminals 60 and the signal terminals 62 of the battery pack 2.

In the above-described embodiment, although the power terminals 60 and the signal terminals 62 of the battery pack 2 are installed on the control circuit board 44, the power terminals 60 and the signal terminals 62 may be installed on another terminal circuit board (not shown) that is separate from the control circuit board 44 and is electrically connected to the control circuit board 44.

Figure 43:
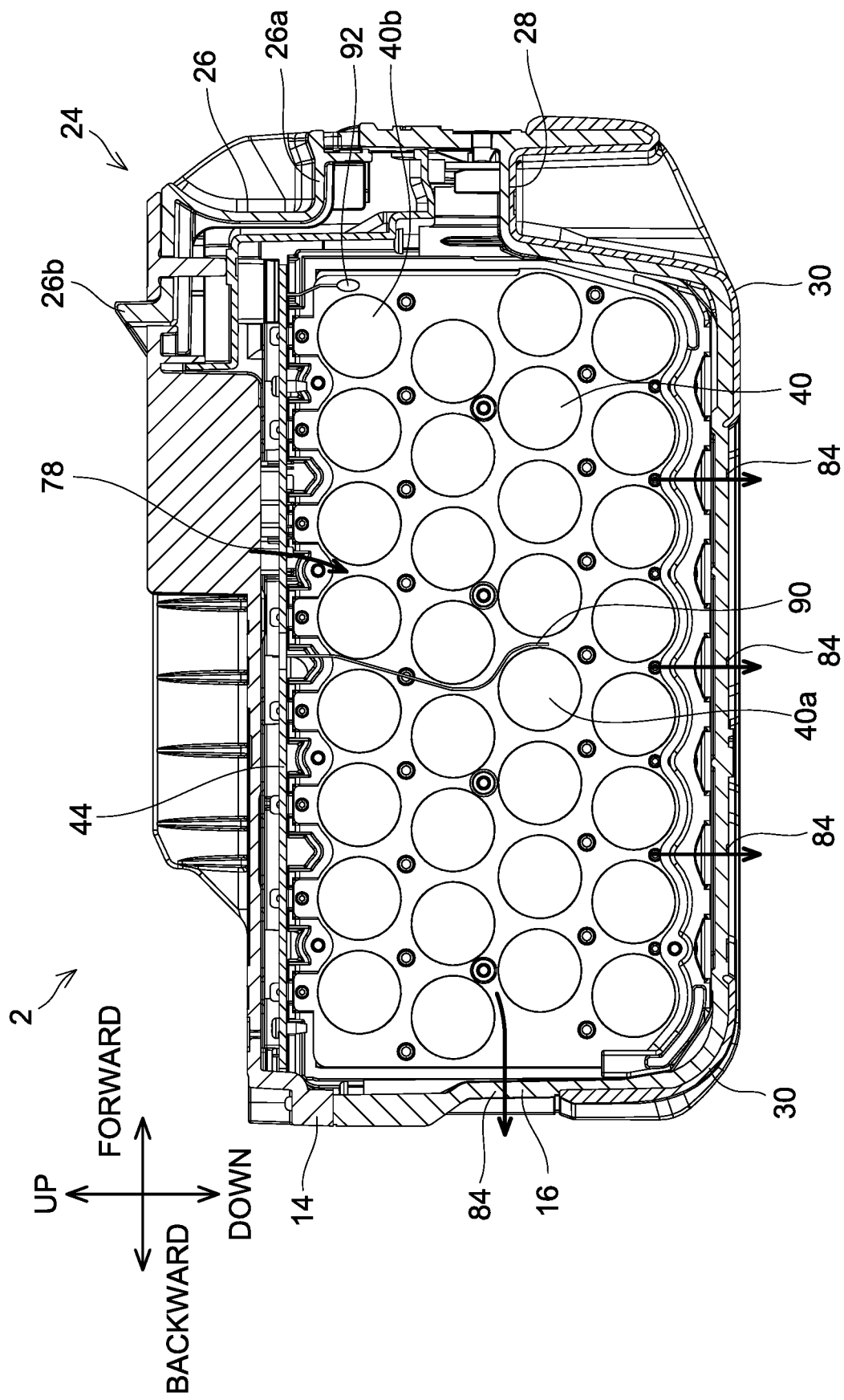
FIG. 43 is a cross-sectional view of a battery pack 2 according to yet another modified example, as viewed from the right side.

In the above-described embodiment, the blower fans 418 of the charger 400 are configured to suction air from the battery pack mounts 404. Unlike this, the blower fans 418 may be configured to discharge air toward the battery pack mounts 404. In this case, as shown in FIG. 43, the vent holes 78 of the battery pack 2 function as air supply holes through which air is introduced from the outside into the battery pack 2, and the air supply holes 84 of the battery pack 2 function as air discharge holes through which air is discharged from the interior of the battery pack 2 to the outside. In the example shown in FIG. 43, the hook mount portion 24 of the upper case 14 does not function as an air supply hole 84 because the clearance between the hook 26 and the upper case 14 is closed such that air cannot flow therethrough. In this case, air that has entered the battery pack 2 through the vent holes 78 flows through the slits 80 of the control circuit board 44, then flows through the openings 82 of the cell holder 42, and flows into the spaces between the battery cells 40. The air, which entered the spaces between the battery cells 40, cools the battery cells 40 and then flows out to the outside of the battery pack 2 through the air supply holes 84. In the example shown in FIG. 43, the first thermistor 90 is disposed at a position where the distance from the position to the air supply holes 84 through which air flows out to the outside from the inside of the battery pack 2 is shorter than the distance from the position to the vent holes 78 through which air flows into the battery pack 2 from the outside, while the second thermistor 92 is disposed at a position where the distance from the position to the vent holes 78 through which air flows into the battery pack 2 from the outside is shorter than the distance from the position to the air supply holes 84 through which air flows out to the outside from the interior of the battery pack 2. In the example of FIG. 43 as well, the battery cell 40*a*, which the first thermistor 90 detects the temperature, has the highest temperature among the battery cells 40 during charging, and the battery cell 40*b*, which the first thermistor 90 detects the temperature, has the lowest temperature among the battery cells 40 during charging. As such, by using the first thermistor 90 and the second thermistor 92, the temperature of the battery cell 40*a*, which is the highest among the battery cells 40 during charging of the battery pack 2, and the temperature of the battery cell 40*b*, which is the lowest among the battery cells 40 during the charging, can be obtained.

Figure 44:
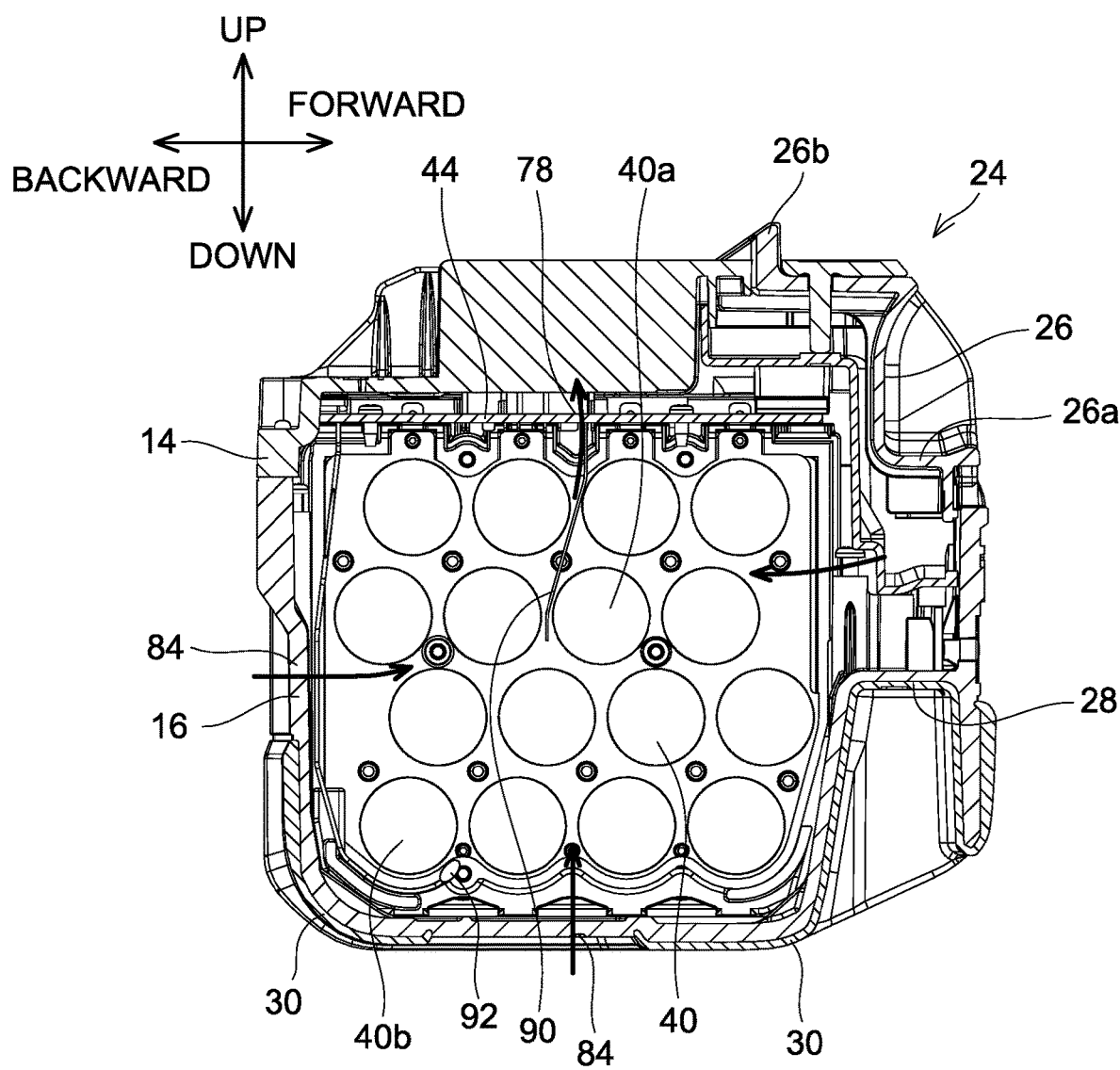
FIG. 44 is a cross-sectional view of a battery pack 2 according to still another modified example, as viewed from the right side.

In the above-described embodiment, a case was described in which the battery pack 2 comprises thirty-two battery cells 40, the nominal voltage of the battery pack 2 is 64 V, and the nominal capacity of the battery pack 2 is 5 Ah. Unlike this, the battery pack 2 may comprise sixteen battery cells 40, the nominal voltage of the battery pack 2 may be 64 V, and the nominal capacity of the battery pack 2 may be 2.5 Ah. In this case, as shown in FIG. 44, the battery cells 40 are arranged in four abreast in the up-down direction and also are arranged four abreast in the front-rear direction. In case the first thermistor 90 and the second thermistor 92 have been disposed as shown in FIG. 44, the battery cell 40*a*, which the first thermistor 90 detects the temperature, has the highest temperature among the battery cells 40 during charging, and the battery cell 40*b*, which the second thermistor 92 detects the temperature, has the lowest temperature among the battery cells 40 during charging. As such, by using the first thermistor 90 and the second thermistor 92, the temperature of the battery cell 40*a*, which is the highest among the battery cells 40 during charging to the battery pack 2, and the temperature of the battery cell 40*b*, which is the lowest among the battery cells 40 during the charging, can be obtained.

Figure 45:
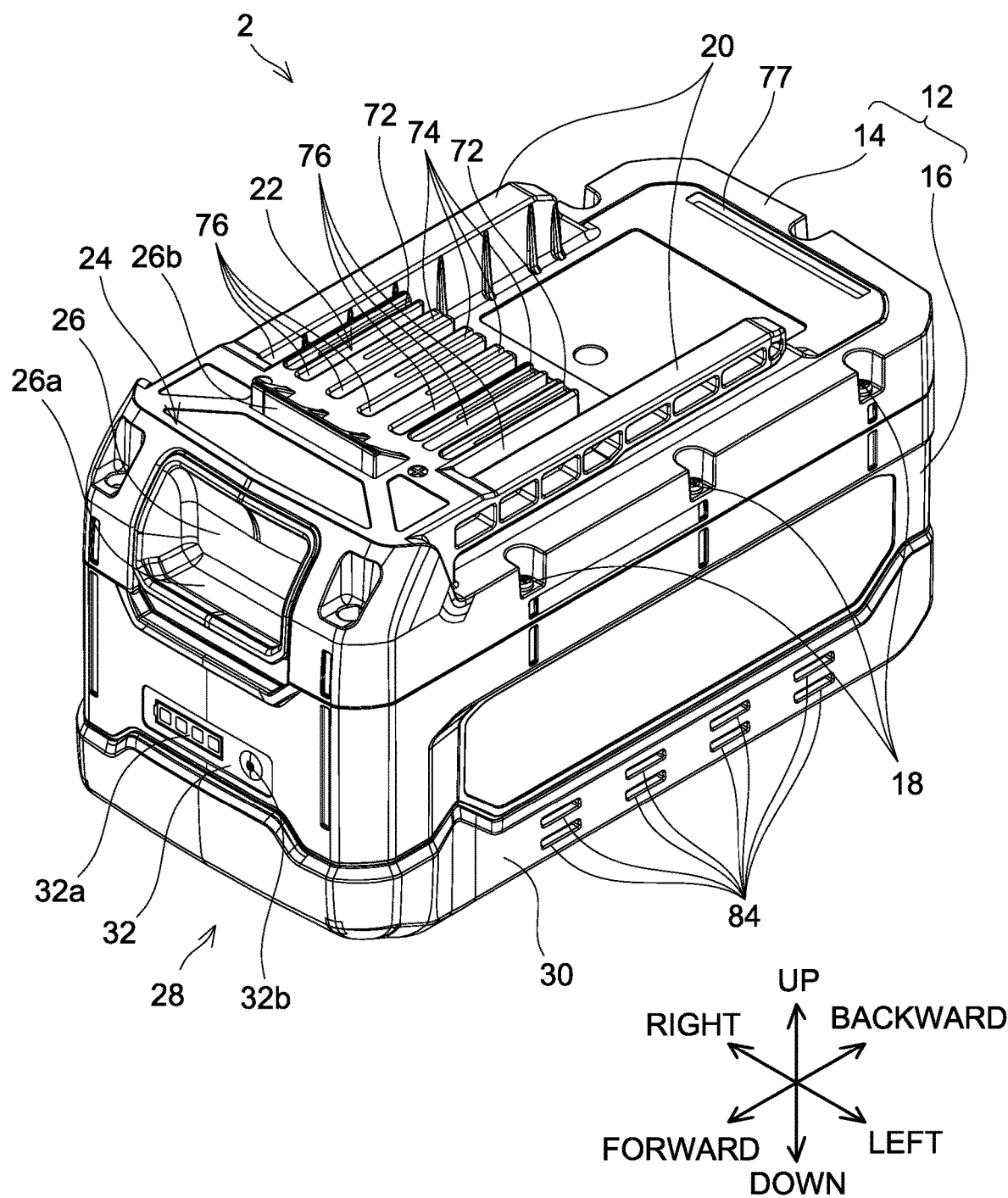
FIG. 45 is a perspective view of a battery pack 2 according to still another modified example, as viewed from the upper front left side.
Figure 46:
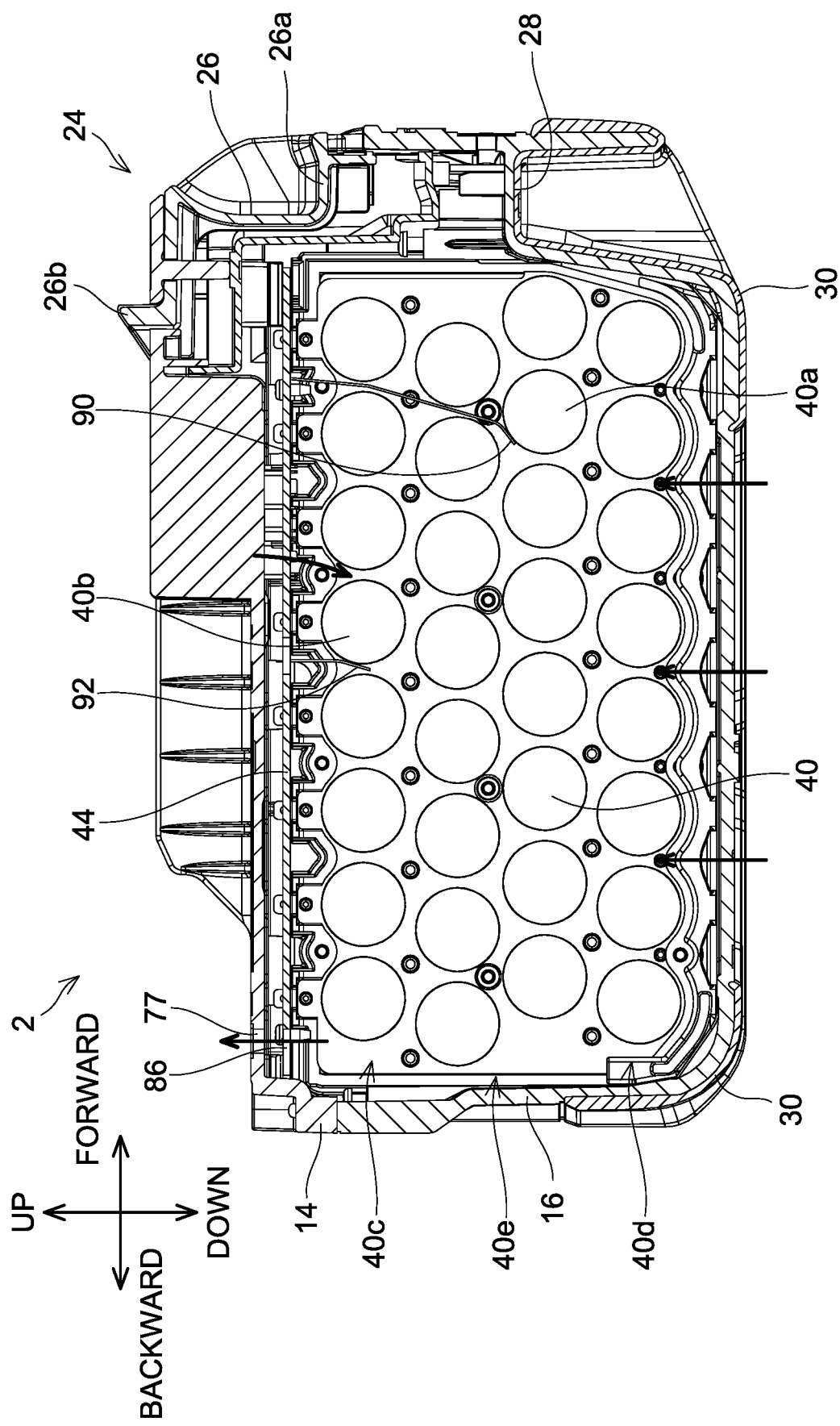
FIG. 46 is a cross-sectional view of the battery pack 2 shown in FIG. 45, as viewed from the right side.

The battery pack 2 may be configured as shown in FIGS. 45 and 46. In the battery pack 2 according to the present modified example, the air supply holes 84 are formed in lower portions of right and left surfaces of the lower case 16 and the lower surface of the lower case 16, and are not formed in any other places. In addition, in the battery pack 2 according to the present modified example, the vent holes 78, 79 are not formed in the upper case 14, but instead a vent hole 77 is formed in a rear portion of the upper surface of the upper case 14. As shown in FIG. 46, in the battery pack 2 according to the present modified example, a notch 86 is formed in a rear end of the control circuit board 44. The notch 86 is disposed at a position facing the vent hole 77 of the upper case 14. In addition, although not shown, an air supply passage that communicates with the blower fan 418 is provided in the charger 400 corresponding to the battery pack 2 according to the present modified example. The air supply passage is disposed at a position facing the vent hole 77 when the battery pack 2 is attached. When the blower fan 418 of the charger 400 is driven with the battery pack 2 attached to the charger 400, air is suctioned from the interior of the case 12 of the battery pack 2, through the vent hole 77, to the air supply passage of the charger 400. In this way, air flows in the battery pack 2 from the outside through the air supply holes 84, the power terminal openings 72, and the signal terminal openings 74 into the interior. The air, which flowed into the interior of the battery pack 2, flows through spaces between the battery cells 40, the notch 86 of the control circuit board 44, and the vent hole 77 of the upper case 14, and then flows out to the outside of the battery pack 2. During this, the plurality of battery calls 40 is cooled by the air flowing therearound.

As shown in FIG. 46, in the battery pack 2 according to the present modified example, the first thermistor 90 and the second thermistor 92 are both film thermistors. The first thermistor 90 is disposed in a middle row of the plurality of battery calls 40 and detects the temperature of the battery cell 40*a* disposed at a position that is spaced apart from the vent hole 77. The second thermistor 92 is disposed in the upper row of the plurality of battery cells 40 and detects the temperature of the battery cell 40*b* disposed near the center in the front-rear direction. That is, in the present modified example, the battery cell 40*a* is included in the middle battery cell group 40*e*, and the battery cell 40*b* is included in the upper battery cell group 40*c*. The first thermistor 90 is disposed near the central portion of the battery cell 40*a* with respect to the right-left direction. The second thermistor 92 is disposed near an end portion of the battery cell 40*b* with respect to the right-left direction.

In the battery pack 2 according to the present modified example, with regard to the battery cell 40*a*, heat dissipation is difficult since it is surrounded by other battery cells 40. Further, the battery cell 40*a* is difficult to cool since the air does not flow much around the battery cell 40*a* when the blower fan 418 of the charger 400 is driven. Therefore, the battery cell 40*a* tends to have a high temperature during charging. To the contrary, with regard the battery cell 40*b*, heat dissipation is easy since it is not surrounded by other battery cells 40. Further, the battery cell 40*b* cools easily since the air that flowed in from the power terminal openings 72 and the signal terminal openings 74 of the upper case 14 and passed through the slits 80 of the control circuit board 44 flows near the battery cell 40*b* when the blower fan 418 of the charger 400 is driven. Therefore, the battery cell 40*b* tends to have a low temperature during charging. Owing to the configuration of the present modified example as well, the temperature of the battery cell 40*a* having a high temperature during charging can be obtained using the first thermistor 90 and the temperature of the battery cell 40*b* having a low temperature during charging can be obtained using the second thermistor 92.

As described above, in one or more embodiments, the battery pack 2 comprises the plurality of battery cells 40, the cell holder 42 holding the plurality of battery cells 40, and the case 12 accommodating the cell holder 42 therein. The case 12 comprises the lower case 16 (an example of a first case) and the upper case 14 (an example of a second case) fixed to the lower case 16. The cell holder 42 is fixed to the lower case 16 by the screws 70 (an example of a fastener). The screws 70 are shielded from the outside of the case 12 when the lower case 16 has been fixed to the upper case 14.

According to the above configuration, because the screws 70 that fix the cell holder 42 to the lower case 16 are shielded from the outside of the case 12, the effect of static electricity or the like on the exterior of the case 12 does not reach into the interior of the case 12 via the screws 70. In a battery pack 2 that comprises the case 12 accommodating the cell holder 42 holding the plurality of battery cells 40, the effect of static electricity or the like on the exterior of the case 12 can be curtailed from reaching into the interior of the case 12.

In one or more embodiments, the battery pack 2 further comprises the cushion material 68 interposed between the lower case 16 and the cell holder 42.

According to the above configuration, vibration and/or impact can be curtailed from being transmitted from the case 12 to the cell holder 42.

In one or more embodiments, the lower case 16 has a box shape in which the upper surface (an example of one side) is opened. The cell holder 42 is fixed to the lower case 16 by the screws 70 in the state in which the cell holder 42 has been placed on the inner bottom surface of the lower case 16. The screws 70 are fastened at positions spaced apart from the inner bottom surface of the lower case 16 compared the center of the cell holder 42 with respect to a direction orthogonal to the inner bottom surface of the lower case 16, namely with respect to the up-down direction.

According to the above configuration, the cell holder 42 which holds the plurality of battery cells 40 can be restrained from swaying with respect to the case 12.

In one or more embodiments, each of the plurality of battery cells 40 has the substantially cylindrical shape having the longitudinal direction in the right-left direction (an example of a first direction). The plurality of battery cells 40 is held in the cell holder 42 in the state in which the battery cells 40 are arranged side by side in the front-rear direction (an example of a second direction orthogonal to the first direction). The screws 70 are fastened at positions that are on an inner side relative to both ends of the plurality of battery cells 40 with respect to the right-left direction and are on an outer side relative to the outermost battery cell 40 among the plurality of battery cells 40 with respect to the front-rear direction.

In case each of the plurality of battery cells 40 has the substantially cylindrical shape having its longitudinal direction in the right-left direction and the plurality of battery cells 40 is held in the cell holder 42 in the state in which the battery cells 40 are arranged side by side in the front-rear direction, components, such as the lead plates 54, 56, which are connected to the electrodes of the battery cells 40, are provided at both ends of the plurality of battery cells 40 in the right-left direction. Therefore, if it is configured such that the screws 70 are fastened at positions that are on an outer side relative to both ends of the plurality of battery cells 40 with respect to the right-left direction and are on an inner side relative to the outermost battery cell 40 among the plurality of battery cells 40 with respect to the front-rear direction, it becomes necessary to avoid interference with the components near both ends of the battery cells 40 in the right-left direction, which results in an increase in size of the battery pack 2. As described above, by configuring it such that the screws 70 are fastened at positions that are on the inner side relative to both ends of the plurality of battery cells 40 with respect to the right-left direction and are on the outer sides relative to the outermost battery cell 40 among the plurality of battery cells 40 with respect to the front-rear direction, the cell holder 42 can be fixed to the lower case 16 by the screws 70 without increasing the size of the battery pack 2.

In one or more embodiments, the battery pack 2 further comprises the control circuit board 44 accommodated in the case 12 and electrically connected to the plurality of battery cells 40. The control circuit board 44 is fixed to the cell holder 42.

According to the above configuration, when manufacturing the battery pack 2, the control circuit board 44 and the cell holder 42 can be attached to the lower case 16 in an integrated manner with the control circuit board 44 fixed to the cell holder 42. Labor involved in manufacturing of the battery pack 2 can be reduced.

In one or more embodiments, in a plan view in a direction orthogonal to the control circuit board 44, namely from above, the screws 70 are fastened at positions on an outer side relative to the control circuit board 44.

According to the above configuration, when the cell holder 42 with the control circuit board 44 is fixed thereto is attached to the lower case 16, fastening work for the screws 70 can be performed without interference with the control circuit board 44. Labor involved in manufacturing of the battery pack 2 can be reduced.

In one or more embodiments, the battery pack 2 comprises the battery cells 40, the control circuit board 44 (an example of a circuit board) on which the power terminals 60 and the signal terminals 62 (an example of a plurality of terminals) have been provided, and the case 12 accommodating the battery cells 40 and the control circuit board 44 therein. The control circuit board 44 comprises the slits 80 (an example of a through hole) disposed between the power terminals 60 and the signal terminals 62. The case 12 comprises the vent holes 78 disposed at positions facing the slits 80 of the control circuit board 44.

According to the above configuration, because the vent holes 78 provided in the case 12 are disposed at positions facing the slits 80 provided in the control circuit board 44, air flowing in or flowing out through the vent holes 78 of the case 12 passes through the slits 80 of the control circuit board 44. As such, even if the battery cells 40 and the control circuit board 44 are disposed close to each other within the case 12, sufficient air can flow through between the battery cells 40 and the control circuit board 44 and thus the battery cells 40 located close to the control circuit board 44 can be sufficiently cooled. Further, according to the above configuration, the slits 80 provided in the control circuit board 44 are disposed between the power terminals 60 and the signal terminals 62. Therefore, even if a conductive substance, such as water, enters the interior of the case 12 and adheres to the control circuit board 44, the occurrence of short circuits between the power terminals 60 and the signal terminals 62 can be curtailed.

In one or more embodiments, the power terminals 60 and the signal terminals 62 include a first terminal (e.g., the power terminals 60) and a second terminal (e.g., the signal terminals 62 adjacent to the power terminals 60). The vent holes 78 comprise a plurality of holes 78a disposed between a region of the upper case 14 facing the first terminal (e.g., the power terminal 60) and a region of the upper case 14 facing the second terminal (e.g., the signal terminal 62 adjacent to the power terminal 60).

If the size of the vent holes 78 provided in the case 12 is large, although the amount of air passing through the vent holes 78 is increased, foreign matter tends to enter into the interior of the battery pack 2 through the vent holes 78. According to the above configuration, because the vent holes 78 comprise a plurality of holes 78a, the size of individual holes 78a can be reduced without reducing the amount of air passing through the vent holes 78, and foreign matter can be curtailed from entering into the interior of the battery pack 2 through the vent holes 78.

In one or more embodiments, the battery pack 2 further comprises the cell holder 42 accommodated in the case 12 and holding the battery cells 40. The cell holder 42 comprises an opening 82 disposed at a position facing the slits 80 of the control circuit board 44.

If the cell holder 42 shields a space between the slits 80 of the control circuit board 44 and the battery cells 40 in a configuration in which the battery cells 40 are held by the cell holder 42, air passing through the slits 80 flows in the space between the control circuit board 44 and the cell holder 42, which means that the battery cells 40 close to the slits 80 can not be sufficiently cooled. In the above configuration, because the cell holder 42 includes the opening 82 disposed at a position facing the slits 80 of the control circuit board 44, air passing through the slits 80 flows through the opening 82 of the cell holder 42. As such, the battery cells 40 close to the slits 80 can be sufficiently cooled.

In one or more embodiment, the case 12 comprises the recessed grooves 76 disposed between the power terminals 60 and the signal terminals 62 and opening in two directions. The vent holes 78 are disposed in bottom surfaces of the recessed grooves 76.

According to the above configuration, an inner space of the recessed grooves 76 of the case 12 functions as a flow passage for air passing through the vent holes 78. Further, according to the above configuration, either of the two directions in which the recessed grooves 76 open can be used as a direction in which air passing through the vent holes 78 flows into the case 12 or as a direction the air flows out from the case 12, as desired. According to the above configuration, the degrees of freedom in designing a mechanism through which cooling air flows into the battery pack 2 or flows out therefrom can be increased.

In one or more embodiments, the battery pack 2 further comprises the lead plates 54, 56 connecting the battery cells 40 to the control circuit board 44. The control circuit board 44 further includes the slits 85 (an example of a second through hole) disposed between the power terminals 60 and the lead plates 54, 56. The case 12 further comprises the vent holes 83 (an example of a second vent hole) disposed at positions facing the slits 85 of the control circuit board 44.

According to the above configuration, because the vent holes 83 provided in the case 12 are disposed at positions facing the slits 85 of the control circuit board 44, air flowing into the case 12 or flowing out therefrom through the vent holes 83 passes through the slits 85 of the control circuit board 44. As such, even if the battery cells 40 and the control circuit board 44 are disposed close to each other within the case 12, sufficient air can flow between the battery cells 40 and the control circuit board 44, and the battery cells 40 close to the control circuit board 44 can be sufficiently cooled. In addition, according to the above configuration, the slits 85 provided in the control circuit board 44 are disposed between the power terminals 60 and the lead plates 54, 56. Therefore, even if a conductive substance, such as water, enters the interior of the case 12 and adheres to the control circuit board 44, the occurrence of short circuits between the power terminals 60 and the lead plates 54, 56 can be curtailed.

In one or more embodiments, the control circuit board 44 comprises notches 44a (or notches 44b) formed between lead plates 54 (or lead plates 56) that are adjacent to each other.

According to the above configuration, because air can also flow through the notches 44a (or the notches 44b) of the control circuit board 44, sufficient air can flow through between the battery cells 40 and the control circuit board 44, and thus the battery cells 40 close to the control circuit board 44 can be sufficiently cooled. In addition, according to the above configuration, the notches 44a (or the notches 44b) formed in the control circuit board 44 are disposed between the lead plates 54 (or lead plates 56) that are adjacent to each other. Therefore, even if a conductive substance, such as water, enters the interior of the case 12 and adheres to the control circuit board 44, the occurrence of short circuits between the lead plates 54 (or lead plates 56) that are adjacent to each other can be curtailed.

In one or more embodiments, the battery pack 2 is attachable to/detachable from the charger 400 by sliding the battery pack 2 in the front-rear direction (an example of a predetermined sliding direction). The control circuit board 44 further comprises the slit 81 (an example of a third through hole) disposed at a position offset from the signal terminals 62 in the rear direction. The case 12 further comprises the vent hole 79 (an example of a third vent hole) disposed at a position facing the slit 81 of the control circuit board 44.

According to the above configuration, because the vent hole 79 provided in the case 12 is disposed at a position facing the slit 81 provided in the control circuit board 44, air flowing in or flowing out through the vent hole 79 of the case 12 passes through the slit 81 of the control circuit board 44. As such, even if the battery cells 40 and the control circuit board 44 are disposed close to each other within the case 12, sufficient air can flow through between the battery cells 40 and the control circuit board 44, and the battery cells 40 close to the control circuit board 44 can be sufficiently cooled.

In one or more embodiments, the battery pack 2 comprises: the plurality of battery cells 40 that includes the battery cell 40a (an example of the first battery cell) and the battery cell 40b (an example of the second battery cell); the first thermistor 90 disposed closest to the battery cell 40a among the plurality of battery cells 40; the second thermistor 92 disposed closest to the battery cell 40b among the plurality of battery cells 40; and the case 12 accommodating the plurality of battery cells 40, the first thermistor 90, and the second thermistor 92. The battery cell 40a is disposed at a position where (an)other battery cell(s) 40 is (are) interposed between the battery cell 40a and the wall surface of the case 12 with respect to the direction orthogonal to the longitudinal direction of the battery cell 40a. The battery cell 40b is disposed at a position where no other battery cell 40 is interposed between the battery cell 40b and the wall surface of the case 12 with respect to the direction orthogonal to the longitudinal direction of the battery cell 40b.

Generally, in a battery pack 2 in which a case 12 accommodates a plurality of battery cells 40 therein, heat dissipation occurs from the outer surface of the case 12 to air outside of the case 12. Since (an)other battery cell(s) 40 is (are) interposed between the battery cell 40a and the wall surface of the case 12 in the above-described configuration, heat dissipation via the wall surface of the case 12 is difficult, and thus the battery cell 40a tends to have a high temperature. In addition, since no other battery cell 40 is interposed between the battery cell 40b and the wall surface of the case 12, heat dissipation easily occurs via the wall surface of the case 12, and thus the battery cell 40b tends to have a low temperature. In the above-described configuration, the temperature of the battery cell 40a that tends to have a high temperature can be obtained using the first thermistor 90 and the temperature of the battery cell 40b that tends to have a low temperature can be obtained using the second thermistor 92. In the above-described configuration, the temperature of the battery cell 40a having a high temperature as well as the temperature of the battery cell 40b having a low temperature can be obtained in a battery pack 2 comprising a plurality of battery cells 40.

In one or more embodiments, the case 12 comprises the air supply holes 84 (an example of an air supply hole) through which air is introduced and the vent holes 78 (an example of an air discharge hole) through which air is discharged.

According to the above configuration, in a battery pack 2 in which the plurality of battery cells 40 is cooled by air flowing inside the case 12 from the air supply holes 84 to the vent holes 78, the temperature of the battery cell 40a having a high temperature as well as the temperature of the battery cell 40b having a low temperature can be obtained.

In one or more embodiments, the second thermistor 92 is disposed at a position where the distance from the position to the air supply holes 84 is smaller than the distance from the position to the vent holes 78.

In a battery pack 2 in which the plurality of battery cells 40 is cooled by air flowing inside the case 12 from the air supply holes 84 to the vent holes 78, the air has the lowest temperature immediately after having flowed in through the air supply holes 84 and has the highest temperature immediately before flowing out through the vent holes 78. Therefore, the battery cell(s) 40 disposed near the air supply holes 84 tend(s) to have a low temperature, while the battery cell(s) 40 disposed near the vent holes 78 tend(s) to have a high temperature. According to the above configuration, the temperature of the battery cell 40b having a lower temperature can be obtained using the second thermistor 92.

In one or more embodiments, the first thermistor 90 is disposed at a position where the distance from the position to the vent holes 78 is smaller than the distance from the position to the air supply holes 84.

In a battery pack 2 in which the plurality of battery cells 40 is cooled by air flowing inside the case 12 from the air supply holes 84 to the vent holes 78, the battery cell(s) 40 disposed near the air supply holes 84 tend(s) to have a low temperature, while the battery cell(s) 40 disposed near the vent holes 78 tend(s) to have a high temperature. According to the above configuration, the temperature of the battery cell 40a having a higher temperature can be obtained using the first thermistor 90.

In one or more embodiments, the battery pack 2 further comprises the control circuit board 44 (an example of circuit board) accommodated in the case 12 and disposed between the vent holes 78 and the plurality of battery cells 40. Each of the first thermistor 90 and the second thermistor 92 is connected to the control circuit board 44. The first thermistor 90 comprises a film thermistor. The second thermistor 92 comprises a dip thermistor.

According to the above configuration, because the control circuit board 44 is disposed between the vent holes 78 and the plurality of battery cells 40, the temperature of the battery cell 40a having a high temperature can be obtained with high accuracy by obtaining the temperature of the battery cell 40a disposed near the vent holes 78, namely the temperature of the battery cell 40a that tends to have a high temperature, using the first thermistor 90 that comprises the film thermistor. In addition, according to the above configuration, even if the control circuit board 44 is disposed between the vent holes 78 and the plurality of battery cells 40, the temperature of the battery cell 40b disposed near the air supply holes 84, namely the temperature of the battery cell 40b that tends to have a low temperature, can be obtained using the second thermistor 92 that comprises the dip thermistor.

In one or more embodiments, the battery pack 2 comprises: the plurality of battery cells 40 including the battery cell 40a (an example of the first battery cell) and the battery cell 40b (an example of the second battery cell); the first thermistor 90 disposed closest to the battery cell 40a among the plurality of battery cells 40; the second thermistor 92 disposed closest to the battery cell 40b among the plurality of battery cells 40; and the case 12 accommodating the plurality of battery cells 40, the first thermistor 90, and the second thermistor 92. The plurality of battery cells 40 comprises: the upper battery cell group 40c disposed in the upper row; the lower battery cell group 40d disposed in the lower row; and the middle battery cell group 40e disposed between the upper battery cell group 40c and the lower battery cell group 40d. The battery cell 40a is included in the middle battery cell group 40e. The battery cell 40b is included in either the upper battery cell group 40c or the lower battery cell group 40d.

Since other battery cells 40 are interposed between the battery cell 40a and the upper and lower surfaces of the case 12 in the above-described configuration, heat dissipation via the upper and lower surfaces of the case 12 is difficult, and thus the battery cell 40a tends to have a high temperature. Further, since no other battery cell 40 is interposed between the battery cell 40b and the upper or lower surface of the case 12, heat dissipation easily takes place via the upper or lower surface of the case 12, and thus the battery cell 40b tends to have a low temperature. In the above-described configuration, the temperature of the battery cell 40a having a high temperature can be obtained using the first thermistor 90 and the temperature of the battery cell 40b having a low temperature can be obtained using the second thermistor 92. In the above-described configuration, the temperature of the battery cell 40a having a high temperature as well as the temperature of the battery cell 40b having a low temperature can be obtained in a battery pack 2 comprising a plurality of battery cells 40.

In one or more embodiments, the battery pack 2 comprises: the plurality of battery cells 40 including the battery cell 40a (an example of the first battery cell) and the battery cell 40b (an example of the second battery cell); the first thermistor 90 disposed closest to the battery cell 40a among the plurality of battery cells 40; the second thermistor 92 disposed closest to the battery cell 40b among the plurality of battery cells 40; and the case 12 accommodating the plurality of battery cells 40, the first thermistor 90 and the second thermistor 92. The plurality of battery cells 40 comprises: the upper battery cell group 40c disposed at a position facing the upper surface of the case 12; the lower battery cell group 40d disposed at a position facing the lower surface of the case 12; and the middle battery cell group 40e disposed between the upper battery cell group 40c and the lower battery cell group 40d. The battery cell 40a is included in the middle battery cell group 40e. The battery cell 40b is included in either the upper battery cell group 40c or the lower battery cell group 40d.

Since other battery cells 40 are interposed between the battery cell 40a and the upper and lower surfaces of the case 12 in the above-described configuration, heat dissipation via the upper and lower surfaces of the case 12 is difficult, and thus the battery cell 40a tends to have a high temperature. Further, since no other battery cell 40 is interposed between the battery cell 40b and the upper or lower surface of the case 12, heat dissipation easily takes place via the upper or lower surface of the case 12, and thus the battery cell 40b tends to have a low temperature. In the above-described configuration, the temperature of the battery cell 40a having a high temperature can be obtained using the first thermistor 90 and the temperature of the battery cell 40b having a low temperature can be obtained using the second thermistor 92. In the above-described configuration, the temperature of the battery cell 40a having a high temperature as well as the temperature of the battery cell 40b having a low temperature can be obtained in a battery pack 2 comprising a plurality of battery cells 40.

In one or more embodiments, the power supply system 600 comprises the electrical device 200 and the battery pack 2 configured to be detachably attached to the electrical device 200 by being slid in the front-rear direction (an example of a sliding direction) with respect to the electrical device 200. The electrical device 200 comprises the power terminals 204 (an example of a device-side power terminal) and the protective ribs 208 disposed on both sides of the power terminals 204 and extending to a position higher than the power terminals 204. The battery pack 2 comprises the power terminals 60 (an example of a battery-side power terminal) that mechanically engage with and electrically connect to the power terminals 204, and the case 12 accommodating the power terminals 60. The case 12 comprises the power terminal openings 72 disposed at positions facing the power terminals 60 in the front-rear direction, and the recessed grooves 76 disposed on both sides of the power terminals 60 and extending along the front-rear direction.

In one or more embodiments, with regard to the electrical device 200, the battery pack 2 is attachable/detachable by sliding the battery pack 2 in the front-rear direction (an example of a sliding direction). The electrical device 200 comprises the power terminals 204 (an example of a device-side power terminal) and the protective ribs 208 disposed on both sides of the power terminals 204 and extending higher than the power terminals 204.

In one or more embodiments, the battery pack 2 is attachable to/detachable from the electrical device 200 by being slid with respect to the electrical device 200 in the front-rear direction (an example of a sliding direction). The battery pack 2 comprises the power terminals 60 (an example of a battery-side power terminal) and the case 12 accommodating the power terminals 60. The case 12 comprises the power terminal openings 72 disposed at positions facing the power terminals 60 in the front-rear direction, and the recessed grooves 76 disposed on both sides of the power terminals 60 and extending along the front-rear direction.

According to the above configuration, because the protective ribs 208, which extend higher than the power terminals 204, are provided on both sides of the power terminals 204 of the electrical device 200, the user will not accidentally come into contact with the power terminals 204 even in the state in which the battery pack 2 is detached from the electrical device 200. According to the above configuration, because the recessed grooves 76 of the case 12 of the battery pack 2 receive the protective ribs 208 of the electrical device 200 when the battery pack 2 is attached to the electrical device 200, the battery pack 2 can be attached to the electrical device 200 without interference between the protective ribs 208 and the case 12.

In one or more embodiments, the electrical device 200 further comprises the signal terminals 206 (an example of a device-side signal terminal). The protective ribs 208 are also disposed on both sides of the signal terminals 206 and extend higher than the signal terminals 206. The battery pack 2 further comprises the signal terminals 62 (an example of a battery-side signal terminal) which are accommodated in the case 12 and mechanically engage with and electrically connected to the signal terminals 206. The case 12 further comprises the signal terminal openings 74 disposed at positions facing the signal terminals 62 in the front-rear direction. The recessed grooves 76 are also disposed on both sides of each signal terminal 62.

In one or more embodiments, the electrical device 200 further comprises the signal terminals 206 (an example of device-side signal terminal). The protective ribs 208 are also disposed on both sides of the signal terminals 206 and extend higher than the signal terminals 206.

In one or more embodiments, the battery pack 2 further comprises the signal terminals 62 (an example of a battery-side signal terminal) accommodated in the case 12. The case 12 further comprises the signal terminal openings 74 disposed at positions facing the signal terminals 62 in the front-rear direction. The recessed grooves 76 are also disposed on both sides of the signal terminals 62.

According to the above configuration, because the protective ribs 208, which extend higher than the signal terminals 206, are provided on both sides of the signal terminals 206 of the electrical device 200, the user will not accidentally come into contact with the signal terminals 206 even in the state in which the battery pack 2 is detached from the electrical device 200. It is noted that, according to the above configuration, because the recessed grooves 76 of the case 12 of the battery pack 2 receive the protective ribs 208 of the electrical device 200 when the battery pack 2 is attached to the electrical device 200, the battery pack 2 can be attached to the electrical device 200 without interference between the protective ribs 208 and the case 12.

In one or more embodiments, the electrical device 200 further comprises the slide rails 210 (an example of a device-side slide rail). At least one of the protective ribs 208 is disposed between a slide rail 210 and a power terminal 204. The battery pack 2 further comprises the slide rails 20 (an example of a battery-side slide rail) that slidably engage with the slide rails 210 in the front-rear direction. At least one of the recessed grooves 76 is disposed between a slide rail 20 and a power terminal 60.

In one or more embodiments, the electrical device 200 further comprises the slide rails 210 (an example of a device-side slide rail). At least one of the protective ribs 208 is disposed between a slide rail 210 and a power terminal 204.

In one or more embodiments, the battery pack 2 further comprises the slide rails 20 (an example of a battery-side slide rail). At least one of the recessed grooves 76 is disposed between a slide rail 20 and a power terminal 60.

Spaces for receiving the slide rails 20 of the battery pack 2 are often provided between the slide rails 210 and the power terminals 204 of the electrical device 200, which allows for easy insertion of a user's finger. According to the above-described configuration, the user will not accidentally come into contact with the power terminals 204 through the spaces between the slide rails 210 and the power terminals 204, even in the state in which the battery pack 2 is detached from the electrical device 200. It is noted that, because the recessed grooves 76 of the case 12 of the battery pack 2 according to the above-described configuration receive the protective ribs 208 of the electrical device 200 when the battery pack 2 is attached to the electrical device 200, the battery pack 2 can be attached to the electrical device 200 without interference between the protective ribs 208 and the case 12.

The invention claimed is:

1. A battery pack comprising:
a plurality of battery cells that includes a first battery cell and a second battery cell;
a circuit board;
a first thermistor comprising a film thermistor connected to the circuit board and disposed closest to the first battery cell among the plurality of battery cells;
a second thermistor comprising a dip thermistor connected to the circuit board and disposed closest to the second battery cell among the plurality of battery cells; and
a case accommodating the plurality of battery cells, the circuit board, the first thermistor, and the second thermistor,
wherein:
the first battery cell is disposed at a position where at least one of the battery cells is interposed between the first battery cell and a wall surface of the case in a direction orthogonal to a longitudinal direction of the first battery cell,
the second battery cell is disposed at a position where no other battery cell is interposed between the second battery cell and the wall surface of the case in a direction orthogonal to a longitudinal direction of the second battery cell,
the film thermistor extends from the circuit board toward the first battery cell, and passes through spaces between two adjacent battery cells of the plurality of battery cells, the two adjacent battery cells being different from the first battery cell and the second battery cell, and
the dip thermistor extends from the circuit board toward the second battery cell, and passes through spaces between the plurality of battery cells and a wall surface of the case.

2. The battery pack according to claim 1, wherein the case has an air supply hole through which cooler air is introduced and an air discharge hole through which warmer air is discharged.

3. The battery pack according to claim 2, wherein:
the second thermistor is spaced apart from the air supply hole by a first distance,
the second thermistor is spaced apart from the air discharge hole by a second distance, and
the first distance is shorter than the second distance.

4. The battery pack according to claim 2, wherein:
the first thermistor is spaced apart from the air discharge hole by a third distance,
the first thermistor is spaced apart from the air supply hole by a fourth distance, and
the third distance is shorter than the fourth distance.

5. The battery pack according to claim 2, wherein the circuit board is disposed between the air discharge hole and the plurality of battery cells.

6. A battery pack, comprising:
a plurality of battery cells that includes a first battery cell and a second battery cell;
a circuit board;
a first thermistor comprising a film thermistor connected to the circuit board and disposed closest to the first battery cell among the plurality of battery cells;
a second thermistor comprising a dip thermistor connected to the circuit board and disposed closest to the second battery cell among the plurality of battery cells; and
a case accommodating the plurality of battery cells, the first thermistor and the second thermistor,
wherein
the plurality of battery cells includes:
an upper battery cell group disposed at a position facing an upper surface of the case;
a lower battery cell group disposed at a position facing a lower surface of the case; and
a middle battery cell group disposed between the upper battery cell group and the lower battery cell group,
the first battery cell is included in the middle battery cell group,
the second battery cell is included in either the upper battery cell group or the lower battery cell group,
the film thermistor extends from the circuit board toward the first battery cell, and passes through spaces between two adjacent battery cells of the plurality of battery cells, the two adjacent battery cells being different from the first battery cell and the second battery cell, and
the dip thermistor extends from the circuit board toward the second battery cell, and passes through spaces between the plurality of battery cells and a wall surface of the case.

7. The battery pack according to claim 5, wherein:
the second thermistor is spaced apart from the air supply hole by a first distance,
the second thermistor is spaced apart from the air discharge hole by a second distance,
the first thermistor is spaced apart from the air discharge hole by a third distance,
the first thermistor is spaced apart from the air supply hole by a fourth distance,
the first distance is shorter than the second distance, and
the third distance is shorter than the fourth distance.

8. The battery pack according to claim 7, wherein:
the plurality of battery cells includes:
an upper battery cell group disposed in an upper row;
a lower battery cell group disposed in a lower row; and
a middle battery cell group disposed between the upper battery cell group and the lower battery cell group,
the middle battery cell group includes the first battery cell, and
either the upper battery cell group or the lower battery cell group includes the second battery cell.

9. The battery pack according to claim 8, wherein:
the upper battery cell group is disposed closest to an upper surface of the case, and
the lower battery cell group is disposed closest to a lower surface of the case.

10. A battery pack comprising:
a plurality of battery cells that includes a first battery cell and a second battery cell;
a circuit board;
a first thermistor connected to the circuit board and disposed closest to the first battery cell among the plurality of battery cells;
a second thermistor connected to the circuit board and disposed closest to the second battery cell among the plurality of battery cells; and
a case accommodating the plurality of battery cells, the circuit board, the first thermistor, and the second thermistor,
wherein:
the first battery cell is disposed at a position where at least one of the battery cells is interposed between the first battery cell and a wall surface of the case in a direction orthogonal to a longitudinal direction of the first battery cell, the second battery cell is disposed at a position where no other battery cell is interposed between the second battery cell and the wall surface of the case in a direction orthogonal to a longitudinal direction of the second battery cell, the first thermistor extends from the circuit board toward the first battery cell, and passes through spaces between two adjacent battery cells of the plurality of battery cells, the two adjacent battery cells being different from the first battery cell and the second battery cell, and the second thermistor extends from the circuit board toward the second battery cell, and passes through spaces between the plurality of battery cells and the wall surface of the case.

11. The battery pack according to claim 10, wherein the case has an air supply hole through which cooler air is introduced and an air discharge hole through which warmer air is discharged.

12. The battery pack according to claim 11, wherein:
the second thermistor is spaced apart from the air supply hole by a first distance,
the second thermistor is spaced apart from the air discharge hole by a second distance, and
the first distance is shorter than the second distance.

13. The battery pack according to claim 11, wherein:
the first thermistor is spaced apart from the air discharge hole by a third distance,
the first thermistor is spaced apart from the air supply hole by a fourth distance, and
the third distance is shorter than the fourth distance.

14. The battery pack according to claim 11, wherein the circuit board is disposed between the air discharge hole and the plurality of battery cells.

15. The battery pack according to claim 11, wherein:
the second thermistor is spaced apart from the air supply hole by a first distance,
the second thermistor is spaced apart from the air discharge hole by a second distance,
the first thermistor is spaced apart from the air discharge hole by a third distance,
the first thermistor is spaced apart from the air supply hole by a fourth distance,
the first distance is shorter than the second distance, and
the third distance is shorter than the fourth distance.

16. The battery pack according to claim 10, wherein:
the plurality of battery cells includes:
an upper battery cell group disposed in an upper row;
a lower battery cell group disposed in a lower row; and
a middle battery cell group disposed between the upper battery cell group and the lower battery cell group,
the middle battery cell group includes the first battery cell, and
either the upper battery cell group or the lower battery cell group includes the second battery cell.

17. The battery pack according to claim 16, wherein:
the upper battery cell group is disposed closest to an upper surface of the case, and
the lower battery cell group is disposed closest to a lower surface of the case.

18. The battery pack according to claim 17, wherein the case has an air supply hole through which cooler air is introduced and an air discharge hole through which warmer air is discharged.

19. The battery pack according to claim 18, wherein:
the second thermistor is spaced apart from the air supply hole by a first distance,
the second thermistor is spaced apart from the air discharge hole by a second distance,
the first thermistor is spaced apart from the air discharge hole by a third distance,
the first thermistor is spaced apart from the air supply hole by a fourth distance,
the first distance is shorter than the second distance, and
the third distance is shorter than the fourth distance.

* * * * *